US012636524B2

(12) United States Patent
Jones et al.

(10) Patent No.: US 12,636,524 B2
(45) Date of Patent: ***May 26, 2026

(54) FILTER MEDIA, COMPOSITES, AND FACE MASK SYSTEMS USING SAME

(71) Applicant: Donaldson Company, Inc., Bloomington, MN (US)

(72) Inventors: Derek O. Jones, Andover, MN (US); Joseph M. Block, Carver, MN (US); Klenton T. Willis, Woodbury, MN (US); Patricia A. Ignacio-de Leon, Minnetonka, MN (US); James P. Barsness, Dennison, MN (US); Dustin A. Zastera, Hastings, MN (US); William A. Osmer, Prescott, WI (US); Thomas M. Weik, Deephaven, MN (US); Jacob C. Savstrom, Mound, MN (US)

(73) Assignee: Donaldson Company, Inc., Bloomington, MN (US)

( * ) Notice: Subject to any disclaimer, the term of this patent is extended or adjusted under 35 U.S.C. 154(b) by 735 days.

This patent is subject to a terminal disclaimer.

(21) Appl. No.: 17/776,901

(22) PCT Filed: Apr. 2, 2021

(86) PCT No.: PCT/US2021/025676
§ 371 (c)(1),
(2) Date: May 13, 2022

(87) PCT Pub. No.: WO2021/203068
PCT Pub. Date: Oct. 7, 2021

(65) Prior Publication Data
US 2023/0330451 A1 Oct. 19, 2023

Related U.S. Application Data

(60) Provisional application No. 63/081,143, filed on Sep. 21, 2020, provisional application No. 63/081,159, (Continued)

(51) Int. Cl.
*B01D 53/02* (2006.01)
*A62B 18/10* (2006.01)
(Continued)

(52) U.S. Cl.
CPC .............. *A62B 23/02* (2013.01); *A62B 18/10* (2013.01); *B01D 39/18* (2013.01);
(Continued)

(58) Field of Classification Search
CPC ......... A62B 18/02; A62B 18/10; A62B 23/02; A62B 23/025; B01D 2239/0216;
(Continued)

(56) References Cited

U.S. PATENT DOCUMENTS 5,279,731 A 1/1994 Cook et al.
5,554,287 A 9/1996 Beck et al.
(Continued)

FOREIGN PATENT DOCUMENTS

CN 101182652 A 5/2008
CN 101952210 A 1/2011
(Continued)

OTHER PUBLICATIONS

Zhao et al., "Electrospun Bead-on-String Fibers: Useless or Something of Value? Chapter 5," in Novel Aspects of Nanofibers, 2018, pp. 87-102.
(Continued)

*Primary Examiner* — Christopher P Jones
(74) *Attorney, Agent, or Firm* — Mueting Raasch Group

(57) ABSTRACT

This disclosure describes filter media and mask filters and face mask systems including those filter media. In one
(Continued)

aspect, the filter media includes a fibrous media including multi-component binder fibers, glass fibers, and microfibrillated cellulose fibers. In some aspects, the fibrous media further includes PET fibers. In another aspect, the filter media includes an electrostatically charged filter media, a fine fiber layer, and a scrim. In yet another aspect, the filter media includes two fine fiber layers, and two scrims. In additional aspects, the filter media includes bicomponent fibers, polyethylene terephthalate fibers, and microfibrillated cellulose fibers. In a further aspect, the filter media includes a support layer, a continuous fine fiber layer, and an efficiency layer. Combinations and composites of the filter media are also contemplated.

19 Claims, 39 Drawing Sheets

Related U.S. Application Data filed on Sep. 21, 2020, provisional application No. 63/042,943, filed on Jun. 23, 2020, provisional application No. 63/024,894, filed on May 14, 2020, provisional application No. 63/004,939, filed on Apr. 3, 2020, provisional application No. 63/004,926, filed on Apr. 3, 2020, provisional application No. 63/004,954, filed on Apr. 3, 2020, provisional application No. 63/004,621, filed on Apr. 3, 2020, provisional application No. 63/004,464, filed on Apr. 2, 2020.

(51) Int. Cl.
| | |
|---|---|
| *A62B 23/02* | (2006.01) |
| *B01D 39/18* | (2006.01) |
| *B01D 39/20* | (2006.01) |

(52) U.S. Cl.
CPC .. *B01D 39/2017* (2013.01); *B01D 2239/0216* (2013.01); *B01D 2239/0435* (2013.01); *B01D 2239/0618* (2013.01); *B01D 2239/0636* (2013.01); *B01D 2239/0654* (2013.01); *B01D 2239/1225* (2013.01); *B01D 2239/1233* (2013.01)

(58) Field of Classification Search
CPC ...... B01D 2239/0233; B01D 2239/025; B01D 2239/0435; B01D 2239/0613; B01D 2239/0618; B01D 2239/0622; B01D 2239/0627; B01D 2239/0636; B01D 2239/065; B01D 2239/0654; B01D 2239/1216; B01D 2239/1225; B01D 2239/1233; B01D 2239/1266; B01D 2239/1291; B01D 39/1623; B01D 39/163; B01D 39/18; B01D 39/2017; B01D 39/2024
See application file for complete search history.

(56) References Cited

U.S. PATENT DOCUMENTS

| | | | |
|---|---|---|---|
| 6,165,572 A | 12/2000 | Kahlbaugh et al. |
| 6,673,136 B2 | 1/2004 | Gillingham et al. |
| 6,716,274 B2 | 4/2004 | Gogins et al. |
| 6,743,273 B2 | 6/2004 | Chung et al. |
| 6,746,517 B2 | 6/2004 | Benson et al. |
| 6,800,117 B2 | 10/2004 | Barris et al. |
| 6,875,256 B2 | 4/2005 | Gillingham et al. |
| 6,924,028 B2 | 8/2005 | Chung et al. |
| 6,955,775 B2 | 10/2005 | Chung et al. |
| 7,070,640 B2 | 7/2006 | Chung et al. |
| 7,090,715 B2 | 8/2006 | Chung et al. |
| 7,160,451 B2 | 1/2007 | Hacker et al. |
| 7,238,285 B2 | 7/2007 | Hacker et al. |
| 7,309,372 B2 | 12/2007 | Kahlbaugh et al. |
| 7,314,497 B2 | 1/2008 | Kahlbaugh et al. |
| 7,316,723 B2 | 1/2008 | Chung et al. |
| 7,318,852 B2 | 1/2008 | Chung et al. |
| 7,641,055 B2 | 1/2010 | Ferrer et al. |
| 7,981,336 B2 | 7/2011 | Pourdeyhimi |
| 7,985,275 B2 | 7/2011 | Smithies |
| 7,988,860 B2 | 8/2011 | Kalayci et al. |
| 8,057,567 B2 | 11/2011 | Webb et al. |
| 8,262,780 B2 | 9/2012 | Smithies et al. |
| 8,263,214 B2 | 9/2012 | Kalayci et al. |
| 8,267,681 B2 | 9/2012 | Gupta et al. |
| 8,268,033 B2 | 9/2012 | Rogers et al. |
| 8,277,529 B2 | 10/2012 | Rogers et al. |
| 8,366,797 B2 | 2/2013 | Chung et al. |
| 8,512,435 B2 | 8/2013 | Rogers et al. |
| 8,513,431 B2 | 8/2013 | Annis et al. |
| 8,524,041 B2 | 9/2013 | Gupta et al. |
| 8,641,796 B2 | 2/2014 | Rogers et al. |
| 8,673,040 B2 | 3/2014 | Handley et al. |
| 8,709,139 B2 | 4/2014 | Veeser et al. |
| 8,721,756 B2 | 5/2014 | Handley et al. |
| 8,834,610 B2 | 9/2014 | Lundgren et al. |
| 8,882,876 B2 | 11/2014 | Battenfeld et al. |
| 8,950,587 B2 | 2/2015 | Thomson et al. |
| 9,149,748 B2 | 10/2015 | Nagy et al. |
| 9,149,749 B2 | 10/2015 | Nagy et al. |
| 9,153,291 B2 | 10/2015 | Miller, III et al. |
| 9,259,689 B2 | 2/2016 | Waller, Jr. et al. |
| 9,303,339 B2 | 4/2016 | Gupta et al. |
| 9,435,056 B2 | 9/2016 | Shenoy et al. |
| 9,492,775 B2 | 11/2016 | Amsden et al. |
| 9,511,330 B2 | 12/2016 | Yu et al. |
| 9,587,328 B2 | 3/2017 | Shenoy et al. |
| 9,662,600 B2 | 5/2017 | Parker |
| 9,718,005 B2 | 8/2017 | Klein et al. |
| 9,795,906 B2 | 10/2017 | Rogers et al. |
| 9,885,154 B2 | 2/2018 | Gupta |
| 9,950,284 B2 | 4/2018 | Thomson et al. |
| 9,987,578 B2 | 6/2018 | Haberkamp et al. |
| 10,058,808 B2 | 8/2018 | Haberkamp et al. |
| 10,080,985 B2 | 9/2018 | Nagy et al. |
| 10,137,394 B2 | 11/2018 | Tong et al. |
| 10,252,200 B2 | 4/2019 | Anantharamaiah et al. |
| 10,279,291 B2 | 5/2019 | Nagy et al. |
| 10,293,288 B2 | 5/2019 | Chavan et al. |
| 10,316,468 B2 | 6/2019 | Gupta |
| 10,316,748 B2 | 6/2019 | Lans |
| 10,343,095 B2 | 7/2019 | Jaganathan et al. |
| 10,357,729 B2 | 7/2019 | Parker |
| 10,363,505 B2 | 7/2019 | Parker |
| 10,391,434 B2 | 8/2019 | Haberkamp et al. |
| RE47,737 E | 11/2019 | Kahlbaugh et al. |
| 10,537,837 B2 | 1/2020 | Haberkamp et al. |
| 10,610,813 B2 | 4/2020 | Rogers et al. |
| 10,653,979 B2 | 5/2020 | Barsness et al. |
| 10,953,356 B2 | 3/2021 | Haberkamp et al. |
| 10,974,182 B2 | 4/2021 | Schwandt et al. |
| 11,090,590 B2 | 8/2021 | Nagy et al. |
| 11,123,668 B2 | 9/2021 | Anantharamaiah et al. |
| 11,167,232 B2 | 11/2021 | Jaganathan et al. |
| RE49,097 E | 6/2022 | Kahlbaugh et al. |
| 11,504,663 B2 | 11/2022 | Rogers et al. |
| 2002/0046656 A1 | 4/2002 | Benson et al. |
| 2003/0106294 A1 | 6/2003 | Chung et al. |
| 2003/0164333 A1 | 9/2003 | Nohren et al. |
| 2004/0116025 A1 | 6/2004 | Gogins et al. |
| 2004/0116026 A1 | 6/2004 | Kubose et al. |
| 2004/0180598 A1 | 9/2004 | Yang et al. |
| 2004/0211160 A1 | 10/2004 | Rammig et al. |
| 2005/0026526 A1 | 2/2005 | Verdegan et al. |
| 2005/0160711 A1 | 7/2005 | Yang |
| 2006/0096263 A1 | 5/2006 | Kahlbaugh et al. |

(56) References Cited

U.S. PATENT DOCUMENTS

| | | |
|---|---|---|
| 2006/0096932 A1 | 5/2006 | Dema et al. |
| 2006/0137317 A1 | 6/2006 | Bryner et al. |
| 2006/0242933 A1 | 11/2006 | Webb et al. |
| 2007/0131235 A1 | 6/2007 | Janikowski et al. |
| 2008/0093778 A1 | 4/2008 | Johnson et al. |
| 2008/0105626 A1 | 5/2008 | Jones et al. |
| 2008/0110342 A1 | 5/2008 | Ensor et al. |
| 2008/0149561 A1 | 6/2008 | Chu et al. |
| 2008/0160856 A1 | 7/2008 | Chen et al. |
| 2008/0197077 A1 | 8/2008 | Swartley et al. |
| 2008/0302242 A1 | 12/2008 | Schelling et al. |
| 2008/0314010 A1 | 12/2008 | Smithies et al. |
| 2009/0120868 A1 | 5/2009 | Huppchen et al. |
| 2009/0221812 A1 | 9/2009 | Ankerfors et al. |
| 2009/0266759 A1 | 10/2009 | Green |
| 2009/0272086 A1 | 11/2009 | Hsiao et al. |
| 2010/0206803 A1 | 8/2010 | Ward et al. |
| 2010/0282682 A1 | 11/2010 | Eaton et al. |
| 2010/0307119 A1 | 12/2010 | Leung et al. |
| 2010/0313753 A1 | 12/2010 | Calis et al. |
| 2011/0138683 A1 | 6/2011 | Hernandez Altamirano et al. |
| 2011/0138685 A1 | 6/2011 | Kalayci et al. |
| 2011/0174158 A1 | 7/2011 | Walls et al. |
| 2011/0210059 A1 | 9/2011 | Green et al. |
| 2011/0232653 A1* | 9/2011 | Imashiro ................. B32B 5/022 |
| | | 977/700 |
| 2011/0259796 A1 | 10/2011 | Chen et al. |
| 2012/0043038 A1 | 2/2012 | Dodd |
| 2012/0137885 A1 | 6/2012 | Dullaert et al. |
| 2012/0190264 A1 | 7/2012 | Mahammad et al. |
| 2012/0234748 A1 | 9/2012 | Little et al. |
| 2013/0068687 A1 | 3/2013 | Shenoy et al. |
| 2013/0152948 A1 | 6/2013 | Inagaki et al. |
| 2013/0233789 A1 | 9/2013 | Parker |
| 2013/0340613 A1 | 12/2013 | Krupnikov et al. |
| 2014/0014573 A1 | 1/2014 | Hosoya et al. |
| 2014/0020350 A1 | 1/2014 | Fu |
| 2014/0043038 A1 | 2/2014 | Chen et al. |
| 2014/0076797 A1 | 3/2014 | Jo et al. |
| 2014/0110354 A1 | 4/2014 | Haberkamp et al. |
| 2014/0123613 A1 | 5/2014 | Le Port et al. |
| 2014/0275692 A1 | 9/2014 | Patel et al. |
| 2014/0291222 A1 | 10/2014 | Behrendt et al. |
| 2014/0360145 A1 | 12/2014 | Hamada et al. |
| 2015/0157971 A1 | 6/2015 | Tong et al. |
| 2015/0174509 A1 | 6/2015 | Swaminathan |
| 2015/0298070 A1 | 10/2015 | Koslov et al. |
| 2015/0354139 A1 | 12/2015 | Geisen et al. |
| 2015/0360159 A1 | 12/2015 | Lee et al. |
| 2016/0023146 A1 | 1/2016 | Hampton et al. |
| 2016/0038864 A1 | 2/2016 | Calcaterra et al. |
| 2016/0038865 A1 | 2/2016 | Jones et al. |
| 2016/0051918 A1 | 2/2016 | Walz et al. |
| 2016/0051919 A1 | 2/2016 | Nagy et al. |
| 2016/0051920 A1 | 2/2016 | Sato et al. |
| 2016/0067641 A1* | 3/2016 | Rodriguez ........... B01D 39/163 |
| | | 210/505 |
| 2016/0074790 A1 | 3/2016 | Kuroda et al. |
| 2016/0136553 A1 | 5/2016 | Healey et al. |
| 2016/0136584 A1 | 5/2016 | Hwang et al. |
| 2016/0166953 A1 | 6/2016 | Swaminathan et al. |
| 2016/0166961 A1 | 6/2016 | Haberkamp et al. |
| 2016/0175748 A1 | 6/2016 | Park |
| 2016/0175752 A1* | 6/2016 | Jaganathan ........ B01D 39/1692 |
| | | 55/486 |
| 2016/0243478 A1 | 8/2016 | Park |
| 2016/0256805 A1 | 9/2016 | Grein et al. |
| 2016/0279548 A1 | 9/2016 | Chavan et al. |
| 2016/0361674 A1 | 12/2016 | Swaminathan et al. |
| 2016/0367922 A1 | 12/2016 | Kamiyama |
| 2017/0028329 A1 | 2/2017 | Motomura et al. |
| 2017/0080368 A1 | 3/2017 | Smith et al. |
| 2017/0128892 A1 | 5/2017 | Yu et al. |
| 2017/0173509 A1 | 6/2017 | Giglia et al. |
| 2017/0232372 A1 | 8/2017 | Zhang et al. |
| 2017/0296953 A1 | 10/2017 | Parker |
| 2017/0304755 A1 | 10/2017 | Bansal et al. |
| 2017/0306148 A1 | 10/2017 | Bansal et al. |
| 2017/0319994 A1 | 11/2017 | Parker |
| 2017/0361254 A1 | 12/2017 | Huang et al. |
| 2018/0001247 A1 | 1/2018 | Jinka et al. |
| 2018/0085698 A1 | 3/2018 | Motomura et al. |
| 2018/0169551 A1 | 6/2018 | Jaganathan et al. |
| 2018/0178150 A1 | 6/2018 | Neumann et al. |
| 2018/0236385 A1 | 8/2018 | Jinka et al. |
| 2018/0272258 A1 | 9/2018 | Healey et al. |
| 2018/0280845 A1 | 10/2018 | Barlow, Jr. et al. |
| 2018/0280846 A1 | 10/2018 | Barlow, Jr. et al. |
| 2018/0280847 A1 | 10/2018 | Barlow, Jr. et al. |
| 2018/0361287 A1 | 12/2018 | Zhang et al. |
| 2019/0224598 A1 | 7/2019 | Chavan et al. |
| 2019/0255473 A1 | 8/2019 | Gao et al. |
| 2019/0314747 A1* | 10/2019 | Nagy ..................... B01D 39/18 |
| 2020/0038793 A1 | 2/2020 | Jaganathan et al. |
| 2020/0078742 A1 | 3/2020 | Seo et al. |
| 2020/0171418 A1 | 6/2020 | Rezaei et al. |
| 2020/0217275 A1 | 7/2020 | Krauss et al. |
| 2020/0391147 A1 | 12/2020 | Schmalz |
| 2021/0086116 A1 | 3/2021 | Shim et al. |
| 2021/0093989 A1 | 4/2021 | Doucoure et al. |
| 2021/0170317 A1 | 6/2021 | Janikowski et al. |
| 2021/0178300 A1 | 6/2021 | Schwandt et al. |
| 2021/0213378 A1 | 7/2021 | Shim et al. |
| 2021/0236971 A1 | 8/2021 | Umebayashi |
| 2021/0370208 A1* | 12/2021 | Yegya-Raman ..... B01D 39/083 |
| 2021/0370218 A1 | 12/2021 | Daus et al. |
| 2021/0387120 A1 | 12/2021 | Petri et al. |
| 2022/0047015 A1* | 2/2022 | Duffy ................... A62B 23/025 |
| 2022/0047976 A1 | 2/2022 | Rao et al. |
| 2022/0162785 A1 | 5/2022 | Adachi et al. |
| 2022/0193587 A1 | 6/2022 | Cheng et al. |
| 2022/0347611 A1* | 11/2022 | Babcock ................ D04H 3/011 |
| 2022/0379249 A1 | 12/2022 | Jones et al. |
| 2022/0387915 A1 | 12/2022 | Ignacio-de Leon et al. |
| 2023/0018302 A1* | 1/2023 | Jones ..................... B01D 39/18 |
| 2023/0021769 A1* | 1/2023 | Jones .................. B01D 39/163 |
| 2023/0051258 A1 | 2/2023 | Jaganathan et al. |
| 2023/0149840 A1 | 5/2023 | Rogers et al. |

FOREIGN PATENT DOCUMENTS

| | | |
|---|---|---|
| CN | 101963102 A | 2/2011 |
| CN | 102015080 A | 4/2011 |
| CN | 105392544 A | 3/2016 |
| CN | 105451854 A | 3/2016 |
| CN | 106573191 A | 4/2017 |
| CN | 107051016 A | 8/2017 |
| CN | 108330556 A | 7/2018 |
| CN | 109310936 A | 2/2019 |
| CN | 109562311 A | 4/2019 |
| CN | 110124413 A | 8/2019 |
| DE | 102013008391 A1 | 10/2014 |
| DE | 112013005087 T5 | 7/2015 |
| DE | 112014003579 T5 | 4/2016 |
| DE | 102015002672 A1 | 9/2016 |
| DE | 112015002324 T5 | 3/2017 |
| EP | 1764144 A1 | 3/2007 |
| EP | 1860236 A2 | 11/2007 |
| EP | 1894609 A1 | 3/2008 |
| EP | 1689510 B1 | 7/2009 |
| EP | 2589422 A2 | 5/2013 |
| EP | 2822670 A2 | 1/2015 |
| EP | 2958652 A1 | 12/2015 |
| EP | 2222385 B1 | 6/2016 |
| EP | 3029190 A1 | 6/2016 |
| EP | 3056597 A1 | 8/2016 |
| EP | 3064262 A1 | 9/2016 |
| EP | 3083003 A1 | 10/2016 |
| EP | 3100779 A1 | 12/2016 |
| EP | 3142774 A1 | 3/2017 |
| EP | 3225294 A1 | 10/2017 |
| EP | 2809433 B1 | 11/2017 |
| EP | 2987544 B1 | 12/2017 |
| EP | 3100779 B1 | 3/2018 |

(56) References Cited

FOREIGN PATENT DOCUMENTS

| EP | 2361144 B1 | 5/2018 |
|---|---|---|
| EP | 2864019 B1 | 9/2018 |
| EP | 3416735 A1 | 12/2018 |
| EP | 3445470 A1 | 2/2019 |
| EP | 3056598 B1 | 4/2019 |
| EP | 3508265 A1 | 7/2019 |
| EP | 3519076 A1 | 8/2019 |
| EP | 3445899 A4 | 11/2019 |
| EP | 3233240 B1 | 2/2020 |
| EP | 3357564 B1 | 3/2020 |
| EP | 3738659 A1 | 11/2020 |
| EP | 3039177 B1 | 10/2021 |
| EP | 3895779 A1 | 10/2021 |
| EP | 3906991 A1 | 11/2021 |
| EP | 3781286 B1 | 6/2022 |
| ES | 2731684 T3 | 11/2019 |
| IN | 325621 B | 3/2014 |
| JP | H0312208 A | 1/1991 |
| JP | H04313313 A | 11/1992 |
| JP | H05295645 A | 11/1993 |
| JP | 2007170224 A | 7/2007 |
| JP | 2011512252 A | 4/2011 |
| JP | 2011089226 A | 5/2011 |
| JP | 2012516399 A | 7/2012 |
| JP | 2016176173 A | 10/2016 |
| JP | 6045687 B2 | 12/2016 |
| JP | 2017020507 A | 1/2017 |
| JP | 2018126721 A | 8/2018 |
| JP | 2019077962 A | 5/2019 |
| KR | 101416614 B1 | 7/2014 |
| KR | 101479752 B1 | 1/2015 |
| KR | 101479753 B1 | 1/2015 |
| PL | 233499 B1 | 10/2019 |
| WO | 2006049664 A1 | 5/2006 |
| WO | 2006052732 A2 | 5/2006 |
| WO | 2006089063 A2 | 8/2006 |
| WO | 2007133403 A2 | 11/2007 |
| WO | 2008142023 A2 | 11/2008 |
| WO | 2009014539 A1 | 1/2009 |
| WO | 2009067365 A2 | 5/2009 |
| WO | 2010009043 A2 | 1/2010 |
| WO | 2010124899 A1 | 11/2010 |
| WO | 2013043987 A1 | 3/2013 |
| WO | 2013170890 A1 | 11/2013 |
| WO | 2014130933 A1 | 8/2014 |
| WO | 2014164130 A1 | 10/2014 |
| WO | 2015016449 A1 | 2/2015 |
| WO | 2015017795 A2 | 2/2015 |
| WO | 2015053442 A1 | 4/2015 |
| WO | 2015053443 A1 | 4/2015 |
| WO | 2015091181 A2 | 6/2015 |
| WO | 2015157638 A2 | 10/2015 |
| WO | 2016022758 A1 | 2/2016 |
| WO | 2016100300 A8 | 7/2016 |
| WO | 2016205621 A1 | 12/2016 |
| WO | 2016210153 A1 | 12/2016 |
| WO | 2017184982 A1 | 10/2017 |
| WO | 2017196653 A1 | 11/2017 |
| WO | 2017214419 A1 | 12/2017 |
| WO | 2018011347 A1 | 1/2018 |
| WO | 2018175556 A1 | 9/2018 |
| WO | 2018193165 A1 | 10/2018 |
| WO | 2018208819 A1 | 11/2018 |
| WO | 2019202212 A1 | 10/2019 |
| WO | 2019202213 A1 | 10/2019 |
| WO | 2020025956 A1 | 2/2020 |
| WO | 2020052884 A1 | 3/2020 |
| WO | 2020152551 A1 | 7/2020 |
| WO | 2021072117 A1 | 4/2021 |
| WO | 2021072122 A1 | 4/2021 |
| WO | 2021203066 A1 | 10/2021 |
| WO | 2021203067 A1 | 10/2021 |
| WO | 2021203068 A1 | 10/2021 |

OTHER PUBLICATIONS

Yoon et al., "High flux ultrafiltration membranes based on electrospun nanofibrous PAN scaffolds and chitosan coating," Polymer, 2006, vol. 47, pp. 2434-2441.

Wikipedia, "Powered air-purifying respirator," retrieved from the Internet on Mar. 20, 2023, <URL:https:en.wikipedia.org/wiki/Powered_air-purifying_respirator>, 5 pages.

Wertz et al., "Filtration media: Advantages of nanofibre coating technology," Filtration & Separation, Jul./Aug. 2009, vol. 46, No. 4, pp. 18-20.

Wang et al., "Computational characterization of nonwoven fibrous media: 1. Pore-network extractionand morphological analysis," Physical Review Materials, 2020, vol. 4, No. 083803, 11 pages.

Cerex Advanced Fabrics, Inc., "Benefits of Spunbond Substrate Uniformity in Advanced Filtration Media," date unavailable but believed to be available as early as 2018, retrieved from the Internet on Dec. 5, 2019, <URL:https://www.cerex.com/wp-content/uploads/2018/03/benefits-of-spunbond-substrate-uniformity-in-advanced-filtration-media.pdf>, 19 pages.

Chinga-Carrasco, "Cellulose fibres, nanofibrils and microfibrils: The morphological sequence of MFC components from a plant physiology and fibre technology point of view," Nanoscale Research Letters, 2011, vol. 6, No. 417, 7 pgs.

Fong et al., "Beaded nanofibers formed during electrospinning," Polymer, 1999, vol. 40, pp. 4585-4592.

Hollingsworth & Vose, "Technostat Electrostatic Filter Media," Mar. 8, 2011, 2 pages.

Hollingsworth & Vose, Technostat® Product Information, 2023, retrieved from the Internet on Mar. 20, 2023, <URL: https://www.hollingsworth-vose.com/brands/filtration/technostat/>, 5 pages.

Hutten, Handbook of Nonwoven Filter Media, Butterworth-Heinemann, an imprint of Elsevier: Oxford, UK; 2007, 13 pgs.

International Prelimary Report on Patentability in PCT/US2020/054844, mailed Apr. 12, 2022, 7 pages.

International Preliminary Report on Patentability in PCT/US2020/054837, mailed Apr. 12, 2022, 7 pages.

International Preliminary Report on Patentability in PCT/US2021/025673, mailed Sep. 29, 2022, 7 pages.

International Preliminary Report on Patentability in PCT/US2021/025674, mailed Sep. 29, 2022, 7 pages.

International Preliminary Report on Patentability in PCT/US2021/025676, mailed Sep. 29, 2022, 14 pages.

International Search Report and Written Opinion in PCT/US2020/054837, mailed Jan. 14, 2021, 10 pages.

International Search Report and Written Opinion in PCT/US2021/025674, mailed Jul. 19, 2021, 10 pages.

International Search Report and Written Opinion in PCT/US2021/025676, mailed Sep. 16, 2021, 19 pages.

International Search Report and Written Opinion in PDT/US2021/025673, mailed Jul. 19, 2021, 10 pages.

International Search Report and Written Opinion in PCT/US2020/054844, mailed Jan. 26, 2021, 9 pages.

Invitation to Pay Additional Fees in PCT/US2021/025676, mailed Jul. 26, 2021, 12 pages.

Teijin Aramind, "A truee all-around para-aramid performer," Twaron® Product Brochure, Nov. 6, 2018, 9 pages.

Superior Felt & Filtration, Sub-Micron Fibers—Technostat® Filter Media for Air & Liquid Applications, 2017, 8 pages.

Subbiah et al., "Electrospinning of Nanofibers," Journal of Applied Polymer Science, 2005, vol. 96, pp. 557-569.

Kirsch et al., "Studies on Fibrous Aerosol Filters—III Diffusional Deposition of Aerosol in Fibrous Filter," Ann. Occup. Hyg., 1968, vol. 11, pp. 299-304 (Abstract Only).

Ma et al., "Fabrication and characterisation of cellulose nanofiber based thin-film nanofibrous composite membranes," Journal of Membrane Science, 2014, vol. 454, pp. 272-282.

Purchas, Handbook of Filter Media, 1st Edition, Elsevier Advanced Technology: Oxford, UK; 1996, pp. 152 and 154.

Sheffield, "Changes in Filtration and Contamination," Schroeder Industries, retrieved from the Internet Oct. 7, 2019 <URL:https://www.machinerylubrication.com/Articles/Print/704>, 5 pages.

(56)      References Cited

OTHER PUBLICATIONS

"The new Filter Media Synteq XP" Brochure, Donaldson Filtration
Soltions, Apr. 2009, 4 pages.
Wang J., et al., "Application Process of Bicomponent Spun-bonding
Technology in the Field of Superfine Fiber Nonwoven Materials",
Synthetic Fiber Industry, Issue. 5, Oct. 15, 2015.

* cited by examiner second major surface electrostatically charged filter media fine fiber layer scrim first major surface scrim fine fiber layer electrostatically charged filter media fine fiber layer scrim electrostatically charged filter media fine fiber
layer fine fiber
layer fine fiber
layer

FIG. 2H
Upstream
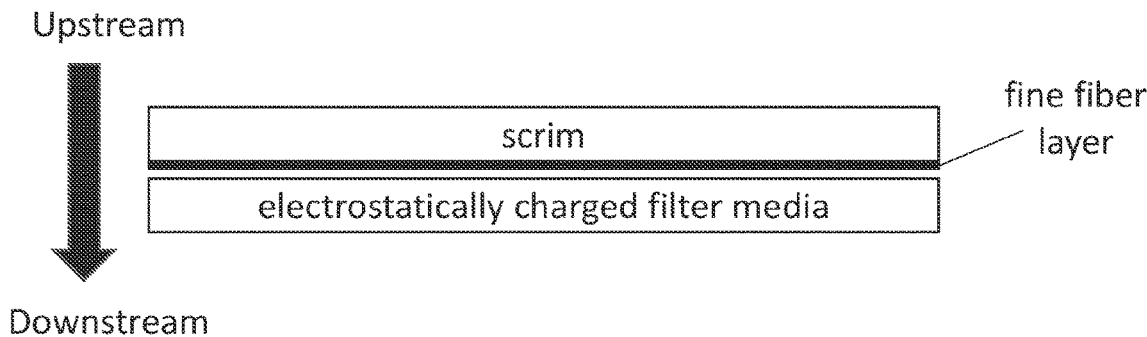
Downstream
FIG. 2I
Upstream
Downstream
FIG. 2J
Upstream
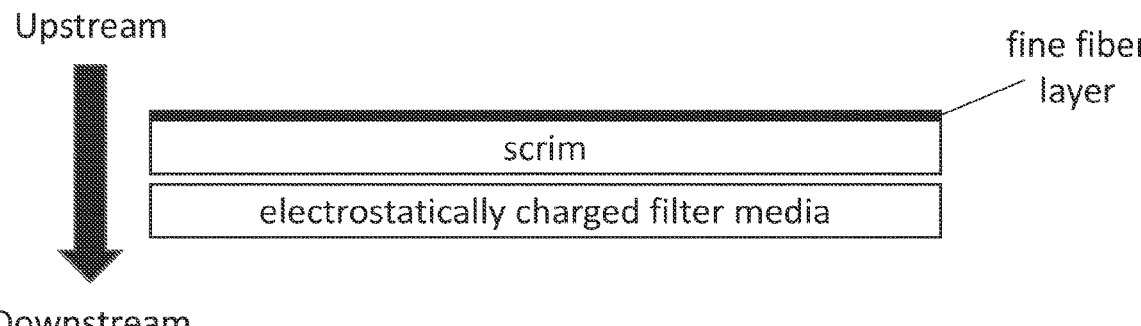
Downstream

FIG. 2K
Upstream
Downstream
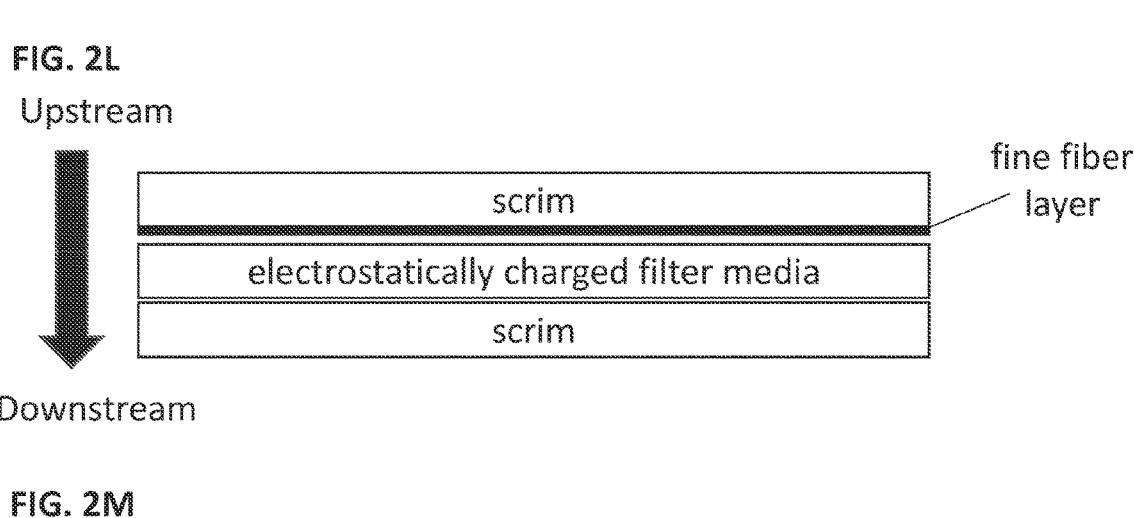
FIG. 2L
Upstream
Downstream
FIG. 2M
Upstream
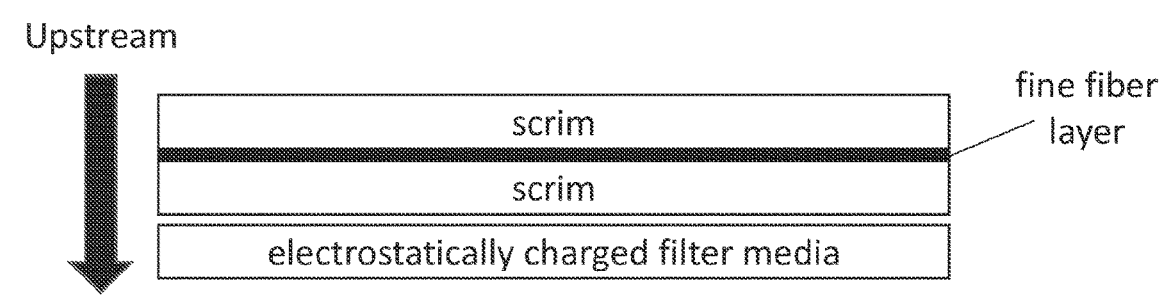
Downstream 1.10

4.66

FELT SIDE OF
FILTER PAPER

.75 ± .38

45 ±2
(NO. OF PLEATS)

14μm Bico 0.7μm PET

1μm Fibrillated Rayon 2.5μm PET

Upstream

Downstream

Upstream

Downstream

Upstream

| loading layer |
|---|

| loading layer |
|---|

700 nm-diameter PET

| scrim |
|---|

Downstream

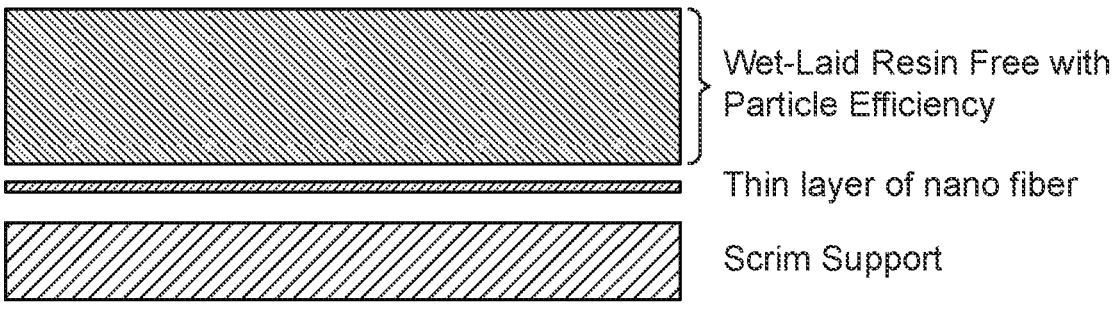
Wet-Laid Resin Free with Particle Efficiency
Thin layer of nano fiber
Scrim Support
FIG. 21C
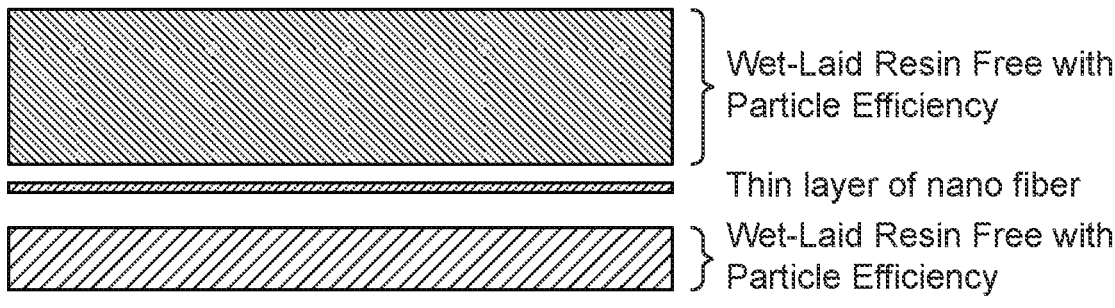
Wet-Laid Resin Free with Particle Efficiency
Thin layer of nano fiber
Wet-Laid Resin Free with Particle Efficiency
FIG. 21D
| Large Fibers |
| Mixed Fibers |
| Small Fibers |
| Large Fibers |
FIG. 22A

| Small Fibers |
| --- |
| Large Fibers |

UPSTREAM

DOWNSTREAM

| Commingled Small/Large Fibers |
| --- |
| Large Fibers |

UPSTREAM

DOWNSTREAM

| Large Fibers |
| --- |
| Small Fibers |
| Large Fibers |

UPSTREAM

DOWNSTREAM

| Large Fibers |
| --- |
| Commingled Small/Large Fibers |
| Large Fibers |

UPSTREAM

DOWNSTREAM

| Large Fibers |
|:---:|
| Small Fibers |
| Large Fibers |
| Small Fibers |
| Large Fibers |

UPSTREAM

DOWNSTREAM

| Large Fibers |
|:---:|
| Commingled Small/Large Fibers |
| Small Fibers |
| Large Fibers |

UPSTREAM

DOWNSTREAM

FILTER MEDIA, COMPOSITES, AND FACE MASK SYSTEMS USING SAME

CROSS REFERENCE TO RELATED APPLICATIONS

This application is the § 371 U.S. National Stage of International Application No. PCT/US2021/025676, filed 2 Apr. 2021, which claims the benefit of U.S. Provisional Application No. 63/004,464, filed 2 Apr. 2020, of U.S. Provisional Application No. 63/004,621, filed 3 Apr. 2020, of U.S. Provisional Application No. 63/004,926, filed 3 Apr. 2020, of U.S. Provisional Application No. 63/004,939, filed 3 Apr. 2020, of U.S. Provisional Application No. 63/004, 954, filed 3 Apr. 2020, of U.S. Provisional Application No. 63/024,894, filed 14 May 2020, of U.S. Provisional Application No. 63/042,943, filed 23 Jun. 2020, of U.S. Provisional Application No. 63/081,143, filed 21 Sep. 2020, and of U.S. Provisional Application No. 63/081,159, filed 21 Sep. 2020, the disclosures of each of which are incorporated by reference herein in their entireties.

BACKGROUND

Mask filters including face masks are designed to greatly reduce or prevent the transmission of liquids and/or airborne contaminants to a wearer from the ambient atmosphere. In medical environments, liquid sources may include respiratory droplets (for example, mucus), bodily fluids (for example, perspiration), saline, etc. Examples of potentially airborne contaminants include, for example, biological contaminants such as bacteria, viruses, fungal spores, etc.

SUMMARY OF THE INVENTION

This disclosure describes filter media, composites including filter media, and mask filters including those filter media.

As used herein, "fine fiber" refers to a fiber having a diameter of up to 10 micrometers (μm). In some embodiments, a fine fiber has a diameter of at least 50 nm or at least 100 nm.

As used herein, micron is equivalent to micrometer (μm).

As used herein, a "fiber" has an average fiber diameter of up to 100 micrometers. As used herein, fibers having an "average" diameter indicates that in a sample of a plurality of fibers, the average fiber diameter of that population of fibers in that sample has the indicated average fiber diameter. A population of fibers includes fibers having a diameter within 25% of an average fiber diameter. For example, a population of fibers having an average diameter of 1000 nm includes fibers having a diameter of at least 750 nm and up to 1250 nm. In another example, a population of fibers having an average diameter of 250 nm includes fibers having a diameter of at least 188 nm and up to 313 nm. In a further example, a population of fibers having an average diameter of 500 nm includes fibers having a diameter of at least 375 nm and up to 625 nm. In yet another example, a population of fibers having an average diameter of 1400 nm includes fibers having a diameter of at least 1050 nm and up to 1750 nm. Further, "fibers," as used herein, have an aspect ratio (that is, length to lateral dimension) of greater than 3:1, and preferably greater than 5:1. For example, fiberglass may have an aspect ratio of greater than 100:1. In this context, the "lateral dimension" is the width (in 2 dimensions) or diameter (in 3 dimensions) of a fiber. The term "diameter" refers either to the diameter of a circular cross-section of as fiber, or to a largest cross-sectional dimension of a non-circular cross-section of a fiber. Fiber lengths may be of finite lengths or infinite lengths, depending on the desired result.

Fiber diameter may be measured using a top-down SEM image. The sample may be sputter-coated. A useful sputter-coater may be a gold and palladium mixture including, for example, a Au:Pd 60:40 mixture. A more accurate fiber diameter measurement may be obtained by measuring the diameter of the fiber in at least 30 locations in the sample. Software such as a Trainable Weka Segmentation (an ImageJ plug-in) may be useful for analyzing fiber diameters.

A "mask filter" is defined as a filter element that is configured to filter the air flowing to a face receptacle defined by a face mask. A mask filter may form at least a portion of the face mask itself or may be a filter element that is separate or remote from the face mask and is configured to be in fluid communication with the face receptacle defined by the face mask.

"Face mask" is defined herein as a component that is configured to extend across at least a portion of a wearer's face. A face mask generally defines a face receptacle that is configured to receive at least a portion of a face of a wearer.

A "face mask system" is defined as a system that incorporates a face mask. A "face mask system" may include a face mask alone or a face mask in combination with a mask filter that is separate from the face mask and is configured to be in fluid communication with the face receptacle defined by the face mask. For example, the term "face mask system" includes surgical masks, procedure masks, isolation masks, laser masks, dental masks, patient care masks, filtering facepiece respirators, re-usable respirators including one or more replaceable filter elements, and powered air purifying respirators incorporating one or more filter elements designed to be replaced.

The term "particle size," as used herein, is refers to a particle's diameter, determined as described in ISO 11171: 2016.

As used herein, "continuous fine fiber" refers to a fine fiber having an aspect ratio (that is, length to lateral dimension) of at least 5,000, or, more preferably, at least 10,000. References herein to a continuous fine fiber layer refer to a layer that includes a continuous fine fiber (as opposed to a short cut fine fiber). While a continuous fine fiber layer is preferably formed by a fiber-forming process that produces a continuous fine fiber, the resulting layer may or may not include only one continuous fine fiber. That is, a continuous fine fiber layer may include one or more fine fiber shaving an aspect ratio of at least 5,000, or, more preferably, at least 10,000.

As used herein, "short cut fine fiber" refers to a fine fiber having an aspect ratio (that is, length to lateral dimension) of less than 5,000, less than 2,500, or less than 1,000. Typically, a short cut fine fiber has an aspect ratio of at least 10 and up to 5,000.

As used herein, "commingled" fibers or a "commingled fiber structure" refer to fibers having at least two different diameters, wherein fibers having an average first diameter and fibers having an average second diameter are commingled, that is, wherein fiber are mixed within the same layer (or strata) of a media structure as a result of the fibers having been formed or deposited simultaneously or by using very short (for example, up to 10 seconds, up to 20 seconds, or up to 30 seconds) pulses of each polymer solution. When visualized using a top-down SEM image, fibers having an average first diameter may be observed as being located both below and above fibers having an average second diameter.

As used herein, "layered" fibers or a "layered fiber structure" refer to fibers having at least two different diameters, wherein fibers having an average first diameter are not substantially entangled with the fibers having an average second diameter as a result of fibers of differing diameters having been alternately applied to a substrate.

As used herein, unless indicated otherwise, pore size (for example P5, P50, and P95) and ratios of pore sizes (for example, P95/P50) are determined using capillary flow porometry. Capillary flow porometry may be performed using a continuous pressure scan mode. It may be useful to use silicone oil, having a surface tension of 20.1 dynes/cm and a wetting contact angle of 0, as a wetting liquid. The sample may initially be tested dry, varying low pressure to high pressure, and then tested wet, again varying low pressure to high pressure. The test is typically performed at ambient temperature conditions (for example, 20° C. to 25° C.). 256 data points may be collected across the range of the scan of the pressures for both the dry curve and the wet curve. Typically, no tortuosity factor and/or a shape factor will be used (that is, for comparison to other test methods that use an adjustment factor, a factor equal to 1 may be used).

As used herein, a value P(x %) is the calculated pore size when the wet curve is equal to (100−x) % of the dry curve, as determined using the methodology described herein. Although a calculated value, this can be understood as representing the point at which x % of the overall flow through the layer passes through pores of that size or below. For example, P50 (the mean flow pore size) represents the point at which the wet curve is equal to half the dry curve, and may be viewed as the pore size such that 50% of the total flow through the layer is through pores of that size or below.

An average pore size (for example, average maximum pore size) may be calculated from the mean of at least three measurements (taken from at least three different sample locations. Individual measurements of maximum pore size (which may also be referred to as P100) may be detected at the bubble point, where the bubble point is found after fluid begins passing through the sample, and three consecutive measurements increase by at least 1%, where 256 data points are collected across the scan at a rate of approximately 17 data points per minute.

As used herein, the "β ratio" or "β" is the ratio of upstream particles to downstream particles under steady flow conditions (ISO 16889:2008), as described in the Examples. The more efficient the filter, the higher the β ratio. The β ratio is defined as follows:

$$\beta_d = \frac{N_{d,U}}{N_{d,D}}$$

where $N_{d,U}$ is the upstream particle count per unit fluid volume for particles of diameter d or greater and $N_{d,D}$ is the downstream particle count per unit fluid volume for particles of diameter d or greater. If present, the subscript attached to β indicates the particle size for which the ratio is being reported.

As used herein, "over-all β ratio" or "over-all β" is the ratio of the sum of all upstream particles over the course of the assay to the sum of all downstream particles over the course of the test (where the test is run to a pressure of 25 psi (172 kPa)):

$$\text{Over-all } \beta_d = \frac{\sum N_{d,U}}{\sum N_{d,D}}$$

where $N_{d,u}$ is the upstream particle count per unit fluid volume for particles of diameter d or greater and $N_{d,D}$ is the downstream particle count per unit fluid volume for particles of diameter d or greater. If present, the subscript attached to β indicates the particle size for which the ratio is being reported.

As used herein, "filtration efficiency" or "efficiency" refers to the percentage of the contaminant removed by the filter, calculated as follows:

$$e_d = 100\left(1 - \frac{1}{\beta_d}\right)$$

where e is the filtration efficiency and β is defined as indicated above. Thus, the efficiencies referred to herein are cumulative efficiencies. If present, the subscript attached to e indicates the particle size for which the ratio is being reported.

As used herein, "pressure drop" (also referred to herein as "dP" or "ΔP") relates to the pressure (exerted by a pump) necessary to force fluid through the filter or filter medium (prior to the addition of a contaminant) for a particular fluid velocity. Unless otherwise indicated, pressure drop is measured as described in ISO 3968:2017.

The term "substantially free of" as used herein indicates that the filter media does not contain an amount of the listed component (for example, glass fiber or resin) that contributes to the activity or action of the filter media to any substantial extent. The term is intended to include the inclusion of insignificant amounts of the component that do not provide any substantial contribution to the filter media's filtration properties. For example, a filter media that is substantially free of glass may include less than 1 wt-% glass fiber. For example, a filter media that is substantially free of resin may include less than 5 wt-% resin. For example, a filter media that is substantially free of glass may include less than 1 wt-% glass fiber. For example, a filter media that is substantially free of resin may include less than 5 wt-% resin.

The term "free of" as used herein indicates that the filter media does not contain an amount of the listed component (for example, glass fiber or resin). For example, a "glass-free" filter media does not include any glass and a "resin-free" media does not include any resin.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements.

By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

Unless otherwise specified, "a," "an," "the," and "at least one" are used interchangeably and mean one or more than one.

As used herein, the term "or" is generally employed in its usual sense including "and/or" unless the content clearly dictates otherwise.

The term "and/or" means one or all of the listed elements or a combination of any two or more of the listed elements.

Any reference to standard methods (for example, ASTM, TAPPI, AATCC, ISO, etc.) refers to the most recent available version of the method at the time of filing of this disclosure unless otherwise indicated.

Also herein, the recitations of numerical ranges by endpoints include all numbers subsumed within that range (for example, 1 to 5 includes 1, 1.5, 2, 2.75, 3, 3.80, 4, 5, etc.).

Herein, "up to" a number (for example, up to 50) includes the number (for example, 50).

The term "in the range" or "within a range" (and similar statements) includes the endpoints of the stated range.

For any method disclosed herein that includes discrete steps, the steps may be conducted in any feasible order. And, as appropriate, any combination of two or more steps may be conducted simultaneously.

All headings are for the convenience of the reader and should not be used to limit the meaning of the text that follows the heading, unless so specified.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

Unless otherwise indicated, all numbers expressing quantities of components, molecular weights, and so forth used in the specification and claims are to be understood as being modified in all instances by the term "about." As used herein in connection with a measured quantity, the term "about" refers to that variation in the measured quantity as would be expected by the skilled artisan making the measurement and exercising a level of care commensurate with the objective of the measurement and the precision of the measuring equipment used. Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

The above summary of the present invention is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

BRIEF DESCRIPTION OF THE FIGURES

FIG. 2H-FIG. 2M are schematic cross-sectional views of exemplary filter media including an electrostatically charged filter media, a fine fiber layer, and a scrim showing the direction of flow (black arrow, pointing from upstream to downstream).

FIG. 20C shows a schematic of an exemplary flatsheet, which, in some embodiments, may be prepared as described in Example 9.

FIG. 21A-FIG. 21D show exemplary filter media and filter element constructions, as further described herein.

FIG. 22A shows a schematic of an exemplary embodiment of a continuous fine fiber layer of a filter medium described herein that includes a mixture of fibers of different diameters in different strata of the continuous fine fiber layer.

Figures 1A, 1B:
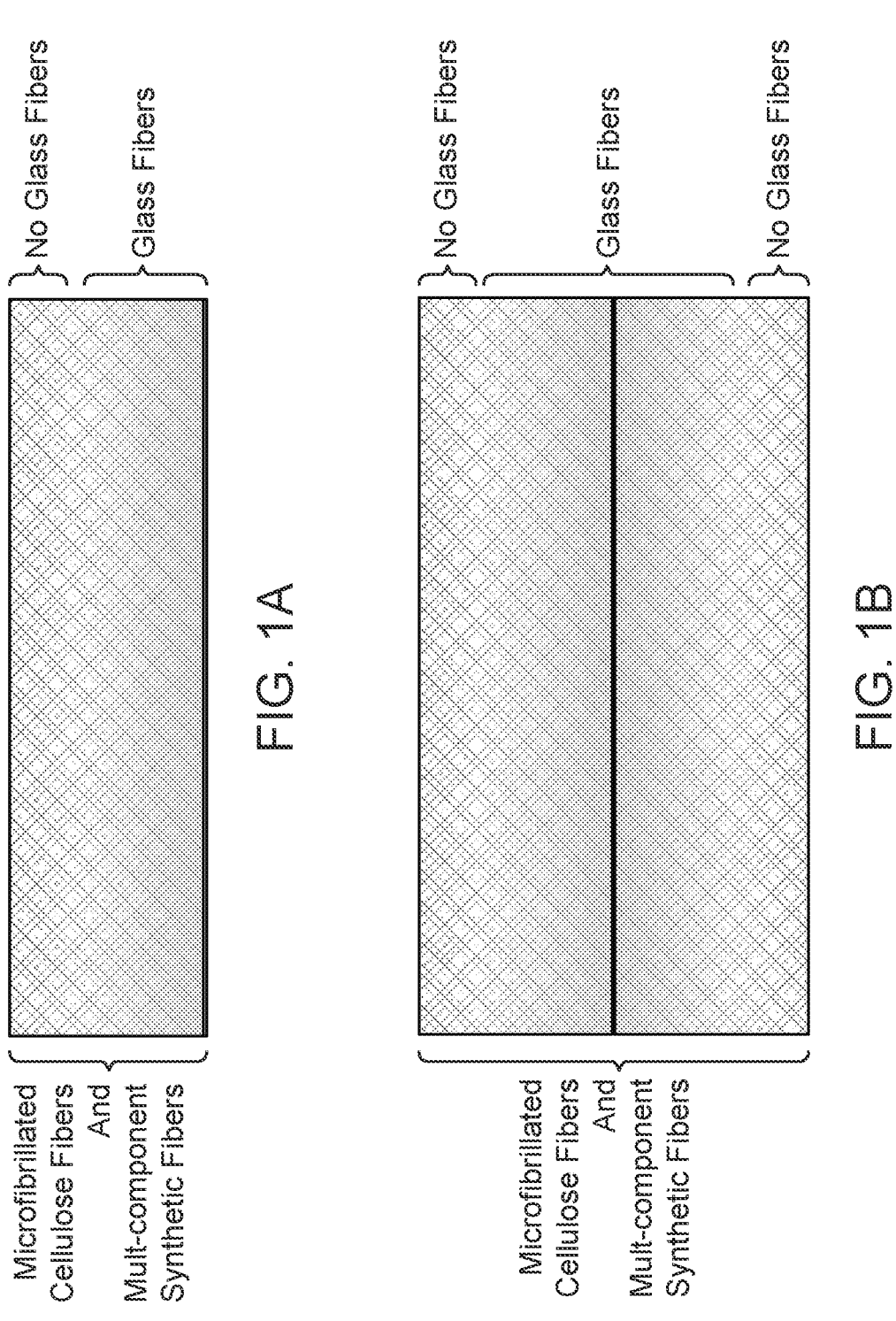
FIG. 1A is schematic cross-sectional view of a layer of an exemplary filter media of the present disclosure.
FIG. 1B is schematic cross-sectional view of an exemplary filter element that includes two layers of filter media of the present disclosure.

While the above-identified figures (which may or may not be drawn to scale) set forth embodiments of the invention, other embodiments are also contemplated, as noted in the discussion. In all cases, this disclosure presents the invention by way of representation and not limitation. It should be understood that numerous other modifications and embodiments may be devised by those skilled in the art, which fall within the scope of this invention.

DETAILED DESCRIPTION OF ILLUSTRATIVE EMBODIMENTS

In one aspect, this disclosure describes a nonwoven filtration media that includes a fibrous media including bicomponent fibers, glass fibers, and microfibrillated cellulose fibers. In another aspect, this disclosure describes a filter media including an electrostatically charged filter media, a fine fiber layer, and a scrim.

In a further aspect, this disclosure describes a filter media including two fine fiber layers, and two scrims.

In an additional aspect, this disclosure describes a glass-free filtration media and a glass-free composite that includes multiple layers of filtration media. In some embodiments, the filtration media or the composite preferably exhibit capacity and efficiency comparable to or better than similar glass-containing filtration media.

In yet another aspect, this disclosure describes a filter media that includes a support layer and a continuous fine fiber layer.

In some embodiments, the filter media is configured for air filtration.

In some embodiments, the filter media is preferably incorporated in a face mask system having a face mask. As defined above, a "face mask" is a component that is configured to extend across at least a portion of a wearer's face.

In some embodiments, a face mask as described herein may serve as an item of protective clothing designed to protect portions of the wearer's face, including the mucous membrane areas of the wearer's nose or mouth, from contact with airborne contaminants, such as bodily fluids. The face mask may act a barrier for the wearer to a hazard and, additionally or alternatively, the face mask may also act as a barrier that prevents the wearer from becoming a source of contamination.

In the following description, reference is made to the accompanying figures of the drawing which form a part hereof, and in which are shown, by way of illustration, specific embodiments. It is to be understood that other embodiments may be utilized and changes may be made without departing from the scope of the present invention.

Part A. Filter Media Including Microfibrillated Fibers

The nonwoven filtration media of the present disclosure includes a fibrous media including bicomponent fibers, glass fibers, and microfibrillated fibers. Such microfibrillated fibers are often used to enhance (that is, improve at least one property of, or create at least one new property in) the fibrous media. Such properties include, for example, strength (for example, tensile strength or burst strength), efficiency, durability, processability, filtration efficiency, or combinations thereof.

In some embodiments, the fibrous media may further include additional fibers that affect a property or feature of the media.

In some embodiments, the nonwoven filtration media may further include a nanofiber layer.

The fibrous "base media" forms a majority (that is, greater than 50%) of the total weight of the nonwoven filtration media. The fibrous media may include all components of the nonwoven filtration media with the exception of the nanofiber layer. Glass fiber media and bicomponent fiber media that may be used as the fibrous media are disclosed in, for example, U.S. Pat. Nos. 7,309,372, 7,314,497, and U.S. Pat. Pub. No. 2006/0096932. Such fibers are thermally bonded into a nonwoven web. Such media have useful pore size and filtration efficiencies from the combined fiber component.

In some embodiments, the microfibrillated cellulose fibers and bicomponent fibers are distributed uniformly throughout the thickness of the fibrous media. In some embodiments, including, for example, when the fibrous media is formed from two different furnishes, while the microfibrillated cellulose fibers and bicomponent fibers are distributed uniformly within each furnish and the microfibrillated cellulose fibers and bicomponent fibers will be distributed throughout the thickness of the fibrous media, the microfibrillated cellulose fibers and bicomponent fibers may not be uniformly distributed throughout the entire thickness of the resulting fibrous media.

As shown in FIG. 1, typically, and preferably, the glass fibers form a gradient throughout the thickness of a layer (that is, sheet) such that a high concentration of the glass fibers is positioned at one major surface of the layer (the bottom surface shown in FIG. 1) and little or no (generally less than 1 wt-%) glass fibers are positioned at the other major surface (the top surface shown in FIG. 1). In some embodiments, the glass fibers form a continuous gradient (that is, may exhibit a continuous increase (or decrease) in concentration of the glass fibers). In some embodiments, however, the glass fibers are present in discrete layers.

Referring to FIG. 2, the filter elements of the face mask systems of the present disclosure may include at least two layers or sheets of the media described herein. Each layer includes two major surfaces. Typically, and preferably, the microfibrillated cellulose fibers and bicomponent fibers are distributed uniformly throughout a layer of the media, and the glass fibers form a gradient from a high concentration at one major surface of the layer to little or no glass fibers at the other major surface. In some embodiments, the gradient may be a continuous gradient. The two major surfaces with the high glass concentration are oriented adjacent each other. Such orientation limits the glass fibers from escaping from the filtration element, particularly during use.

Herein, in a fibrous media or a non-woven filter media, the sum of the amounts of the components totals 100 wt-%.

Microfibrillated Fibers

The nonwoven filter media includes a microfibrillated fiber. As used herein, a microfibrillated fiber is a fiber that has been processed to develop fibers with a higher surface area, branched structure than unprocessed fibers.

In some embodiments, the microfibrillated fiber may be a microfibrillated acrylic fiber, including, for example, fibrillated CFF fibers (available from Engineered Fiber Technology, Shelton, CT). In some embodiments, the microfibrillated fiber may be a microfibrillated cellulose fiber including, for example, rayon such as Lyocell or TENCEL. In some embodiments, the microfibrillated fiber may be a microfibrillated para-aramid fiber including, for example, TWARON Pulp (Teijin Aramid, B.V., The Netherlands). In some embodiments, the microfibrillated fiber may be a microfibrillated liquid crystal polymer (LCP) fiber, including, for example, microfibrillated VECTRAN fibers (available from Engineered Fiber Technology, Shelton, CT). In some embodiments, the microfibrillated fiber may be a microfibrillated poly-p-phenylene benzobisoxazole (PBO) fiber including, for example, fibrillated ZYLON fibers (available from Engineered Fiber Technology, Shelton, CT).

As used herein, microfibrillated cellulose (MFC) refers to that material as defined by G. Chinga-Carrasco in Nanoscale Research Letters, 2011, 6:417: "MFC materials may be composed of (1) nanofibrils, (2) fibrillar fines, (3) fibre fragments and (4) fibres. This implies that MFC is not necessarily synonymous with microfibrils, nanofibrils or any other cellulose nano-structure. However, properly produced MFC materials contain nano-structures as a main component, i.e. nanofibrils." The diameters (or, for the microfibrillated cellulose fibers, the "lateral dimensions") of these components are reproduced in Table 1 of that same document and are as follows: (1) nanofibrils (<0.1 $\mu$m); (2) fibrillar fines (<1 $\mu$m); (3) fibres or fibre fragments (10 to 50 $\mu$m).

Furthermore, the term "microfibrillated cellulose," as used herein, does not include dry ground cellulose (also referred to as micronized cellulose or microfine cellulose) and does not include microcrystalline cellulose obtained by removing amorphous portions by acid hydrolysis, as described in U.S. Pat. No. 5,554,287.

In certain embodiments, the microfibrillated cellulose fibers used do not have a "tree structure" (as described in U.S. Pat. Pub. No. 2012/0043038) wherein the described fibrillation process causes external and internal segments of the fiber surface to partially detach from the main fiber structure and become fibrils attached by one segment to the main fiber structure. Such fibrils provide more structure on the fiber to attach to other fibers in a paper structure, for example. For certain embodiments, this is not desirable.

In some embodiments, a majority of the microfibrillated fibers have a lateral dimension (for example, width in 2 dimensions) of up to 1 micron, up to 1.5 microns, up to 2 microns, up to 3 microns, or up to 4 microns. In some embodiments, a majority of the microfibrillated fibers have a lateral dimension of at least 0.5 microns, or at least 0.7 microns. In an exemplary embodiment, a majority of the microfibrillated fibers have a lateral dimension in a range of 0.5 microns to 1.5 microns.

In certain embodiments of a nonwoven filtration media of the present disclosure, a majority (that is, greater than 50%)

of the microfibrillated cellulose fibers have a lateral dimension of up to 4 microns. In certain embodiments of a nonwoven filtration media of the present disclosure, a majority (that is, greater than 50%) of the microfibrillated cellulose fibers have a lateral dimension of 700 nm to 4 microns.

Although not intending to be limiting, the microfibrillated cellulose fibers may increase the strength, including wet strength, and/or filtration efficiency of the fibrous media. This occurs without the use of a resin (for example, synthetic resin such as phenolics, acrylics), as is known is certain filtration media, or with the use of reduced amounts of such resins. In certain embodiments of the present disclosure, nonwoven filtration media of the present disclosure include less than 15 wt-%, or less than 10 wt-%, or less than 5 wt-%, or less than 2 wt-% resin, based on the total weight of the nonwoven filtration media. Generally, no resin is used in nonwoven filtration media of the present disclosure.

Microfibrillated cellulose fibers may be made using conventional techniques. For example, microfibrillated cellulose may be made by the process disclosed in U.S. Pat. Pub. No. 2009/0221812. Briefly, this involves cellulose pulp being treated with a small amount of a wood degrading cellulase enzyme followed by high shear processing using a microfluidizer. Processing in the microfluidizer may be performed at pressures from 5000 pounds per square inch (psi) to 30000 psi using interaction chambers in a microfluidizer with sizes of 87 µm, 100 µm, and 200 µm using 1 to 3 passes through the equipment. Preferably, processing occurs using 1 pass through a 200-µm chamber at 5000 psi to 8000 psi.

In preferred embodiments, southern softwood cellulose microfibrillated fibers may be obtained by first enzyme treating the cellulose, denaturing of the enzyme using heat, and processing with high shear processing equipment. Fiber size may be controlled by processing conditions, that is, smaller interaction chamber size, more passes through the microfluidizer and/or higher operating pressure gives smaller fibers.

A plurality of microfibrillated fibers are incorporated within (that is, distributed throughout) the fibrous media, thereby forming a filter media (also referred to herein as a "filtration medium" or "filter medium").

In certain embodiments, the microfibrillated cellulose fibers are used in an amount effective to enhance at least one property of the fibrous media compared to the fibrous media without the microfibrillated cellulose fibers. Typically, the microfibrillated cellulose fibers are present in the fibrous media in an amount of at least 1 weight percent (wt-%), or at least 2 wt-%, or at least 3 wt-%, based on the total weight of the nonwoven fibrous media. The microfibrillated cellulose fibers are present in the fibrous media in an amount of up to 49 wt-%, or up to 20 wt-%, or up to 18 wt-%, based on the total weight of the fibrous media.

Glass Fibers

The glass fiber provides pore size control and cooperates with the other fibers in the media to obtain a media of substantial flow rate, high capacity, and substantial efficiency.

"Glass fiber" is fiber made using glass of various types. The glass fibers used in media of the present disclosure include glass types known by the designations: A, C, D, E, Zero Boron E, ECR, AR, R, S, S-2, N, and the like, and generally, any glass that may be made into fiber either by drawing processes used for making reinforcement fibers or spinning processes used for making thermal insulation fibers.

For certain embodiments, the glass fibers have an average lateral dimension (typically, a diameter) of at least 0.5 micron (that is, 500 nm), and often at least 1 micron. For certain embodiments, the glass fibers have an average lateral dimension (typically, a diameter) of no greater than 30 microns, no greater than 20 microns, and often no greater than 15 microns. Typically, fiberglass fibers have a lateral dimension of at least 500 nm, and often no greater than microns. In certain embodiments, glass fiber is typically used as a collection of fibers of diameter about 0.1 to 10 micrometers and an aspect ratio (length divided by diameter) of about to 10,000.

In certain embodiments, glass fibers are present in the fibrous media in an amount of at least 10 wt-%, or at least 20 wt-%, based on the total weight of the fibrous media. In certain embodiments, glass fibers are present in the fibrous media in an amount of up to 80 wt-%, or up to 50 wt-%, based on the total weight of the fibrous media.

In some embodiments, the fibrous media may have two major surfaces, and the glass fibers may form a gradient from a high concentration of glass fibers at one major surface to little or no glass fibers at the other major surface. For example, in an exemplary embodiment, the glass fibers are present in an amount of 10 wt-% to 80 wt-% based on the total weight of the fibrous media at one major surface and in an amount of 0 wt-% to 10 wt-% based on the total weight of the fibrous media at the other major surface.

Bicomponent Binder Fibers

The filter media includes a bicomponent fiber. Any suitable bicomponent fiber may be used, and the bicomponent fiber may be selected depending on the intended use for the media.

In some embodiments, the filter media includes at least 25 wt-%, at least 30 wt-%, at least 35 wt-%, at least 40 wt-%, at least 45 wt-%, at least 50 wt-%, at least 55 wt-%, at least 60 wt-%, at least 65 wt-%, or at least 70 wt-% of the bicomponent fiber. In some embodiments, the filter media includes up to 30%, up to 35 wt-%, up to 40 wt-%, up to 45 wt-%, up to 50 wt-%, up to 55 wt-%, up to 60 wt-%, up to 65 wt-%, up to 70 wt-%, up to 75 wt-%, or up to 85 wt-% of the bicomponent fiber. In an exemplary embodiment, the filter media includes 25 wt-% to 85 wt-% of the bicomponent fiber. In another exemplary embodiment, the filter media includes 25 wt-% to 75 wt-% of the bicomponent fiber. In yet another exemplary embodiment, the filter media includes 25 wt-% to 70 wt-% of the bicomponent fiber. In a further exemplary embodiment, the filter media includes 50 wt-% of the bicomponent fiber.

In some embodiments, the bicomponent fiber has a fiber diameter of at least 1 micron, at least 5 microns, at least 10 microns, at least 15 microns, or at least 20 microns. In some embodiments, the bicomponent fiber has a fiber diameter of up to 5 microns, up to 10 microns, up to 15 microns, up to 20 microns, up to 25 microns, or up to 30 microns. In an exemplary embodiment, the bicomponent fiber has a fiber diameter in a range of 5 microns to 25 microns. In another exemplary embodiment, the bicomponent fiber has a fiber diameter of 14 microns.

In some embodiments, the bicomponent fiber has a fiber length of at least 0.1 cm, at least 0.5 cm, or at least 1 cm. In some embodiments, the bicomponent fiber has a fiber length of up to 0.5 cm, up to 1 cm, up to 5 cm, up to 10 cm, or up to 15 cm. In an exemplary embodiment, the bicomponent fiber has a fiber length in a range of 0.1 cm to 15 cm. In another exemplary embodiment, the bicomponent fiber has a fiber length of 6 mm.

In some embodiments, the bicomponent fiber includes a structural polymer portion and a thermoplastic binder polymer portion, the structural polymer portion having a melting point of higher than that of the binder polymer portion.

The structural polymer portion and the binder polymer portion may be made out of any suitable materials. For example, the structural polymer portion may include PET and the binder polymer portion may include copolymer PET (coPET). In additional examples, the structural polymer portion may include PET and the binder polymer portion may include Polyethylene (PE), PET, nylon, polypropylene (PP), polytetrafluoroethylene (PTFE), polyethersulfone (PES), polyphenylene sulfide (PPS), meta-aramids, or para-aramids. In further examples, the binder polymer portion may include polyethylene (PE), poly lactic acid (PLA), nylon, ethylene vinyl alcohol (EVOH), polyvinyl chloride (PVC), polyvinylidene fluoride (PVDF) (for example, KYNAR) or any other polymer or modified polymer that is designed with a lower melting temperature than the core structure polymer.

In some embodiments, the structural polymer portion is the core and the thermoplastic binder polymer portion is the sheath of the bicomponent fiber.

In some embodiments, the structural polymer portion of the bicomponent fiber has a melting point of at least 240° C. and the binder polymer portion of the bicomponent fiber has a melting point of up to 115° C. An exemplary bicomponent fiber wherein the structural polymer portion has a melting point of at least 240° C. and the binder polymer portion has a melting point of up to 115° C. is 271P, a 14 μm-diameter fiber available from Advansa (Hamm, Germany).

In some embodiments, the structural polymer portion of the bicomponent fiber has a melting point of at least 240° C. and the binder polymer portion of the bicomponent fiber has a melting point in a range of 100° C. to 190° C. In one exemplary embodiment, the structural polymer portion of the bicomponent fiber has a melting point of at least 240° C. and the binder polymer portion of the bicomponent fiber has a melting point in a range of 120° C. to 170° C. In another exemplary embodiment the structural polymer portion of the bicomponent fiber has a melting point of at least 240° C. and the binder polymer portion of the bicomponent fiber has a melting point in a range of 140° C. to 160° C.

Exemplary bicomponent fibers wherein the structural polymer portion has a melting point of at least 240° C. and the binder polymer portion has a melting point of in a range of 100° C. to 190° C. are TJ04CN (having a binder polymer portion melting point of 110° C.), TJ04BN (having a binder polymer portion melting point of 150° C.), both available from Teijin Fibers Limited of Osaka, Japan; 271P (having a binder polymer portion melting point of 110° C.), available from Advansa of Hamm, Germany; and T-202 or T-217 (each having a binder polymer portion melting point of 180° C.), both available from Fiber Innovation Technology, Inc. of Johnson City, TN.

In some embodiments, the bicomponent fiber may include a first bicomponent fiber and a second bicomponent fiber. In an exemplary embodiment, the bicomponent fiber may include a first bicomponent fiber wherein the structural portion has a melting point of at least 240° C. and the binder polymer portion has a melting point of up to 115° C. and a second bicomponent fiber wherein the structural polymer portion has a melting point of at least 240° C. and the binder polymer portion has a melting point in a range of 100° C. to 190° C. For example, the bicomponent fiber may include both Advansa 271P and TJ04BN.

Optional Additional Fibers

In some embodiments, the fibrous media may further include additional fibers that affect a property or feature of the media.

In some embodiments, the fibrous media may further include a PET fiber, a dyed fiber, a conductive fiber, or a combination thereof. A combination may include a mixture (e.g., a PET fiber and a conductive fiber) or an overlapping combination (e.g., a dyed PET fiber).

In some embodiments, the PET fiber may have a diameter intermediate between the diameter of the glass fibers or microfibrillated cellulose fibers (both approximately 1 μm) and the diameter of the bicomponent fibers (approximately 14 μm). In some embodiments, the PET fiber may have a diameter of at least 2 μm, at least 3 μm, at least 4 μm, at least 5 μm, at least 6 μm, or at least 7 μm. In some embodiments, the PET fiber may have a diameter of up to 3 μm, up to 4 μm, up to 5 μm, up to 6 μm, up to 7, or up to 8 μm. In an exemplary embodiment, the PET fiber may have a diameter in a range of 2 μm to 3 μm. In another exemplary embodiment, the PET fiber may include Teijin TP04N (0.06 dtex×3 mm) (Teijin Fibers, Limited, Tokyo, Japan).

Without wishing to be bound by theory, it is believed that the use of a fiber having a diameter intermediate between the diameter of the glass fibers and the microfibrillated cellulose fibers and the diameter of the bicomponent fibers helps to improve the stability of the structure, preventing the shifting of the smaller fibers during use of the media.

In some embodiments, the PET fiber may include a crimped PET fiber. For example, in an exemplary embodiment, a crimped PET fiber includes Teijin TA34A (2.2 dtex×10 mm) (Teijin Fibers, Limited, Tokyo, Japan).

Without wishing to be bound by theory, it is believed that the use of a crimped fiber may increase the loft of the structure.

In some embodiments, the additional fiber may include a dyed fiber including, for example, a dyed PET fiber. For example, in an exemplary embodiment, a dyed PET fiber includes a Minifiber blue PET fiber (5.0 denier×6 mm) (MiniFIBERS, Inc., Johnson City, TN). A dyed fiber may be used to visualize the orientation of the media including, for example, which surface includes glass fibers. In some embodiments, it may be preferable to use an amount of dyed fiber which does not substantially affect the performance of the filter media.

In some embodiments, the additional fiber may include a conductive material. In an exemplary embodiment, the additional fiber may include a carbon fiber and/or an activated carbon fiber.

In some embodiments, the additional fiber may include an absorptive material. In an exemplary embodiment, the additional fiber may include an activated carbon fiber.

Fine Fiber Layer

If included, the fine fiber layer may include a continuous fine fiber layer as described in the Continuous Fine Fiber section of Section F.

In some embodiments, the fine fiber layer may be an electrospun layer. When the fine fiber layer is be an electrospun layer, the fine fibers may be directly deposited on the fibrous media. In embodiments where the glass fibers form a gradient from a high concentration at one major surface of the layer to little or no glass fibers at the other major surface, the fine fibers may be directly deposited on the side of the fibrous media having a high concentration of glass fibers.

In embodiments where the fine fibers are directly deposited on the fibrous media by electrospinning, it may be advantageous to include a conductive fiber in the fibrous media. In an exemplary embodiment, the conductive fiber may include a carbon fiber and/or an activated carbon fiber.

Without wishing to be bound by theory, it is believed that the addition of a fine fiber layer may increase strength of the fibrous media, mitigating glass fiber migration, and/or the addition of a fine fiber layer may provide an addition means of capturing glass fibers and preventing them from migrating downstream.

In an exemplary embodiment, the fine fiber layer may include Ultra-Web, available from Donaldson Company, Inc. (Bloomington, MN).

Preparation of Filter Media Including Microfibrillated Cellulose

A filter media of the present disclosure that includes microfibrillated cellulose is made up of randomly oriented array of a combination of multi-component fiber(s), microfibrillated cellulose fibers, and glass fibers. This media may be prepared by methods such as wet-laid or air-laid processing. Preferably, the process is a wet-laid process. The fibers are bonded together using the fusible (that is, melt-bonding) polymer in the multi-component fibers.

In certain embodiments of the present disclosure, nonwoven filtration media of the present disclosure include less than 15 wt-%, or less than 10 wt-%, or less than 5 wt-%, or less than 2 wt-% resin, based on the total weight of the nonwoven filtration media. Generally, no resin is used in nonwoven filtration media of the present disclosure.

A general wet-laid process of making the filter media of the present disclosure involves making a dispersion of multi-component fibers, glass fibers, and microfibrillated fibers, and optional additives in an aqueous liquid, draining the liquid from the resulting dispersion to yield a wet composition, and adding heat to form, bond and dry the wet nonwoven composition to form the filter media.

In the preferred method of wet-laid processing, the filter media is made from a dilute (0.05 wt-% to 5 wt-% solids in the furnish) aqueous furnish comprising a dispersion of fibrous material in an aqueous medium. The aqueous liquid of the dispersion is generally water, but may include various optional additives such as pH adjusting materials, surfactants, defoamers, flame retardants, viscosity modifiers, media treatments, colorants, and the like. The aqueous liquid is usually drained from the dispersion by conducting the dispersion onto an inclined screen or other perforated support retaining the dispersed solids and passing the liquid to yield a wet paper composition. The wet composition, once formed on the support, is usually further dewatered by vacuum or other pressure forces and further dried by evaporating the remaining liquid. After liquid is removed, thermal bonding takes place typically by melting some portion of the thermoplastic fiber or other portion of the formed material. The melt material binds the components into a mechanically stable layer or sheet.

The media described herein may be made on equipment of any scale from laboratory hand-screen or hand sheet proportions to commercial-sized papermaking. For a commercial scale process, the filter media is generally processed through the use of inclined screen papermaking-type machines such as commercially available Fourdrinier, wire cylinder, Stevens Former, Roto Former, Inver Former, Venti Former, and inclined Delta Former machines. Preferably, an inclined Delta Former machine is utilized.

To obtain the gradient of the glass fibers, a dual headbox wet-laid former machine is typically used. In some embodiments, the headbox may preferably include an inclined wire headbox.

In some embodiments, when the fibrous media is formed from two fiber mixtures (an upstream mixture and a downstream mixture), the fibrous media may include each mixture in a mass ratio in a range of 20/80 to 80/20, in a range of 25/75 to 75/25, in a range of 30/70 to 70/30, or in a range of 35/65 to 65/35. In an exemplary embodiment, the filter media exhibits a mass ratio in a range of 20/80 to 80/20. In another exemplary embodiment, the filter media exhibits a mass ratio in a range of 35/65 to 65/35.

Part B. Filter Media Including an Electrostatically Charged Filter Media

In some aspects, the filter media includes an electrostatically charged filter media, a fine fiber layer, and a scrim. (See FIG. 2A-FIG. 2F.)

The fine fiber layer is preferably in intimate contact with the scrim. (See FIG. 2A-FIG. 2C.) In some embodiments, the fine fiber layer may be formed by being deposited on the scrim.

Figure 2A:
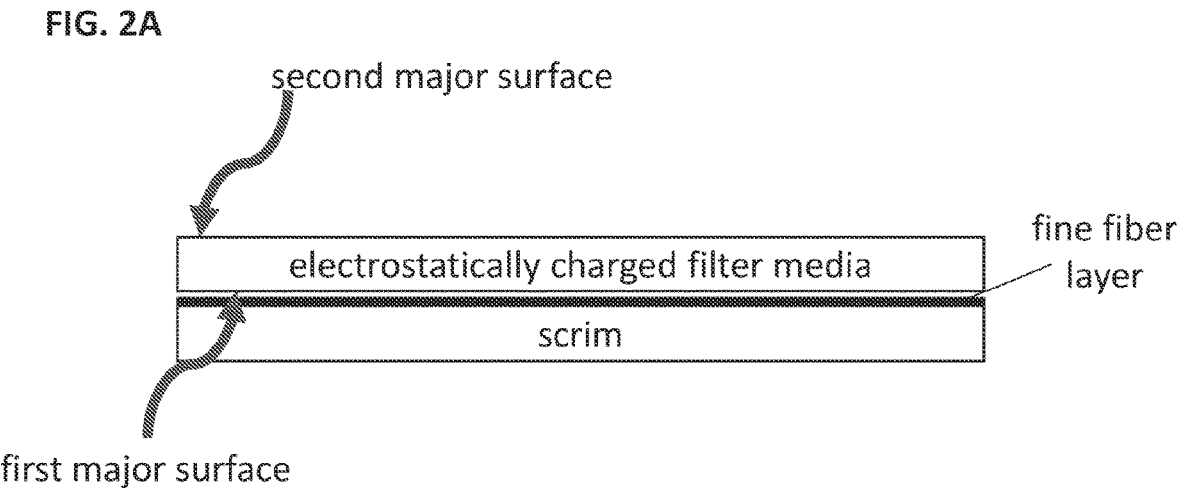
FIG. 2A-FIG. 2F are schematic cross-sectional views of exemplary filter media including an electrostatically charged filter media, a fine fiber layer, and a scrim.
Figure 2B:
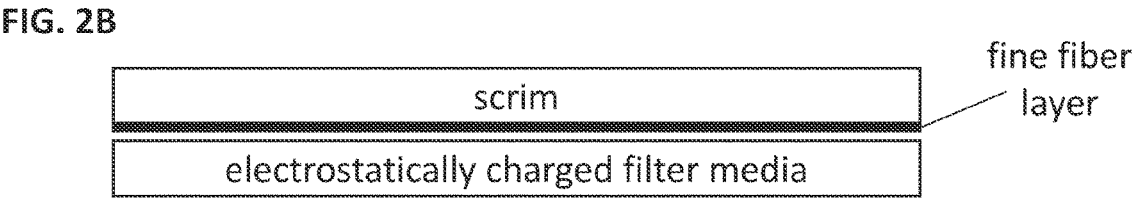
Figure 2C:
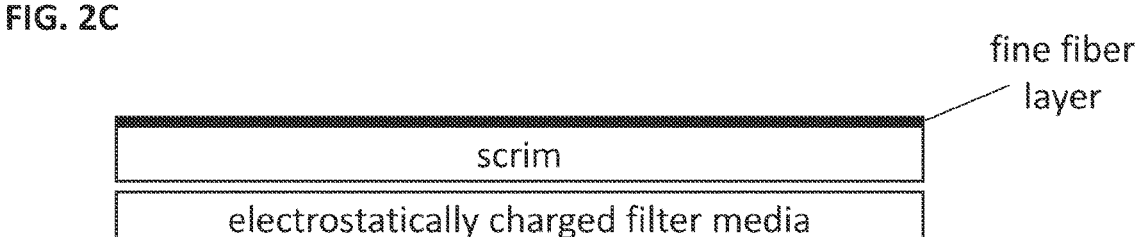

The electrostatically charged filter media has a first major surface and a second major surface. (See FIG. 2A.) In some embodiments, the first major surface is adjacent to the fine fiber layer. (See FIG. 2A-FIG. 2B.) In some embodiments, the first major surface is preferably in contact with the fine fiber layer. Alternatively, the first major surface of the electrostatically charged filter media may be adjacent to a first major surface of the scrim, and the fine fiber layer may be adjacent to the second major surface of the scrim. (FIG. 2C.)

Figure 2D:
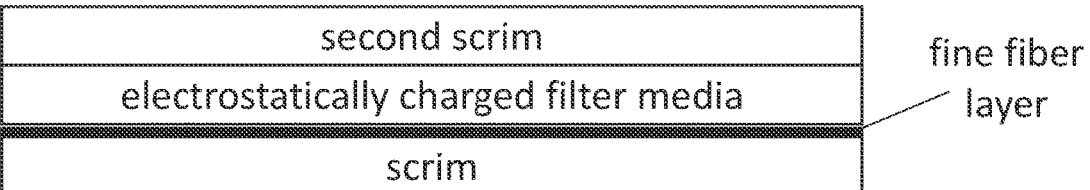
Figure 2E:
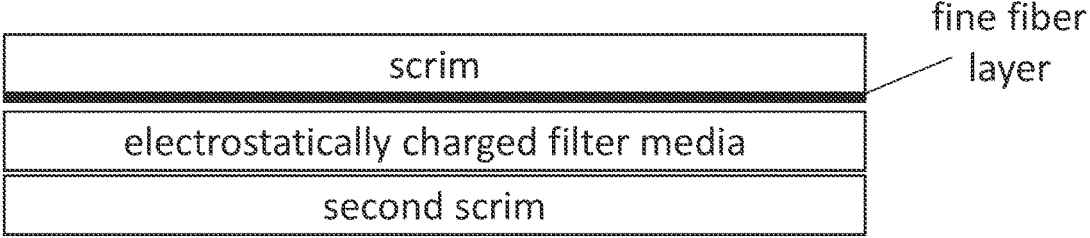
Figure 2F:
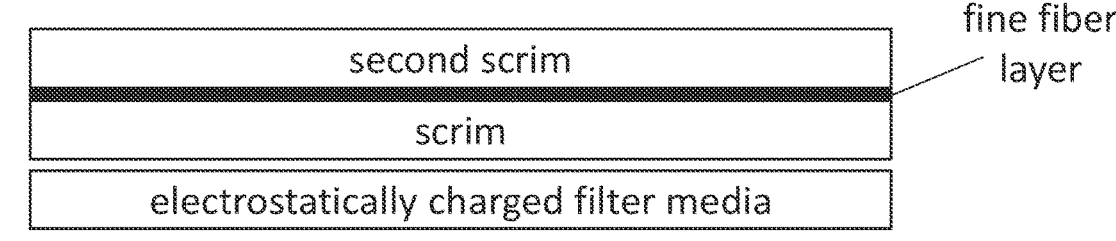

In some embodiments, the filter media may further include a second scrim. (FIG. 2D-FIG. 2F.)

In some embodiments, where the first major surface of the electrostatically charged filter media is in contact with the fine fiber layer, the second scrim may be in contact with the second major surface of the electrostatically charged filter media. (FIG. 2D.)

In some embodiments, where the fine fiber layer is located between the first major surface of the electrostatically charged filter and the first scrim, the second scrim may be adjacent to (or in contact with) the second major surface of the electrostatically charged filter media. (FIG. 2E.)

In some embodiments, the fine fiber layer may be located between the two scrims. When the fine fiber layer is located between the two scrims it may be adjacent to one or more of the scrims or additional layers may be located between the scrim and the fine fiber layer.

The scrim layer in intimate contact with the fine fiber layer may be located on the upstream or the downstream side of the electrostatically charged filter media. (FIG. 2H-FIG. 2M.) In some embodiments, however, the electrostatically charged filter media is located upstream of the fine fiber layer. (FIG. 2H.) Such a configuration may be beneficial because the electrostatically charged filter media may provide protection for the fine fiber layer during handling of the material.

In some embodiments, either the electrostatically charged filter media or a scrim is located upstream of the fine fiber layer. (FIG. 2H, FIG. 2I, FIG. 2K-FIG. 2M.) Such a configuration may be beneficial because the electrostatically charged filter media or the scrim provides protection for the fine fiber layer during handling of the material.

Although the electrostatically charged filter media may exhibit a high permeability or air flow in the absence of a fine fiber layer and scrim, the addition of the fine fiber layer further increases the efficiency of the fine fiber layer, allowing the resulting filter media to meet certain standards related to liquid particle removal, as further discussed below. Moreover, the fine fiber layer increases efficiency without significantly decreasing flexibility of the electrostatically charged filter media (allowing for incorporation into a filter element and/or a face mask) and without significantly decreasing permeability (allowing the wearer of a face mask to breathe freely).

Electrostatically Charged Filter Media

In some embodiments, the filter media includes an electrostatically charged filter media. The electrostatically charged filter media may, in some embodiments, include a melt-blown layer.

Additionally or alternatively, in some embodiments, the electrostatically charged filter media includes a layer that is not melt-blown. At the time of the invention, melt-blown was in short supply, making alternative materials particularly advantageous. An exemplary electrostatically charged filter media that is not melt-blown is an electrostatic media that overlays all or part of a scrim material.

The term "electrostatic charging" refers to a process that places a charge in and/or on a dielectric material such as a polyolefin. The charge typically includes layers of positive or negative charges trapped at or near the surface of the polymer, or charge clouds stored in the bulk of the polymer. The charge may also include polarization charges which are frozen in alignment of the dipoles of the molecules. Methods of subjecting a material to an electric charge are well known by those skilled in the art. These methods include, for example, thermal, liquid-contact, electron beam, plasma, and corona discharge methods.

The electrostatic media may be triboelectric media, electret media, or any other media that may be charged, or that depends on charging as the main mechanism for particle removal. In example embodiments, the electrostatic media include triboelectric fibers. Triboelectric fibers are known and may be formed, for example, using a mixture of (1) polyolefin fibers such as polyethylene, polypropylene or ethylene and propylene copolymers, with (2) fibers of another polymer, for example, fibers containing hydrocarbon functions substituted by halogen atoms, such as chlorine or polyacrylonitrile fibers. In general, the polyolefin fibers and the other polymer fibers are included in the electrostatic media at a weight ratio between about 60:40 or about 20:80 or about 30:70.

Melt-Blown

In some embodiments, the electrostatically charged filter media includes an electrostatically charged melt-blown filter layer.

In certain embodiments, the melt-blown filter layer is electrostatically charged. The charge may be induced triboelectrically or by applying a high voltage charge. The former is a result of rubbing the fibers against a grounded, conductive surface, or rubbing two different fibers against each other (one is more electropositive and the other is more electronegative).

Alternatively, electrostatic charging may be carried out using, for example, corona discharge or plasma discharge methods. Such methods are known to one of skill in the art.

In certain embodiments, the electrostatically charged melt-blown filter layer of the filter media of the present disclosure is a high-efficiency filter layer. In certain embodiments, an electrostatically charged melt-blown filter layer displays a filtration efficiency of at least 50% with 0.4-micron size DEHS (di-ethyl-hexyl-sebacat) particles at its rated velocity. Preferably, the filtration efficiency is at least 65%, or at least 85%, or at least 95%, or at least 99.5%, or at least 99.95% of 0.4-micron size or the most penetrating particle size particles. In certain embodiments, if not electrostatically charged, a melt-blown filter layer displays a filtration efficiency of at least 10% with 0.4-micron size DEHS (di-ethyl-hexyl-sebacat) particles at its rated velocity.

Electrostatic Media Overlaying Scrim

In some embodiments, the electrostatically charged filter media may include an electrostatic material overlaying all or part of a scrim.

The electrostatic material may contain various fibers including electrostatic fibers. The electrostatic material is optionally a mixed fiber media comprising polypropylene and acrylic fibers. The term "electrostatic fibers," as used herein, refers to fibers that contain an electric charge. One advantage of including electrostatic fibers is that the fiber are not only able to mechanically trap contaminants, but are also able to exert an electrostatic force on contaminants that contain electric charges, thereby increasing the amount of contaminants that are removed from the airstream.

The electrostatic material may have, for example, a permeability of between about 250 ft./min. at 0.5 inches of water and about 750 ft./min. at 0.5 inches of water or between about 280 ft./min. at 0.5 inches of water and about 750 ft./min. at 0.5 inches of water.

The electrostatic material may have a filtering efficiency of about 20% to about 99.99% for 20 to 30 micron particulate contaminants in some embodiments.

Suitable electrostatic material may, for example, have a filtering efficiency of greater than 20% for 20 to 30 micron particulate contaminants; greater than 40% for 20 to 30 micron particulate contaminants; or greater than 60% for 20 micron to 30 micron particulate contaminants.

The electrostatic material may have in some example implementations a filtering efficiency of less than 99.99% for 20 micron to 30 micron particulate contaminants; less than 80% for 20 micron to 30 micron particulate contaminants; or less than 60% for 20 micron to 30 micron particulate contaminants.

A permeable scrim may form at least a portion of the media structure, the electrostatic material at least partially covering the permeable scrim. In an example embodiment the electrostatic material will overlay all or most of the permeable scrim. In some embodiments the electrostatic material and scrim are combined together before production of the filter assembly (such as, for example, by lamination, heat bonding, or light calendaring) and subsequently formed into a media structure that creates at least a portion of the filter assembly.

In some embodiments, the permeable scrim may be a polypropylene scrim An exemplary polypropylene scrim has a permeability of approximately 500 feet per minute at 0.5 inches of water. Additional exemplary scrim materials are provided below.

In an exemplary embodiment, the electrostatically charged filter media may include Technostat (Hollingsworth & Vose, East Walpole, MA) or Technostat Plus (Hollingsworth & Vose, East Walpole, MA).

Fine Fiber Layer

Each fine fiber layer may include a continuous fine fiber layer such as that described in the Continuous Fine Fiber section of Section F.

Support Layer

The filter media comprises a support layer (also referred to as a "scrim").

Any suitable support layer may be used.

In some embodiments, the support layer preferably has a relatively high air permeability and/or a relatively low basis weight.

The support layer may include or be made of any suitable porous material. The support layer may, in some embodiments, preferably be polymeric.

Examples of suitable material for the support layer include spunbond, wetlaid, carded, or melt-blown nonwoven materials, or combinations thereof including, for example, a spunbond-meltblown-spunbond. Fibers may be in the form of wovens or nonwovens. Examples of synthetic nonwovens include polyester nonwovens, nylon nonwovens, polyolefin (for example, polypropylene) nonwovens, polycarbonate nonwovens, or blended or multicomponent nonwovens thereof. Sheet-like support layers (for example, cellulosic, synthetic, and/or glass or combination webs) are typical examples of filter support layers. Other examples of suitable support layers include polyester or bicomponent polyester fibers or polypropylene/polyethylene terephthalate, or poly-ethylene/polyethylene terephthalate bicomponent fibers in a spunbond.

In some embodiments, the support layer comprises a plurality of fibers or strands. The fibers or strands of the support layer be continuous or non-continuous. Continuous fibers (for example, strands) and are made by a "continuous" fiber-forming process, such as a meltblown process, a melt-spun, an extrusion process, woven yarns, laid scrims, and/or a spunbond process, and typically have longer lengths than non-continuous fibers as described in more detail below. Non-continuous fibers are, for example, staple fibers that are generally cut (for example, from a filament) or formed as non-continuous discrete fibers to have a particular length or a range of lengths.

In certain embodiments, the plurality of fibers or strands of the support layer include synthetic fibers or strands (for example, synthetic polymer fibers or strands). The synthetic fibers or strands of the support layer may be continuous fibers. Non-limiting examples of suitable synthetic fibers/strands include polyester, polyaramid, polyimide, polyolefin (for example, polyethylene such as high density polyethyl-ene, low density polyethylene, and/or linear low density polyethylene), ethylene-vinyl acetate, polyacrylamide, poly-lactic acid, polypropylene, Kevlar, Nomex, halogenated polymers (for example, polyethylene terephthalate), acryl-ics, polyphenylene oxide, polyphenylene sulfide, thermo-plastic elastomers (for example, thermoplastic polyure-thane), polymethyl pentene, and combinations thereof.

In some embodiments, the average pore size of the support layer is 100 microns or less and often at least 0.5 micron.

In some embodiments, the porosity of the support scrim is 20% or greater and typically no more than 90%.

Exemplary support layers include those available under the tradenames FINON C303NW and FINON C3019 NW from Midwest Filtration in Cincinnati, Ohio or those avail-able under the tradename CEREX 23200 (Cerex Advanced Fabrics, Inc., Cantoment, FL). CEREX 23200 includes nylon 6,6, has a thickness of 8.4 mils (0.21 mm), a basis weight of 67.8 g/m², a solidity of 28%, and a permeability per solidity of 615.1. Pore sizes for CEREX 23200 are shown in Table 8. Other exemplary scrim materials are described, for example, in U.S. Pat. Pub. 2009/0120868.

Part C. Filter Media Including Two Fine Fiber Layers and Two Scrims

Figure 2G:
FIG. 2G is a schematic cross-sectional view of an exemplary filter media including two fine fiber layers, and two scrims.

In other aspects, this disclosure describes a filter media that includes two fine fiber layers, and two support layers. (FIG. 2G.)

In some embodiments, each scrim includes a first major surface and a second major surface and one major surface of each scrim is adjacent to a fine fiber layer. In some embodi-ments, one major surface of each support layer is preferably in contact with a fine fiber layer.

The fine fiber layers may include any of the fine fiber layers or features of the fine fiber layers described in Part B of this disclosure.

The support layer may include any of the support layers or features of the support layers described in Part B of this disclosure.

Part D. Glass-Free Filter Media

In one aspect this disclosure describes a filter media that is preferably glass-free. The filter media is a non-woven filter media.

In some embodiments, the filter media may include a filter media as described in the application having the title "FIL-TRATION MEDIA", filed on even date herewith as inter-national application PCT/US2021/025673.

In some embodiments, the nonwoven filter media includes: a bicomponent fiber, a first fiber comprising poly-ethylene terephthalate (PET) and having a fiber diameter of 0.1 microns to 1 micron, a second fiber comprising PET and having a fiber diameter of 1 micron to 5 microns, and a microfibrillated fiber.

In an exemplary embodiment, the nonwoven filter media includes: 25 wt-% to 75 wt-% of a bicomponent fiber having a fiber diameter of 5 microns to 25 microns and a fiber length of 0.1 cm to 15 cm; 10 wt-% to 50 wt % of a first fiber including polyethylene terephthalate (PET) and having a fiber diameter of 0.1 microns to 1 microns; and 10 wt-% to 25 wt % of a second fiber including PET and having a fiber diameter of 1 microns to 5 microns; and 10 wt-% to 25 wt % of a microfibrillated fiber, wherein a majority of the microfibrillated fibers have a lateral dimension of up to 4 microns.

In some embodiments, one or more of the fibers is selected or treated to alter the electrostatic charge of the media. The charge typically includes layers of positive or negative charges trapped at or near the surface of the polymer, or charge clouds stored in the bulk of the polymer. The charge may also include polarization charges which are frozen in alignment of the dipoles of the molecules. Methods of subjecting a material to an electric charge are well known by those skilled in the art. These methods include, for example, thermal, liquid-contact, electron beam, plasma, and corona discharge methods.

Bicomponent Fibers

The filter media includes a bicomponent fiber. Any suit-able bicomponent fiber may be used, and the bicomponent fiber include any bicomponent fiber (or combination thereof) described in the Bicomponent Fiber section of Part A of this disclosure.

Small Efficiency Fiber

The filter media includes a "small efficiency fiber" wherein the "small efficiency fiber" as used herein is a fiber having a fiber diameter of at least 0.1 micron and less than 1 micron.

In some embodiments, the small efficiency fiber is pref-erably a PET fiber. In some embodiments, the small effi-ciency fiber may consist essentially of PET. In some embodiments, the small efficiency fiber may consist of PET.

Additionally or alternatively, the small efficiency fiber may include nylon, an acrylic, rayon, polypropylene, poly-ethylene, ethylene vinyl alcohol (EVOH), poly lactic acid (PLA), polyvinyl alcohol (PVA), polyvinyl chloride (PVC), polytetrafluoroethylene (PTFE), or other suitable meltable polymers.

In some embodiments, the filter media includes at least 5 wt-%, at least 10 wt-%, at least 15 wt-%, at least 20 wt-%, at least 25 wt-%, at least 30 wt-%, at least 35 wt-%, at least 40 wt-%, or at least 45 wt-% of the small efficiency fiber. In some embodiments, the filter media includes up to 15 wt-%, up to 20 wt-%, up to 25 wt-%, up to 30 wt-%, up to 35 wt-%, up to 40 wt-%, up to 45 wt-%, up to 50 wt-%, or up to 55 wt-% of the small efficiency fiber. In an exemplary embodiment, the filter media includes 5 wt-% to 50 wt-% of the small efficiency fiber. In another exemplary embodiment, the filter media includes 10 wt-% to 50 wt-% of the small efficiency fiber. In yet another exemplary embodiment, the filter media includes 10 wt-% to 40 wt-% of the small efficiency fiber. In a further exemplary embodiment, the filter media includes 10 wt-% to 25 wt-% of the small efficiency fiber.

In some embodiments, the small efficiency fiber has a fiber diameter of at least 0.1 micron, at least 0.2 micron, at least 0.3 micron, at least 0.4 micron, at least 0.5 micron, at least 0.6 micron, or at least 0.7 micron. In some embodiments, the small efficiency fiber has a fiber diameter of up to 0.7 micron, up to 0.8 micron, up to 0.9 micron, or less than 1 micron. For example, in an exemplary embodiment, the small efficiency fiber has a fiber diameter of at least 0.4 micron and less than 1 micron. In another exemplary embodiment, the small efficiency fiber has a fiber diameter in a range of 0.6 micron to 0.8 micron. In a further exemplary embodiment, the small efficiency fiber has a fiber diameter of 0.7 micron.

In the Examples, the small efficiency fiber is a PET fiber having a fiber diameter of 0.7 micron.

In some embodiments, the small efficiency fiber has a length of at least 0.5 mm, at least 1 mm, or at least 1.5 mm. In some embodiments, the small efficiency fiber has a length of up to 10 mm, up to 11 mm, up to 12 mm, or up to 15 mm. In an exemplary embodiment, the small efficiency fiber has a length in a range of 1 mm to 15 mm. In a further exemplary embodiment, the small efficiency fiber has a length in a range of 1 mm to 12 mm.

In some embodiments, when the small efficiency fiber includes PET, the PET of the small efficiency fiber preferably has a melting point of at least 250° C., more preferably at least 275° C., even more preferably at least 290° C.

Large Efficiency Fiber

The filter media further includes a "large efficiency fiber" wherein a "large efficiency fiber" as used herein is a fiber having a fiber diameter in a range of 1 micron to 5 microns.

In some embodiments, the large efficiency fiber is preferably a PET fiber. In some embodiments, the large efficiency fiber may consist essentially of PET. In some embodiments, the large efficiency fiber may consist of PET.

Additionally or alternatively, the large efficiency fiber may include nylon, an acrylic, rayon, polypropylene, polyethylene, ethylene vinyl alcohol (EVOH), poly lactic acid (PLA), polyvinyl alcohol (PVA), polyvinyl chloride (PVC), polytetrafluoroethylene (PTFE), or other suitable meltable polymers.

In some embodiments, the filter media includes at least 10 wt-%, at least 15 wt-%, at least 20 wt-%, at least 25 wt-%, or at least 30 wt-% of the large efficiency fiber. In some embodiments, the filter media includes up to 15 wt-%, up to 20 wt-%, up to 25 wt-%, up to 30 wt-%, up to 35 wt-% of the large efficiency fiber, up to 40 wt-% of the large efficiency fiber, up to 45 wt-% of the large efficiency fiber, or up to 50 wt-% of the large efficiency fiber. In an exemplary embodiment, the filter media includes 10 wt-% to 50 wt-% of the large efficiency fiber. In another exemplary embodiment, the filter media includes 10 wt-% to 40 wt-% of the large efficiency fiber. In another exemplary embodiment, the filter media includes 10 wt-% to 25 wt-% of the large efficiency fiber.

In some embodiments, the large efficiency fiber has a fiber diameter of at least 1 micron, at least 1.5 microns, at least 2 microns, at least 3 microns, or at least 4 microns. In some embodiments, the large efficiency fiber has a fiber diameter of up to 1.5 microns, up to 2 microns, up to 3 microns, up to 4 microns, or up to 5 microns. For example, in an exemplary embodiment, the large efficiency fiber has a fiber diameter in a range of 2 microns to 4 microns. In another exemplary embodiment, the large efficiency fiber has a fiber diameter in a range of 2 microns to 3 microns. In yet another exemplary embodiment, the large efficiency fiber has a fiber diameter of 2.5 microns. In a further exemplary embodiment, the large efficiency fiber has a fiber diameter of 2.7 microns.

In the Examples, the small efficiency fiber is a PET fiber having a fiber diameter of 2.7 microns.

In some embodiments, the large efficiency fiber has a length of at least 0.5 mm, at least 1 mm, or at least 1.5 mm. In some embodiments, the large efficiency fiber has a length of up to 10 mm, up to 11 mm, up to 12 mm, or up to 15 mm. In an exemplary embodiment, the large efficiency fiber has a length in a range of 1 mm to 15 mm. In a further exemplary embodiment, the large efficiency fiber has a length in a range of 1 mm to 12 mm.

In some embodiments, when the large efficiency fiber includes PET, the PET of the large efficiency fiber preferably has a melting point of at least 250° C., more preferably at least 275° C., even more preferably at least 290° C.

Microfibrillated Fibers

The nonwoven filter media includes a microfibrillated fiber. Any suitable microfibrillated fiber may be used, and the microfibrillated fiber may be any of those described in the Microfibrillated Fiber section of Part A of this disclosure.

Features of the Non-Woven Filter Media

In some embodiments, the nonwoven filter media has a solidity of at least 2%, at least 3%, at least 4%, at least 5%, at least 6%, at least 7%, at least 8%, at least 9%, or at least 10%. In some embodiments, the nonwoven filter media has a solidity of up to 5%, up to 6%, up to 7%, up to 8%, up to 9%, up to 10%, up to 11%, up to 12%, up to 13%, up to 14%, up to 15%, up to 16%, up to 17%, up to 18%, up to 19%, or up to 20%. In an exemplary embodiment, the nonwoven filter media has a solidity in a range of 5% to 15%. In some embodiments, solidity is preferably measured as described in the Examples.

In some embodiments, the nonwoven filter media has a basis weight of at least 20 grams per square meter (g/m$^2$), at least 24 g/m$^2$, at least 25 g/m$^2$, at least 30 g/m$^2$, at least 35 g/m$^2$, at least 40 g/m$^2$, at least 50 g/m$^2$, at least 60 g/m$^2$, or at least 70 g/m$^2$. In some embodiments, the nonwoven filter media has a basis weight of up to 25 g/m$^2$, up to 30 g/m$^2$, up to 35 g/m$^2$, up to 40 g/m$^2$, up to 50 g/m$^2$, up to 60 g/m$^2$, up to 70 g/m$^2$, up to 75 g/m$^2$, up to 80 g/m$^2$, up to 85 g/m$^2$, up to 90 g/m$^2$, up to 95 g/m$^2$, up to 100 g/m$^2$, or up to 105 g/m$^2$. In an exemplary embodiment, the nonwoven filter media has a basis weight in a range of 24 g/m$^2$ to 100 g/m$^2$. In some embodiments, basis weight is preferably measured using ASTM D646-13.

In some embodiments, the nonwoven filter media has a pore size of at least 0.5 micron, at least 1 micron, at least 1.5 microns, at least 2 microns, at least 3 microns, at least 5 microns, or at least 10 microns. In some embodiments, the nonwoven filter media has a pore size of up to microns, up to 10 microns, up to 15 microns, or up to 20 microns. In an exemplary embodiment, the nonwoven filter media has a pore size of 0.5 micron to 20 microns. In an exemplary embodiment, the nonwoven filter media has a pore size of 2 microns to 15 microns. Pore size, as used herein, refers to mean flow pore size, calculated as described in ASTM F316-03.

In some embodiments, the nonwoven filter media has a P95/P50 ratio of at least 1.5 or at least 2. In some embodiments, the nonwoven filter media has a P95/P50 ratio of up to 3.

In some embodiments, the nonwoven filter media has a thickness of at least 0.1 mm, at least 0.12 mm, at least 0.15 mm, or at least 0.2 mm. In some embodiments, the nonwoven filter media has a thickness of up to 0.2 mm, up to 0.4 mm, up to 0.5 mm, up to 0.7 mm, or up to 1 mm. In some embodiments, thickness of the filter media has is preferably measured according to the TAPPI T411 om-15 test method using a foot pressure of 1.5 psi.

In some embodiments, the nonwoven filter media has a permeability of at least 1 ft$^3$/ft$^2$/min at 0.5 inches of water, at least 5 ft$^3$/ft$^2$/min at 0.5 inches of water, or at least ft$^3$/ft$^2$/min at 0.5 inches of water. In some embodiments, the nonwoven filter media has a permeability of up to 10 ft$^3$/ft$^2$/min at 0.5 inches of water, up to 20 ft$^3$/ft$^2$/min at 0.5 inches of water, up to 50 ft$^3$/ft$^2$/min at 0.5 inches of water, up to 75 ft$^3$/ft$^2$/min at 0.5 inches of water, or up to 100 ft$^3$/ft$^2$/min at 0.5 inches of water. In an exemplary embodiment, the nonwoven filter media has a permeability in a range of 1 ft$^3$/ft$^2$/min at 0.5 inches of water to 100 ft$^3$/ft$^2$/min at 0.5 inches of water. In another exemplary embodiment, the nonwoven filter media has a permeability in a range of 10 ft$^3$/ft$^2$/min at 0.5 inches of water to 75 ft$^3$/ft$^2$/min at 0.5 inches of water. In some embodiments, air permeability is preferably measured according to ASTM D737-18.

In some embodiments, the nonwoven filter media is substantially free of resin. In some embodiments, the nonwoven filter media does not include a resin. At the time of the invention, resin was often used to maintain spacing of the fibers in a filter media and to prevent instability of the media. However, resin blocks the pores in a filter medium, reducing filter media solidity and, therefore, life.

Without wishing to be bound by theory, it is believed that using microfibrillated fiber in combination with the large efficiency fibers (having a fiber diameter in a range of 1 micron to 5 microns) is particularly beneficial to allowing the filter media to be substantially free of resin. The microfibrillated fiber are believed to provide more tensile strength, helping to maintain spacing of the fibers. Moreover, the large efficiency fibers are believed to provide more uniform pore structures.

In some embodiments, a nonwoven filter media includes bicomponent fiber in a range of 25 wt-% to 85 wt-%. Using less than 25 wt-% bicomponent fiber is expected to result in a media with inadequate strength because the binder portion of the bicomponent fiber helps hold the media together during use. Using more than 85 wt-% bicomponent fiber would result in a media without enough of the other fibers to provide the desired efficiency and uniform structure.

In some embodiments, a nonwoven filter media includes a small efficiency fiber (having a fiber diameter of at least 0.1 micron and less than 1 micron) in an amount in a range of 5 wt-% to 50 wt-%. Using less than 5 wt-% of the small efficiency fibers often results in a media that did not provide the desired efficiency (for example a (34 μm greater than 10). Using more than 50 wt-% of the small efficiency fibers would increase pressure drop and often results in a weaker media because the fibers were not in contact with another fiber that would help hold them in the media.

In some embodiments, a nonwoven filter media includes a large efficiency fiber (having a fiber diameter in a range of 1 micron to 5 microns) in an amount in a range of 10 wt-% to 50 wt-%. Using less than 10 wt-% of the large efficiency fibers often results in a media that has irregular pore sizes. Using more than 50 wt-% of the large efficiency fibers often results in a media that does not include enough small efficiency fibers to attain the desired efficiency or enough bicomponent fiber to provide the needed strength during use.

In some embodiments, a nonwoven filter media includes a microfibrillated fiber in an amount in a range of 5 wt-% to 25 wt-%. Using less than 5 wt-% of the microfibrillated fiber often results in a media with insufficient strength during use and low efficiency. Using more than 25 wt-% of the microfibrillated fiber often results in irregular pore sizes (as indicated by a high P95/P50 ratio).

In the past, low melt PET fibers were sometimes used as a substitute for resin. However, these fibers melt during manufacture of the nonwoven filter media and, like resin, block the pores in the filter medium, reducing solidity and, therefore, life.

Part E. Glass-Free Composite

In another aspect, this disclosure describes a composite that includes multiple nonwoven filter media. Each of the nonwoven filtration media are preferably substantially glass-free or glass-free.

In some embodiments, the composite may include a composite as described in the application having the title "FILTRATION COMPOSITES" and, filed on even date herewith as international application PCT/US2021/025674.

The composite includes a first nonwoven filter media, an optional second nonwoven filter media, and a third nonwoven filter media. The first nonwoven filtration media includes a first bicomponent fiber; a first large efficiency fiber having a fiber diameter in a range of 1 micron to 5 microns; and a first microfibrillated fiber. The second nonwoven filtration media, if present, includes a second bicomponent fiber; a second large efficiency fiber having a fiber diameter in a range of 1 micron to 5 microns; and a second microfibrillated fiber. The third nonwoven filter media includes a small efficiency fiber having a fiber diameter of at least 0.1 micron and less than 1 micron. As used herein, a "large efficiency fiber" is a fiber having a fiber diameter in a range of 1 micron to 5 microns. As used herein, a "small efficiency fiber" is a fiber having a fiber diameter of at least 0.1 micron and less than 1 micron.

In some embodiments, the small efficiency fiber preferably includes polyethylene terephthalate (PET). In some embodiments the first large efficiency fiber preferably includes PET. In some embodiments the second large efficiency fiber preferably includes PET.

In some embodiments, one or more of the fibers of the composite or a layer of the composite may be selected or treated to alter the electrostatic charge of the media. The charge typically includes layers of positive or negative charges trapped at or near the surface of the polymer, or charge clouds stored in the bulk of the polymer. The charge may also include polarization charges which are frozen in alignment of the dipoles of the molecules. Methods of subjecting a material to an electric charge are well known by those skilled in the art. These methods include, for example, thermal, liquid-contact, electron beam, plasma, and corona discharge methods.

In some embodiments, the composite further includes a support layer.

In some embodiments, the first nonwoven filter media, the optional second nonwoven filter media, if present, and the third nonwoven filter media are discrete layers. That is, a gradient does not exist between the first nonwoven filter media and the second nonwoven filter media or between the second nonwoven filter media and the third nonwoven filter media. If no second nonwoven filter media is present, a gradient does not exist between the first nonwoven filter media and the third nonwoven filter media.

In some embodiments, the first nonwoven filter media is in contact with the second nonwoven filter media, and the second nonwoven filter media is in contact with the third nonwoven filter media. When the composite further includes a support layer, the third nonwoven filter media may be in contact with the support layer.

In some embodiments, the composite is configured for a liquid to pass through the first nonwoven filter media, then the second nonwoven filter media, and then the third nonwoven filter media.

In some embodiments, when the composite includes a support layer, the composite is configured for a liquid to pass through the first nonwoven filter media, then the second nonwoven filter media, then the third nonwoven filter media, and then the support layer.

In some embodiments, the first nonwoven filter media is in contact with the third nonwoven filter media. When the composite further includes a support layer, the third nonwoven filter media may be in contact with the support layer.

In some embodiments, the composite is configured for a liquid to pass through the first nonwoven filter media, then the third nonwoven filter media. When the composite further includes a support layer, the composite is configured for a liquid to pass through the first nonwoven filter media, then the third nonwoven filter media, and then the support layer.

In some embodiments, the composite is substantially free of resin. In some embodiments, the composite does not include a resin.

In some embodiments, the composite is substantially free of glass including, for example, a glass fiber. In some embodiments, the composite does not include glass.

In an exemplary embodiment, the composite includes a first nonwoven filter media, an optional second nonwoven filter media, and a third nonwoven filter media. The first nonwoven filter media includes: 40 wt-% to 90 wt-% of a first bicomponent fiber having a fiber diameter in a range of 5 microns to 50 microns and a fiber length of 0.1 cm to 15 cm; 0 wt-% to 25 wt % of a first large efficiency fiber; and 10 wt-% to 60 wt % of a first microfibrillated fiber, wherein a majority of the microfibrillated fibers have a lateral dimension of up to 4 microns. The optional second nonwoven filter media includes: 40 wt-% to 90 wt-% of a second bicomponent fiber having a fiber diameter in a range of 5 microns to 50 microns and a fiber length of 0.1 cm to 15 cm; 0 wt-% to 25 wt % of a second large efficiency fiber; and 10 wt-% to 60 wt % of a second microfibrillated fiber, wherein a majority of the microfibrillated fibers have a lateral dimension of up to 4 microns. The third nonwoven filter media includes a small efficiency fiber.

As described in Example 8, the addition of a 1 μm-diameter electrospun fine fiber layer to a filter media composite increased the efficiency of the composite compared to the composite without the fine fiber layer. As further described in Example 9 and as shown in FIG. 20C, the fine fiber layer may be replaced by a layer including a small efficiency fine fiber—and the resulting composite is expected to have similar efficiency as the composite including the fine fiber layer.

The results of Example 8 were unexpected because it has been previously reported that creating an interface between media layers is undesirable and a gradient structure should be pursued instead. (See, for example, US Publication No. 2014/0360145.) Without wishing to be bound by theory, it is believed that the creation of an interface between media layers (including, for example a layer of non-woven filtration media including a layer including a small efficiency fine fiber and a layer of filtration media acting as a loading layer) may allow for higher efficiency than the use of gradient structure because the non-uniformities of each layer do not align throughout the depth of the media.

First and Second Nonwoven Filter Media

The first nonwoven filter media and optional second nonwoven filter media, if present, each include a bicomponent fiber, a large efficiency fiber having a fiber diameter in a range of 1 micron to 5 microns, and a microfibrillated fiber.

In some embodiments, either or both of the first and second nonwoven filtration media act as loading layers, that is a filter medium that distributes the locations where contaminants are collected across the depth of the media. An exemplary embodiment in which both of the first and second nonwoven filtration media act as loading layers is described in FIG. 20C. An exemplary embodiment wherein the second nonwoven filtration is not included is shown in FIG. 20B.

In some embodiments, either or both of the first and second nonwoven filter media has a solidity of at least 2%, at least 3%, at least 4%, at least 5%, at least 6%, at least 7%, at least 8%, at least 9%, or at least 10%. In some embodiments, the nonwoven filter media has a solidity of up to 5%, up to 6%, up to 7%, up to 8%, up to 9%, up to 10%, up to 11%, up to 12%, up to 13%, up to 14%, up to 15%, up to 16%, up to 17%, up to 18%, up to 19%, or up to 20%. In an exemplary embodiment, the first nonwoven filter media has a solidity in a range of 5% to 15%. In an exemplary embodiment, the second nonwoven filter media has a solidity in a range of 5% to 15%. In some embodiments, solidity is preferably measured as described in the methods for Examples 5-9.

In some embodiments, either or both of the first and second nonwoven filter media has a basis weight of at least 20 g/m², at least 24 g/m², at least 25 g/m², at least 30 g/m², at least 35 g/m², at least 40 g/m², at least 50 g/m², at least 60 g/m², or at least 70 g/m². In some embodiments, the nonwoven filter media has a basis weight of up to 25 g/m², up to 30 g/m², up to 35 g/m², up to 40 g/m², up to 50 g/m², up to 60 g/m², up to 70 g/m², up to 75 g/m², up to 80 g/m², up to 85 g/m², up to 90 g/m², up to 95 g/m², up to 100 g/m², or up to 105 g/m². In an exemplary embodiment, the first nonwoven filter media has a basis weight in a range of 24 g/m² to 100 g/m². In an exemplary embodiment, the second nonwoven filter media has a basis weight in a range of 24 g/m² to 100 g/m². In some embodiments, basis weight is preferably measured using ASTM D646-13.

In some embodiments, either or both of the first and second nonwoven filtration media has a pore size of at least 0.5 microns, at least 1 micron, at least 1.5 microns, at least 2 microns, at least 3 microns, at least 5 microns, or at least 10 microns. In some embodiments, the nonwoven filter media has a pore size of up to 5 microns, up to 10 microns, up to 15 microns or up to 20 microns. In an exemplary embodiment, the first nonwoven filter media has a pore size of 0.5 microns to 20 microns. In an exemplary embodiment, the second nonwoven filter media has a pore size of 0.5 microns to 20 microns. In another exemplary embodiment, the first nonwoven filter media has a pore size of 2 microns to 15 microns. In another exemplary embodiment, the second nonwoven filter media has a pore size of 2 microns to 15 microns. Pore size, as used herein, refers to mean flow pore size, calculated as described in ASTM F316-03.

In some embodiments, either or both of the first and second nonwoven filtration media has a thickness of at least 0.1 mm, at least 0.12 mm, at least 0.15 mm, or at least 0.2 mm. In some embodiments, the nonwoven filter media has a thickness of up to 0.2 mm, up to 0.4 mm, up to 0.5 mm, up to 0.7 mm, or up to 1 mm. In an exemplary embodiment, the first nonwoven filter media has a thickness in a range of 0.12 mm to 1 mm. In an exemplary embodiment, the second nonwoven filter media has a thickness in a range of 0.12 mm to 1 mm. In some embodiments, thickness of the filter media has is preferably measured according to the TAPPI T411 om-15 test method using a foot pressure of 1.5 psi.

In some embodiments, either or both of the first and second nonwoven filtration media has a permeability of at least 1 ft$^3$/ft$^2$/min at 0.5 inches of water, at least 5 ft$^3$/ft$^2$/min at 0.5 inches of water, or at least 10 ft$^3$/ft$^2$/min at 0.5 inches of water. In some embodiments, the nonwoven filter media has a permeability of up to 10 ft$^3$/ft$^2$/min at 0.5 inches of water, up to 20 ft$^3$/ft$^2$/min at 0.5 inches of water, up to 50 ft$^3$/ft$^2$/min at 0.5 inches of water, up to 75 ft$^3$/ft$^2$/min at 0.5 inches of water, or up to 100 ft$^3$/ft$^2$/min at 0.5 inches of water. In an exemplary embodiment, the first nonwoven filter media has a permeability in a range of 1 ft$^3$/ft$^2$/min at 0.5 inches of water to 100 ft$^3$/ft$^2$/min at 0.5 inches of water. In an exemplary embodiment, the second nonwoven filter media has a permeability in a range of 1 ft$^3$/ft$^2$/min at 0.5 inches of water to 100 ft$^3$/ft$^2$/min at 0.5 inches of water. In another exemplary embodiment, the first nonwoven filter media has a permeability in a range of 10 ft$^3$/ft$^2$/min at 0.5 inches of water to 75 ft$^3$/ft$^2$/min at 0.5 inches of water. In another exemplary embodiment, the second nonwoven filter media has a permeability in a range of 10 ft$^3$/ft$^2$/min at 0.5 inches of water to 75 ft$^3$/ft$^2$/min at 0.5 inches of water. In some embodiments, air permeability is preferably measured according to ASTM D737-18.

In some embodiments, either or both of the first and second nonwoven filtration media is substantially free of resin. In some embodiments, either or both of the first and second nonwoven filtration media does not include a resin.

In some embodiments, either or both of the first and second nonwoven filtration media is substantially free of a glass fiber. In some embodiments, either or both of the first and second nonwoven filtration media does not include a glass fiber.

Bicomponent Fiber

The first and second filtration media each include a bicomponent fiber. Any suitable bicomponent fiber may be used for each filter media, and the bicomponent fiber may be selected depending on the intended use for the media. Each bicomponent fiber may be any of those described in the Bicomponent Fiber section of Part A of this disclosure.

Large Efficiency Fiber

The first and second filtration media may each include a "large efficiency fiber" wherein a "large efficiency fiber" as used herein is a fiber having a fiber diameter in a range of 1 micron to 5 microns. In some embodiments, one or both of the first and second filtration media does not include large efficiency fiber.

In some embodiments, the large efficiency fiber is preferably a PET fiber. In some embodiments, the large efficiency fiber may consist essentially of PET. In some embodiments, the large efficiency fiber may consist of PET.

Additionally or alternatively, the small efficiency fiber may include nylon, an acrylic, rayon, polypropylene, polyethylene, ethylene vinyl alcohol (EVOH), poly lactic acid (PLA), polyvinyl alcohol (PVA), polyvinyl chloride (PVC), polytetrafluoroethylene (PTFE), or other suitable meltable polymers.

In some embodiments, each of the first and second filtration media includes at least 0 wt-%, at least 0.1 wt-%, at least 1 wt-%, at least 5 wt-%, at least 10 wt-%, at least 15 wt-%, at least 20 wt-%, or at least 25 wt-% of the large efficiency fiber. In some embodiments, each of the first and second filtration media include up to 15 wt-%, up to 20 wt-%, or up to 25 wt-% of the large efficiency fiber. In an exemplary embodiment, the first filter media includes 0 wt-% to 25 wt-% of the large efficiency fiber. In an exemplary embodiment, the second filter media includes 0 wt-% to 25 wt-% of the large efficiency fiber. In another exemplary embodiment, the first filter media includes 10 wt-% to 25 wt-% of the large efficiency fiber. In another exemplary embodiment, the second filter media includes 10 wt-% to 25 wt-% of the large efficiency fiber.

In some embodiments, the large efficiency fiber has a fiber diameter of at least 1 micron, at least 1.5 microns, at least 2 microns, at least 3 microns, or at least 4 microns. In some embodiments, the large efficiency fiber has a fiber diameter of up to 1.5 microns, up to 2 microns, up to 3 microns, up to 4 microns, or up to 5 microns. For example, in an exemplary embodiment, the large efficiency fiber has a fiber diameter in a range of 2 microns to 4 microns. In another exemplary embodiment, the large efficiency fiber has a fiber diameter of 2.7 microns. In a further exemplary embodiment, the large efficiency fiber has a fiber diameter of 2.5 microns.

In the Examples, the large efficiency fiber includes PET and has a fiber diameter of 2.7 microns.

In some embodiments, the large efficiency fiber has a length of at least 0.5 mm, at least 1 mm, or at least 1.5 mm. In some embodiments, the large efficiency fiber has a length of up to 10 mm, up to 11 mm, up to 12 mm, or up to 15 mm. In an exemplary embodiment, the large efficiency fiber has a length in a range of 1 mm to 15 mm. In a further exemplary embodiment, the large efficiency fiber has a length in a range of 1 mm to 12 mm.

In some embodiments, when the large efficiency fiber includes PET, the PET has a melting point of at least 250° C., more preferably at least 275° C., even more preferably at least 290° C.

Microfibrillated Fiber

The first and second filtration media each include a microfibrillated fiber. Any suitable microfibrillated fiber may be used, and the microfibrillated fiber may be any of those described in the Microfibrillated Fiber section of Part A of this disclosure.

Third Nonwoven Filter Media

The third nonwoven filter media includes a "small efficiency fiber" wherein the "small efficiency fiber" as used herein is a fiber having a fiber diameter of at least 0.1 micron and less than 1 micron.

In some embodiments, the small efficiency fiber preferably includes PET. In some embodiments, the small efficiency fiber may consist essentially of PET. In some embodiments, the small efficiency fiber may consist of PET.

Additionally or alternatively, the small efficiency fiber may include nylon, an acrylic, rayon, polypropylene, polyethylene, ethylene vinyl alcohol (EVOH), poly lactic acid (PLA), polyvinyl alcohol (PVA), polyvinyl chloride (PVC), polytetrafluoroethylene (PTFE), or other suitable meltable polymers.

In some embodiments, the third nonwoven filter media may include fibers and components in addition to the small efficiency fiber. These additional fibers and components may include bicomponent fibers, a monocomponent thermally meltable fiber, resin, etc.

When the third nonwoven filter media may include fibers and components in addition to the small efficiency fiber, the third nonwoven filter media preferably includes at least 10 wt-%, at least 15 wt-%, at least 20 wt-%, at least 25 wt-%, at least 30 wt-%, at least 35 wt-%, at least 40 wt-%, or at least 45 wt-% of the small efficiency fiber. In some embodiments, the third nonwoven filter media includes up to 15 wt-%, up to 20 wt-%, up to 25 wt-%, up to 30 wt-%, up to 35 wt-%, up to 40 wt-%, up to 45 wt-%, or up to 50 wt-% of the small efficiency fiber.

In some embodiments, the small efficiency fiber has a fiber diameter of at least 0.1 micron, at least 0.2 micron, at least 0.3 micron, at least 0.4 micron, at least 0.5 micron, at least 0.6 micron, or at least 0.7 micron. In some embodiments, the small efficiency fiber has a fiber diameter of up to 0.7 micron, up to 0.8 micron, up to 0.9 micron, or less than 1 micron. For example, in an exemplary embodiment, the small efficiency fiber has a fiber diameter of at least 0.4 micron and less than 1 micron. In another exemplary embodiment, the small efficiency fiber has a fiber diameter in a range of 0.6 micron to 0.8 micron. In a further exemplary embodiment, the small efficiency fiber has a fiber diameter of 0.7 micron (700 nm).

In some embodiments, the small efficiency fiber has a length of at least 0.5 mm, at least 1 mm, or at least 1.5 mm. In some embodiments, the small efficiency fiber has a length of up to 10 mm, up to 11 mm, up to 12 mm, or up to 15 mm. In an exemplary embodiment, the small efficiency fiber has a length in a range of 1 mm to 15 mm. In a further exemplary embodiment, the small efficiency fiber has a length in a range of 1 mm to 12 mm.

In one exemplary embodiment, the small efficiency fiber is a PET fiber having a fiber diameter of 0.7 micron.

In some embodiments, when the small efficiency fiber includes PET, the PET of the small efficiency fiber has a melting point of at least 250° C., more preferably at least 275° C., even more preferably at least 290° C.

Support Layer

In some embodiments, the composite includes a support layer (also referred to as a scrim). Any suitable support layer may be used. In some embodiments, the support layer includes any of the support layers or features of the support layers described in the Support Layer section of Part B of this disclosure.

Preparation of the Glass-Free Composite

In another aspect, this disclosure describes methods of making a glass-free composite as described herein.

In some embodiments, the first nonwoven filter media and the second nonwoven filter media may be made independently. In some embodiments, the first nonwoven filter media and the third nonwoven filter media may be made independently. In some embodiments, the second nonwoven filter media and the third nonwoven filter media may be made independently. In some embodiments, the first nonwoven filter media, the second nonwoven filter media, and the third nonwoven filter media may be made independently.

In some embodiments, at least one of the first nonwoven filter media, the second nonwoven filter media, and the third nonwoven filter media are formed using a wetlaid process. In some embodiments, the first nonwoven filter media, the second nonwoven filter media, and the third nonwoven filter media are formed using a wetlaid process.

In some embodiments, the method of making the composite includes placing the first nonwoven filter media in contact with the second nonwoven filter media, or placing the second nonwoven filter media in contact with the third nonwoven filter media, or both.

When the composite includes a support layer, the method may further include placing the third nonwoven filter media in contact with the support layer. In some embodiments, the method may include forming the third nonwoven filter media on the support layer.

In some embodiments, the method of making the composite includes bonding the first nonwoven filter media to the second nonwoven filter media, or bonding the second nonwoven filter media to the third nonwoven filter media, or both. Any suitable means of bonding many be used including, for example, lamination.

F. Filter Media Including a Continuous Fine Fiber

Figure 21A:
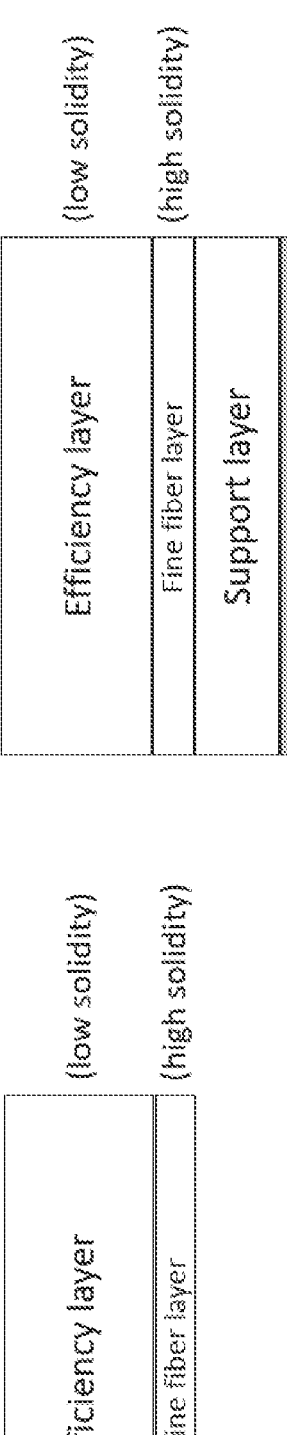

In one aspect, this disclosure describes a filter media that includes a support layer and a continuous fine fiber layer. (See FIG. 21A.) In some embodiments, the continuous fine fiber layer is located on the upstream side of the support layer. The filter media may further include an efficiency layer. (See FIGS. 21A & 21C.) The filter media is further described below and may in some embodiments include a filter media described in in co-pending application PCT/US2020/054837 or co-pending application PCT/US2020/054844.

In some embodiments, the continuous fine fiber layer is located between the efficiency layer and the support layer, and the efficiency layer is located on the upstream side of the filter media.

In some embodiments, a continuous fine fiber layer acts as a surface loading layer. In some embodiments, an efficiency layer acts as a depth-loading layer.

In another aspect, this disclosure describes a filter media that includes a continuous fine fiber layer, and two efficiency layers. (See FIG. 21D.) In some embodiments, the continuous fine fiber layer is located between two efficiency layers.

Figure 21B:
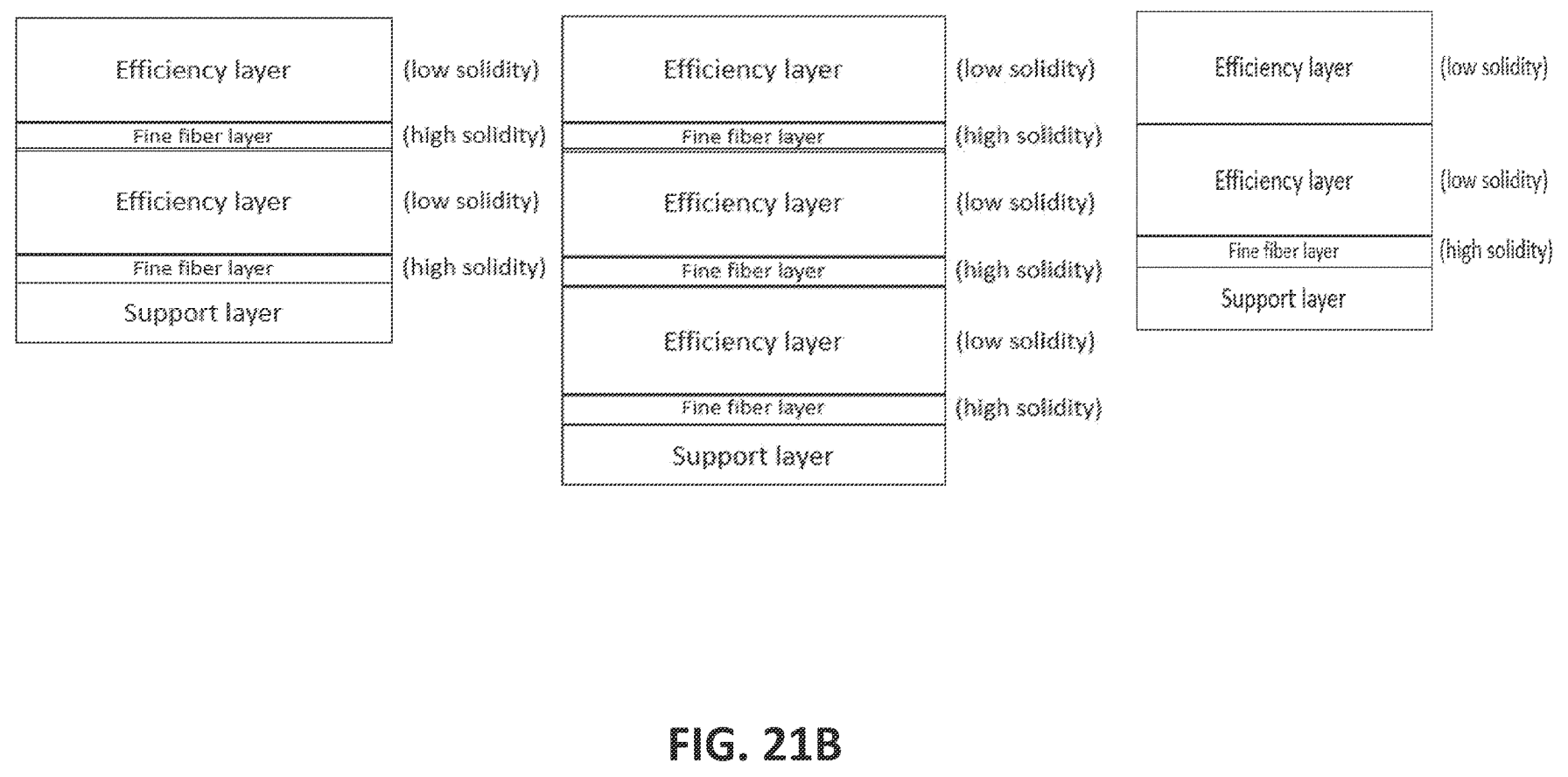

In some embodiments, the filter media may include multiple continuous fine fiber layers and/or multiple efficiency layers. For example, in one embodiment, the filter media might include a first efficiency layer located on the upstream side of the filter media, a first continuous fine fiber layer located on the downstream side of the first efficiency layer, a second efficiency layer located on the downstream side of the first continuous fine fiber layer, and a second fine fiber layer located on the downstream side of the second efficiency layer. The support layer will typically be located on the downstream side of the most downstream continuous fine fiber layer. (See FIG. 21B, left panel.)

For example, in another embodiment, the filter media includes a first efficiency layer located on the upstream side of the filter media, a first continuous fine fiber layer located on the downstream side of the first efficiency layer, a second efficiency layer located on the downstream side of the first continuous fine fiber layer, a second fine fiber layer located on the downstream side of the second efficiency layer, a third efficiency layer located on the downstream side of the first continuous fine fiber layer, and a third fine fiber layer located on the downstream side of the third efficiency layer. The support layer will typically be located on the downstream side of the most downstream continuous fine fiber layer. (See FIG. 21B, middle panel.)

In some embodiments, the filter media may include more than one efficiency layer located on the upstream side of the filter media and a continuous fine fiber layer located on the downstream side of the efficiency layers. (See FIG. 21B, right panel.) One or more efficiency layers may be used to, for example, increase the filter media's capacity (and thus, life) or to improve pressure drop.

This filter media of this disclosure may minimize the adverse effects of variations in flow rate on filter media efficiency without a corresponding increase in pressure drop—that is, an increase in the pressure necessary to force fluid through the filter media.

In some embodiments, the filter media described herein that includes a support layer, an efficiency layer, and a continuous fine fiber layer achieves increased efficiency compared to media including a support layer and an efficiency layer without the continuous fine fiber layer or layers without compromising pressure drop—that is, pressure drop of the filter media described herein is within 20%, more preferably 15%, most preferably 10% of the pressure drop of the media without the continuous fine fiber layer or layers.

In some embodiments, the filter media described herein achieve equivalent efficiency compared to media without the continuous fine fiber layer but exhibits a lower pressure drop.

The filter media described in the present disclosure include a continuous fine fiber layer having a higher solidity used in combination with a low solidity media (that is, an efficiency layer acting as a depth loading layer). The continuous fine fiber layer may act as a surface loading layer, preventing particles from passing though the media. Additionally, because the continuous fine fiber layer is very thin, it does not increase pressure drop as much as a thicker media would.

In some embodiments, one or more of the fibers of the filter media may be selected or treated to alter the electrostatic charge of the filter media. The charge typically includes layers of positive or negative charges trapped at or near the surface of the polymer, or charge clouds stored in the bulk of the polymer. The charge may also include polarization charges which are frozen in alignment of the dipoles of the molecules. Methods of subjecting a material to an electric charge are well known by those skilled in the art. These methods include, for example, thermal, liquid-contact, electron beam, plasma, and corona discharge methods.

Average Maximum Pore Size and Average Mean Flow Pore Size of a Support Layer and a Continuous Fine Fiber Layer Composite As described above, the filter media includes a support layer and a continuous fine fiber layer. In some embodiments, the continuous fine fiber layer may include multiple continuous fine fiber layers. These support layer and a continuous fine fiber layer or layers may form a composite. The composite includes at least one continuous fine fiber layer.

In some embodiments, the filter media exhibits an air permeability (also referred to as Frazier air permeability or airflow) measured according to ASTM D737-18, entitled "Test Method for Air Permeability of Textile Fabrics," of at least 1 ft$^3$/ft$^2$/min at 0.5 inches of water, of at least 2 ft$^3$/ft$^2$/min at 0.5 inches of water, of at least 5 ft$^3$/ft$^2$/min at 0.5 inches of water, at least ft$^3$/ft$^2$/min at 0.5 inches of water, at least 15 ft$^3$/ft$^2$/min at 0.5 inches of water, or at least ft$^3$/ft$^2$/min at 0.5 inches of water. In some embodiments, the nonwoven filter media exhibits an air permeability measured according to ASTM D737-18 of up to 30 ft$^3$/ft$^2$/min at 0.5 inches of water, up to 50 ft$^3$/ft$^2$/min at 0.5 inches of water, up to 100 ft$^3$/ft$^2$/min at 0.5 inches of water, or up to 200 ft$^3$/ft$^2$/min at 0.5 inches of water. In an exemplary embodiment, the nonwoven filter media or composite exhibits an air permeability in a range of 1 ft$^3$/ft$^2$/min at 0.5 inches of water to 100 ft$^3$/ft$^2$/min at 0.5 inches of water. In another exemplary embodiment, the nonwoven filter media or composite exhibits an air permeability in a range of 2 ft$^3$/ft$^2$/min at 0.5 inches of water to 30 ft$^3$/ft$^2$/min at 0.5 inches of water.

In some embodiments, the filter media has a composite average maximum pore size of up to 20 μm, preferably up to 15 μm, and more preferably up to 14 μm. In some embodiments, the composite maximum pore size of the filter media is at least 0.1 μm. As used herein, "composite average maximum pore size" refers to the average maximum pore size of a composite that includes the support layer and any continuous fine fiber layers present in a layer adjacent to the support layer.

In some embodiments, the filter media has a composite average mean flow pore size or P50 of up to 11 μm, preferably up to 9 μm, and more preferably up to 6 μm. In some embodiments, the composite average mean flow pore size of the filter media or P50 is at least 0.1 μm. As used herein, "composite average mean flow pore size" refers to the average mean flow pore size of a composite that includes the support layer and any continuous fine fiber layers present in a layer adjacent to the support layer.

In some embodiments, the composite average maximum pore size and/or composite average mean flow pore size are preferably determined using capillary flow porometry.

Without wishing to be bound by theory, it is believed that composite average maximum pore size and composite average mean flow pore size depend on the fine fiber diameters, relative amounts of small and large fine fibers, and composite morphology (such as layered or commingled), among other factors.

In some embodiments, the composite may have a mean flow pore size similar to the mean flow pore size of the efficiency layer. For example, in some embodiments, the mean flow pore size (P50) of the composite may be within 1%, 2%, 3%, 5%, 10%, 20%, 30%, 50%, 100%, or 200% of the mean flow pore size (P50) of the adjacent efficiency layer.

As described in Example 15, the composite average maximum pore size of the filter media may correlate with the ability of the filter media to withstand at least 20 psi pressure drop during liquid filtration, indicating better filter performance than a filter media that cannot withstand the same conditions. Although, as described in the Examples, characterization of the performance of this filter media was performed using liquids, it is believed that the observed superior performance will also be observable in testing with air.

In some embodiments, the composite average maximum pore size of the filter media may correlate with the ability of the filter media to withstand at least 20 psi pressure drop during liquid filtration, indicating better filter performance than a filter media that cannot withstand the same conditions.

Although the composite average maximum pore size of the filter media may correlate with the ability of the filter media to withstand at least 20 psi pressure drop during liquid filtration, composite average maximum pore size may sometimes provide inconsistent values if the media includes a defect or an unusually large maximum pore. Thus, to better understand a composite's range of pore sizes and distribution of pore sizes, additional values were also examined, as described below.

P95/P50 Ratio of a Composite including the Support Layer and the Continuous Fine Fiber Layer In some embodiments, a composite formed from the support layer and the continuous fine fiber layer has a P95/P50 ratio of up to 1.8, up to 1.9, or up to 2.

Although the pore sizes of the fine fiber layer control the majority of the values of the P95/P50 ratio of the composite, the interaction between the support layer and the continuous fine fiber layer also affects performance. Without wishing to be bound by theory, these interactions are believed to make the composite pore size measurements more informative than pore size measurements of the fine fiber layer alone.

The value of P50 reflects the diameter of a pore at which 50% of the fluid is flowing through pores of that diameter or less. The value of P95 reflects the diameter of a pore at which 95% of the fluid is flowing through pores of that diameter or less, a larger ratio of P95/P50, generally reflects a larger range of pore sizes with relatively larger pores being present.

In some embodiments, the composite has a P95/P50 ratio of at least 1.

P95/P50 Ratio of the Efficiency Layer Adjacent to the Fine Fiber Layer

In some embodiments, the efficiency layer has a P95/P50 ratio of at least 1.8, at least 1.9, or at least 2.

Without wishing to be bound by theory, it is believed that a composite having a P95/P50 ratio of less than 1.8 would exhibit a solidity in a range that would be expected to result in undesirably high pressure drop. In addition, because solidity increases as the P95/P50 decreases, the number of particles that may be captured by the composite also decreases.

In some embodiments, the efficiency layer has a P95/P50 ratio of up to 2.5, up to 3, up to 4, up to 5, up to 10, up to 15, or up to 20.

Without wishing to be bound by theory, a P95/P50 ratio greater than 20 is expected to result in a media layer having larger pore sizes and, thus, too few pores of the size needed to capture the desired particle sizes (for example, particle sizes in a range of 1 μm to 100 μm).

For example, the efficiency layer has a P95/P50 ratio in a range of 1.8 to 20, in a range of 2 to 10, or in a range of 2 to 5.

In some embodiments, it is preferred that the maximum of the range including the P95/P50 ratio of the composite is equal to or below the minimum of the range including the P95/P50 ratio of the efficiency layer. In some embodiments, it is preferred that the P95/P50 ratio of the composite is equal to or below the P95/P50 ratio of the efficiency layer.

For example, in an exemplary embodiment, the P95/P50 ratio of the composite is up to 1.8 and the P95/P50 ratio of the efficiency layer is at least 1.8. In another exemplary embodiment, the P95/P50 ratio of the composite is up to 1.9 and the P95/P50 ratio of the efficiency layer is at least 1.9. In yet another exemplary embodiment, the P95/P50 ratio of the composite is up to 2 and the P95/P50 ratio of the efficiency layer is at least 2.

In some embodiments, it is preferred that the maximum of the P95/P50 ratio of the composite below the minimum of the P95/P50 ratio of the efficiency layer. For example, in an exemplary embodiment, the P95/P50 ratio of the composite is up to 1.8 and the P95/P50 ratio of the efficiency layer is at least 2. In another exemplary embodiment, the P95/P50 ratio of the composite is up to 1.9 and the P95/P50 ratio of the efficiency layer is at least 2.

For example, in some embodiments, the efficiency layer adjacent to the fine fiber layer may have a P95/P50 ratio that is up to 1.5 times, up to 2 times, up to 3 times, up to 4 times, up to times, up to 6 times, up to 7 times, up to 8 times, up to 9 times, or up to 10 times larger than the P95/P50 ratio of the composite.

Overlapping Pore Size Distributions

In some embodiments, the pore size distributions of the efficiency layer and of the composite (including the support layer and the fine fiber layer) overlap. If the filter medium includes more than one efficiency layer, then the pore size distributions of the efficiency layer adjacent to the fine fiber layer and of the composite (including the support layer and the fine fiber layer) overlap. Without wishing to be bound by theory, this overlap in pore size distributions is believed to increase the life of filter.

When the pore size distributions of the efficiency layer and of the composite do not overlap because the pore sizes of the composite are smaller than the pore sizes of the efficiency layer, the fine fiber layer captures particles of sizes that are not captured by the efficiency layer. This capture, in turn, results in an increase in pressure drop and, consequently, shorter media life.

If the pore sizes of the efficiency layer and of the composite do not overlap because the pore sizes of the composite are larger than the pore sizes of the efficiency layer, then the fine fiber layer would not be providing the desired increase in efficiency.

Similarly, if the pore sizes of the efficiency layer and of the composite overlapped across their entire range, the fine fiber layer is likely to not be providing the desired increase in efficiency.

Thus, in some embodiments the P95 of the composite preferably falls within a range provided by the values of P5 and P50 of the efficiency layer.

As shown in Example 16, when the P95 of the composite falls below a range provided by the values of P5 and P50 of the efficiency layer adjacent to the fine fiber layer, the resulting pressure drop of the filter medium is high (23.2 kPa), more than 150% the pressure drop of a filter medium not including the fine fiber layer and support layer.

Continuous Fine Fiber Layer

The continuous fine fiber layer includes a continuous fine fiber that has a diameter of up to 10 micrometers (μm). In some embodiments, the continuous fine fiber layer includes a single layer. In some embodiments, the continuous fine fiber layer includes multiple layers. In some embodiments when the continuous fine fiber layer includes multiple layers, each layer may include continuous fine fibers having different diameters or each layer may include different combinations of continuous fine fibers having different diameters.

In some embodiments, the continuous fine fiber layer or layers act as a surface loading layer.

In some embodiments, the continuous fine fiber may include a fiber having a diameter of at least 0.05 μm (50 nm), at least 0.1 μm (100 nm), at least 0.15 μm, at least 0.2 μm, at least 0.25 μm, at least 0.3 μm, at least 0.35 μm, at least 0.4 μm, at least 0.45 μm, at least 0.5 μm, or at least 1 μm.

In some embodiments, the continuous fine fiber may include a fiber having a diameter of up to 0.1 μm, up to 0.2 μm, up to 0.3 μm, up to 0.4 μm, up to 0.5 μm, up to 1.0 μm, up to 1.5 μm, up to 1.5 μm, up to 2 μm, up to 3 μm, up to 4 μm, up to 5 μm, up to 6 μm, up to 7 μm, up to 8 μm, up to 9 μm, or up to 10 μm.

For example, in an exemplary embodiment, the continuous fine fiber may include a fiber having a diameter in a range of 0.1 μm to 5 μm or in a range of 0.5 μm to 5 μm. In some embodiments, including for example, when the continuous fine fiber has an elliptical shape, the continuous fine fiber may preferably include a fiber having a diameter in a range of 1 µm to 5 µm. In some embodiments, including for example, when the continuous fine fiber does not include a mixture of fibers of different diameters, the continuous fine fiber may include a fiber having a diameter in a range of 0.2 µm to 1.5 µm.

In a further exemplary embodiment, the continuous fine fiber may include a fiber having a diameter in a range of 0.1 µm (100 nm) to 0.5 µm (500 nm). In another exemplary embodiment, the continuous fine fiber may include a fiber having a diameter in a range of 0.2 µm (200 nm) to 0.3 µm (300 nm). In yet another exemplary embodiment, the continuous fine fiber may include a fiber having a diameter in a range of 0.35 µm (350 nm) to 0.45 µm (450 nm).

In some embodiments, the continuous fine fiber may have an elliptical (including a circular) shape. For example, the continuous fine fiber may have cross-sectional major axis (width):cross-sectional minor axis (height) of at least 2:1 (like, for example, fettucine) and up to 1:1 (like, for example, spaghetti).

In some embodiments, the continuous fine fiber preferably has a diameter in a range of 1 µm to 5 µm and a cross-sectional major axis (width):cross-sectional minor axis (height) of at least 1.5:1 and up to 1:1.

In some embodiments, the continuous fine fiber layer has a solidity of at least 10%, at least 11%, at least 12%, at least 13%, at least 14%, at least 15%, at least 20%, or at least 25%. In some embodiments, the continuous fine fiber layer has a solidity of up to 15%, up to 20%, up to 25%, up to 30%, up to 35%, or up to 40%. In an exemplary embodiments, the continuous fine fiber layer has a solidity in a range of 15% to 30%. In some embodiments, the solidity of the continuous fine fiber layer is preferably calculated as described in the methods provided for Examples 10-14.

Mixed Diameter Fine Fibers

In some embodiments, the continuous fine fiber may include a mixture of fibers of different diameters.

In some embodiments, the continuous fine fiber may include fibers of two different diameters. When the continuous fine fiber includes fibers of two different diameters, the ratio of the diameter of the "small" fiber diameter fibers to the diameter of the "large" fiber diameter fibers (small fiber diameter:layer fiber diameter) may be in a range of 1:3 to 1:5 including, for example, 1:4. For example, in an exemplary embodiment, the continuous fine fiber may include a first fine fiber having a diameter in a range of 0.2 µm to 0.3 µm and a second fine fiber having a diameter in a range of 0.9 µm to 1.1 µm. In another example, the small fiber diameter may be 0.25 µm and the large fiber diameter may be 1 µm.

In embodiments wherein the continuous fine fiber includes a mixture of fibers of different diameters, the fibers of different diameters may be mixed or comingled together within a single strata of the continuous fine fiber layer.

In embodiments wherein the continuous fine fiber includes a mixture of fibers of different diameters, the fibers of different diameters may form different strata in the continuous fine fiber layer. When the fibers of different diameters form different strata in the continuous fine fiber layer, the larger fibers may be deposited on a support prior to the deposition of the smaller fibers, creating a gradient (including, for example, in pore size and solidity) within the continuous fine fiber layer. Additionally or alternatively, when the fibers of different diameters form different strata in the continuous fine fiber layer, larger and smaller fibers may be deposited to form multiple layers with different features.

Exemplary embodiments of such a construction are shown in FIG. 22A and FIG. 22H-FIG. 22M.

Figure 22B:
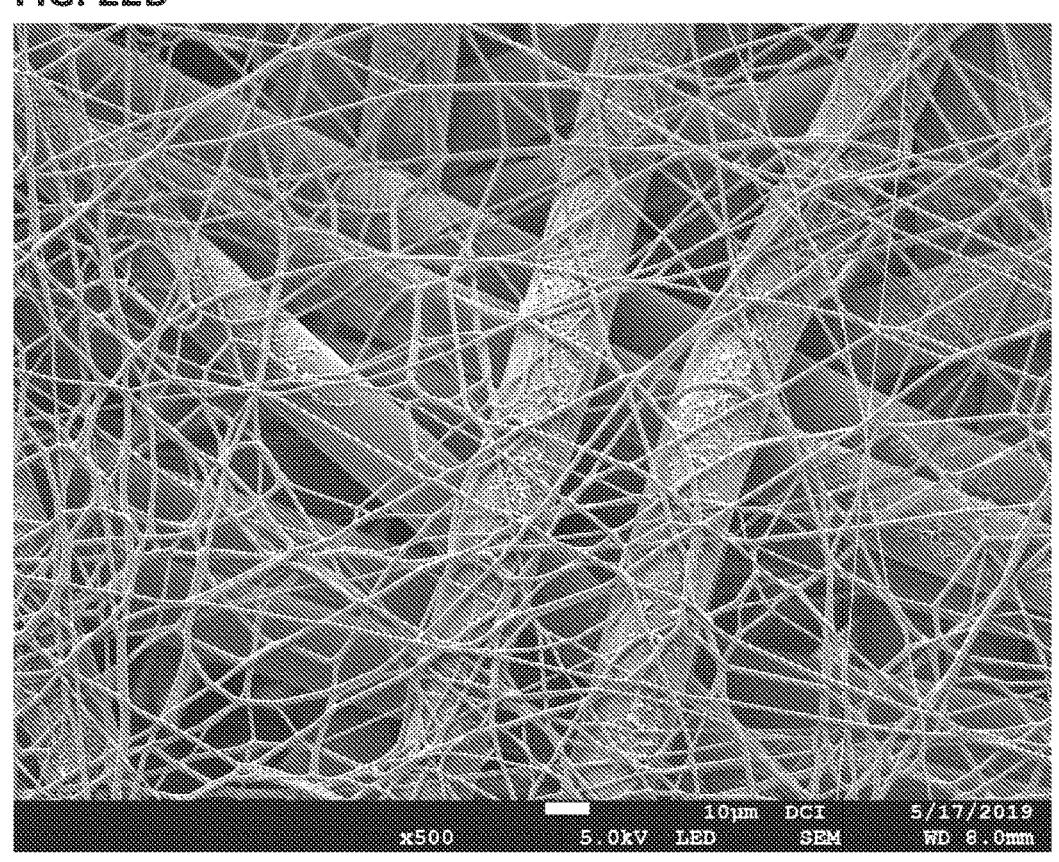
FIG. 22B shows an exemplary image of a large fine fiber layer deposited on a nylon scrim at 500× magnification (top panel) and 2000× magnification (bottom panel).
Figure 22B:
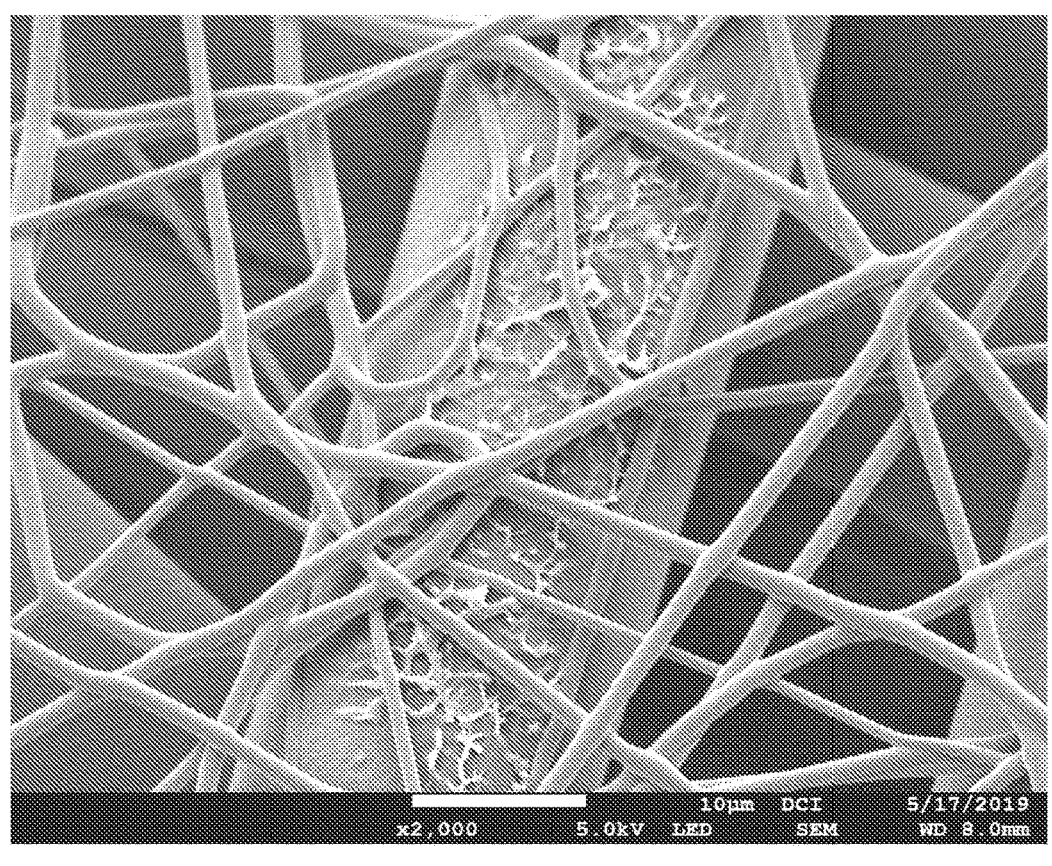

In some embodiments, the "large" fine fibers have an average diameter of at least 600 nm, more preferably greater than 600 nm. In some embodiments, the "large" fine fibers have an average diameter of at least 700 nm, at least 800 nm, or at least 900 nm. In some embodiments, the "large" fine fibers preferably have an average diameter of at least 1000 nm (1 µm) or greater than 1000 nm (1 µm). The "large" fine fibers have an average diameter of up to 1100 nm, up to 1200 nm, up to 1300 nm, up to 1400 nm, up to 1500 nm, up to 2000 nm, up to 3000 nm, up to 4000 nm, up to 5000 nm (5 µm), or up to 10 µm. Exemplary images of a continuous fine fiber layer that includes large fine fibers deposited on a support layer are shown in FIG. 22B.

In embodiments where a continuous fine fiber layer includes "large" fine fibers and "small" fine fibers, and wherein the large fine fibers have an average diameter at least three times the average fiber diameter of the small fine fibers, the small fine fibers may have an average diameter of up to 300 nm, up to 400 nm, up to 500 nm, or up to 600 nm. In some embodiments, the average fiber diameter of the small fine fibers of the continuous fine fiber layer may be at least 200 nm.

Properties of the Continuous Fine Fiber Layer

In some embodiments, the continuous fine fiber layer has a mean flow pore size of at least 0.1 µm, at least 0.5 µm, at least 1 µm, at least 2 µm, at least 3 µm, at least 4 µm, at least 5 µm, at least 10 µm, at least 15 µm, or at least 20 µm. In some embodiments, the continuous fine fiber layer has a mean flow pore size of up to 0.5 µm, up to 1 µm, up to 2 µm, up to 3 µm, up to 4 µm, up to 5 µm, up to 10 µm, up to 15 µm, up to 20 µm, up to 25 µm, up to 30 µm, or up to 35 µm. In an exemplary embodiment, the continuous fine fiber layer has a mean flow pore size in a range of 10 µm to 25 µm. In another exemplary embodiment, the continuous fine fiber layer has a mean flow pore size in a range of 1 µm to 3 µm. In some embodiments, the mean flow pore size is preferably an average mean flow pore size determined using capillary flow porometry, as described in the Examples.

In some embodiments, the mean flow pore size of the continuous fine fiber layer and the support layer is at least 0.1 µm, at least 0.5 µm, at least 1 µm, at least 2 µm, at least 3 µm, at least 4 µm, at least 5 µm, at least 10 µm, at least 15 µm, or at least 20 µm. In some embodiments, the mean flow pore size of the continuous fine fiber layer and the support layer is up to 0.5 µm, up to 1 µm, up to 2 µm, up to 3 µm, up to 4 µm, up to 5 µm, up to 10 µm, up to 15 µm, up to 20 µm, up to 25 µm, up to 30 µm, or up to 35 µm. In an exemplary embodiment, the mean flow pore size of the continuous fine fiber layer and the support layer is in a range of 1 µm to 3 µm.

In some embodiments, the continuous fine fiber layer has a narrow distribution of pore sizes.

In some embodiments, the pore size distribution may be quantified using a ratio of P95 to P50. "P50" is the mean flow pore size, calculated as described in the methods for Examples 10-14. "P95" is the pore size at which 95% of the flow through the layer is passing through a pore having an effective diameter of that size or less, calculated as described in the methods for Examples 10-14. Thus, a ratio of P95 to P50 (P95/P50) for a layer is a measure of the breadth of the media pore size distribution that layer. In some embodiments, for example, the continuous fine fiber layer may have a P95/P50 ratio of up to 1.2, up to 1.4, up to 1.6, up to 1.8, up to 2, up to 2.5, up to 3, or up to 4.

In some embodiments, the continuous fine fiber layer has a basis weight of at least 0.005 g/m$^2$, at least 0.01 g/m$^2$, at least 0.05 g/m$^2$, at least 0.1 g/m$^2$, at least 0.5 g/m$^2$, at least 1 g/m$^2$, at least 1.5 g/m$^2$, at least 2 g/m$^2$, or at least 2.5 g/m$^2$. In some embodiments, the continuous fine fiber layer has a basis weight of up to 1.5 g/m$^2$, up to 2 g/m$^2$, up to 2.5 g/m$^2$, up to 3 g/m$^2$, up to 3.5 g/m$^2$, up to 4 g/m$^2$, up to 4.5 g/m$^2$, up to 5 g/m$^2$, up to 10 g/m$^2$, up to 15 g/m$^2$, up to 20 g/m$^2$, up to 25 g/m$^2$, up to 50 g/m$^2$. In an exemplary embodiment, the continuous fine fiber layer has a basis weight of at least 0.1 g/m$^2$ and up to 20 g/m$^2$. In another exemplary embodiment, the continuous fine fiber layer has a basis weight of at least 0.1 g/m$^2$ and up to 1 g/m$^2$. In a further exemplary embodiment, the continuous fine fiber layer has a basis weight 0.43 g/m$^2$. When the fibers of different diameters are layered, the basis weight of the continuous fine fiber layer will be additive.

In some embodiments, the continuous fine fiber layer has a thickness of at least the average diameter of an the largest fine fiber of the continuous fine fiber layer. In some embodiments, the continuous fine fiber layer has a thickness of at least 200 nm, at least 300 nm, at least 400 nm, at least 500 nm, at least 600 nm, at least 700 nm, at least 800 nm, at least 900 nm, or at least 1000 nm. In some embodiments, the continuous fine fiber layer has a thickness of up to 600 nm, up to 1000 nm, up to 5000 nm (5 μm), or up to 10 μm.

Properties of the Continuous Fine Fibers

The fine fibers of the present disclosure include a fiber-forming polymer material. In some embodiments, the fine fibers of the present disclosure may be made by spinning the fiber-forming polymer material alone. In some embodiments, the fine fibers of the present disclosure may be made by spinning the fiber-forming polymer material in combination with another sub stance.

Fine fiber technologies that contemplate polymeric materials mixed or blended with a variety of other substances is disclosed in Chung et al., U.S. Pat. No. 6,743,273; Chung et al., U.S. Pat. No. 6,924,028; Chung et al., U.S. Pat. No. 6,955,775; Chung et al., U.S. Pat. No. 7,070,640; Chung et al., U.S. Pat. No. 7,090,715; Chung et al., U.S. Patent Publication No. 2003/0106294; Barris et al., U.S. Pat. No. 6,800,117; and Gillingham et al., U.S. Pat. No. 6,673,136. Additionally, in Ferrer et al., U.S. Pat. No. 7,641,055, a water-insoluble, high-strength polymer material is made by mixing or blending a polysulfone polymer with a polyvinyl pyrrolidone polymer resulting in a single phase polymer alloy used in electrospinning fine fiber materials.

The continuous fine fiber may include fibers made of any suitable polymer. In some embodiments, polyamides may be useful as the polymer materials of the continuous fine fiber. One useful class of polyamide condensation polymers are nylon materials. The term "nylon" is a generic name for all long chain synthetic polyamides. Typically, nylon nomenclature includes a series of numbers such as in nylon-6,6 which indicates that the starting materials are a C6 diamine and a C6 diacid (the first digit indicating a C6 diamine and the second digit indicating a C6 dicarboxylic acid compound). Another nylon may be made by the polycondensation of ε-caprolactam in the presence of a small amount of water. This reaction forms a nylon-6 (made from a cyclic lactam, also known as ε-aminocaproic acid) that is a linear polyamide. Further, nylon copolymers are also contemplated. Exemplary nylon materials include nylon-6, nylon-6,6, nylon-6,10, mixtures or copolymers thereof.

Copolymers may be made by combining various diamine compounds, various diacid compounds and various cyclic lactam structures in a reaction mixture and then forming the nylon with randomly positioned monomeric materials in a polyamide structure. For example, a nylon-6, 6-6, 10 material is a nylon manufactured from hexamethylene diamine and a C$_6$ and a Cio blend of diacids. A nylon-6-6,6-6,10 is a nylon manufactured by copolymerization of ε-aminocaproic acid, hexamethylene diamine and a blend of a C$_6$ and a C$_{10}$ diacid material. Herein, the term "copolymer" includes polymers made from two or more different monomers and include terpolymers, etc.

In some embodiments, the fine fiber of the continuous fine fiber layer may preferably include a nylon. In some embodiments, the fine fiber may include a nylon copolymer resin. In an exemplary embodiments, the fine fiber includes SVP 651 (Shakespeare Co., Columbia, SC), a terpolymer having a number average molecular weight of 21,500-24,800 comprising 45% nylon-6, 20% nylon-6,6 and 25% nylon-6,10). Without wishing to be bound by theory, it is believed that the nylon in the fine fibers of the continuous fine fiber layer will not undergo significant swelling during use of the filter media (including, for example, in a face mask). Significant swelling would cause an increase in the observed pressure drop of the media (and, in the context of a face mask, would result in increased difficulty in breathing through the filter media).

In some embodiments, the polymer material or materials of the fine fiber are selected for their resistance to significant swelling during use of the filter media (including, for example, during the use of the filter media in a face mask). Although a person having skill in the art will appreciate that may polymers will swell if immersed in a liquid, less swelling or no significant swelling may be expected for some polymers even in a moisture-laden atmosphere (including, for example, the atmosphere creating in a face mask filter during use).

In some embodiments, the fine fibers of the continuous fine fiber layer may not be crosslinked (including, for example, by a crosslinking agent such as melamine-formaldehyde resin). Without wishing to be bound by theory, it is believed that the crosslinking of the continuous fine fiber layer may result in an increased solidity of the continuous fine fiber layer due to the fibers being more closely packed. Such increased solidity would cause an increase in the observed pressure drop of the media (and, in the context of a face mask, would result in increased difficulty in breathing through the filter media).

In some embodiments, polysulfones may be useful as the polymer materials of the continuous fine fiber. Exemplary polysulfones include polysulfone (PS), polyethersulfone (PES), and polyphenylsulfone (PPSF), and mixtures thereof.

In some embodiments, polymer materials including cellulose derivatives may be useful as the polymer materials of the continuous fine fiber. Examples of such polymers include ethyl cellulose, hydroxyl ethyl cellulose, cellulose acetate (including cellulose diacetate (DAC) and cellulose triacetate (TAC)), cellulose acetate butyrate, cellulose acetate propionate, cellulose acetate phthalate, and mixtures thereof.

In some embodiments, polymer materials of the continuous fine fiber may additionally or alternatively include polypropylene (PP), polyvinylpyrolidone (PVP), poly(4-vinyl pyridine) (P4VP), polyvinylidene fluoride (PVDF), or polytetrafluoroethene (PTFE, also known as Teflon), or mixtures thereof.

In some embodiments, polymer crosslinked with resinous aldehyde may be useful as the polymer materials of the continuous fine fiber, as described, for example, in International Publication No. WO 2013/043987 A1.

In some embodiments, the continuous fine fiber layer has a thickness of up to 50 μm, up to 20 μm, up to 12 μm, or up to 10 μm. In some embodiments, a thinner continuous fine fiber layer may be preferable. In some embodiments, the continuous fine fiber layer has a thickness of at least 0.5 μm, at least 1 μm, at least 3 μm, at least 5 μm, or at least 8 μm. For example, in an exemplary embodiment, the continuous fine fiber layer has a thickness of 8 μm to 12 μm. In another exemplary embodiment, the continuous fine fiber layer has a thickness in a range of 0.5 μm to 12 μm. In yet another exemplary embodiment, the continuous fine fiber layer has a thickness in a range of 0.5 μm to 10 μm.

In some embodiments, the continuous fine fiber layer has a thickness that is at least the thickness of several (for example, two, three, four, or more) fibers having the average diameter of largest fine fiber of the continuous fine fiber layer. For example, the continuous fine fiber layer may have a thickness of at least 2 μm, at least 3 μm, at least 4 μm, or at least 5 μm.

In some embodiments, the continuous fine fiber layer has a solidity greater than the solidity of one or more of the other layers in the filter media (including, for example, the support layer or the efficiency layer or both). Although layers with high solidity typically lead to increased pressure drop, without wishing to be bound by theory, it is believed that providing a very thin continuous fine fiber layer helps to provide the increase in efficiency without the corresponding pressure drop that would typically be observed.

In some embodiments, the continuous fine fiber layer has a mean flow pore size similar to the mean flow pore size of the efficiency layer. In some embodiments, the continuous fine fiber layer has a narrower pore size distribution than the pore size distribution of the efficiency layer.

In some embodiments, as further described below, the fine fibers may be made by combining a fiber-forming polymer material with at least one material which is reactive with and/or cross-links the fiber-forming polymer material. Without wishing to be bound by theory, it may be advantageous, however, to avoid including materials which are reactive with and/or cross-link the fiber-forming polymer material because such polymers may create a more stacked or open morphology increasing the permeability of the resulting fine fiber layer and the filter media as a whole.

In some embodiments, the fine fibers of the present disclosure may be made by combining a fiber-forming polymer material and at least two reactive additives that are capable of reacting with each other, for example, in a fiber-forming process or in a post-treatment process, as further described in International Patent Publication No. WO 2014/164130. The at least two reactive additives are optionally reactive with the fiber-forming polymer.

In some embodiments, the fine fibers of the present disclosure may be made by combining a fiber-forming polymer material and a resinous aldehyde composition such as a melamine-formaldehyde resin.

In some embodiments, the resinous aldehyde composition includes a "polymer-reactive resinous aldehyde composition." A "polymer-reactive resinous aldehyde composition" includes alkoxy groups, as further described in U.S. Pat. No. 9,587,328. In the final fibers, at least a portion of the polymer-reactive resinous aldehyde composition will be involved in crosslinking the polymer and optionally may be involved in self-crosslinking. The fiber-forming polymer material also includes reactive groups. In this context, "reactive" means that the polymer includes one or more functional groups (for example, active hydrogen groups)

capable of being crosslinked by the alkoxy groups of the polymer-reactive resinous aldehyde composition used in making the fine fibers.

In some embodiments, the resinous aldehyde composition includes a "polymer-non-reactive resinous aldehyde composition." The polymer-non-reactive resinous aldehyde composition includes reactive groups for self-crosslinking, as further described in U.S. Pat. No. 9,435,056. In the final fibers, at least portions of the polymer-non-reactive resinous aldehyde composition will be involved in self-crosslinking.

As used herein, "resin" or "resinous" refers to monomers, oligomers, and/or polymers, particularly of a nature that may migrate to the surface of a fine fiber during fiber formation. Herein, the term "resinous aldehyde composition" refers to the starting material as well as the material in the final fibers.

These components may be combined in solution or melt form. In certain embodiments, the fine fibers are electrospun from a solution or dispersion. Thus, the polymer materials and resinous aldehyde (for example, melamine-aldehyde) compositions are dispersible or soluble in at least one common solvent or solvent blend suitable for electrospinning.

In some embodiments, it may be preferred to use bead-on-string fine fibers such as those shown in Example 13. Without wishing to be bound by theory, it is believed that bead-on-string fine fibers may lower the solidity of the fine fiber structure. (See also Zhao et al., DOI: 10.5772/intechopen.74661 (2018).)

Methods of Forming the Continuous Fine Fiber Layer

In another aspect, this disclosure describes a method of making the continuous fine fiber layer.

The continuous fine fiber layer may be formed by any suitable method. For example, fine fibers of the disclosure may be made using a variety of techniques including electrostatic spinning, force spinning, wet spinning, dry spinning, melt spinning, extrusion spinning, direct spinning, gel spinning, by using an islands-in-the-sea method, etc.

In some embodiments, the components of the continuous fine fiber layer may be combined in solution or melt form. In certain embodiments, the fine fibers are electrospun from a solution or dispersion. For example, polymer materials and resinous aldehyde compositions are dispersible or soluble in at least one common solvent or solvent blend suitable for electrospinning.

In some embodiments, the continuous fine fiber layer may be formed on the support layer. In some embodiments, the continuous fine fiber layer may be formed on the efficiency layer.

In some embodiments when the fibers of different diameters may form different strata in the continuous fine fiber layer, larger fibers may be deposited on a support prior to the deposition of smaller fibers. Depending on the number of layers, additionally or alternatively, smaller fibers may be deposited on a support prior to the deposition of larger fibers.

In some embodiments when the fibers of different diameters may form the same strata in the continuous fine fiber layer, the fibers may be formed at the same time.

The fine fibers are collected on the support layer during, for example, electrostatic or melt spinning formation, and are often heat treated after fiber making. Preferably, the continuous fine fiber layer is disposed on a first surface of a layer of permeable coarse fibrous media (that is, a support layer) as a layer of fiber.

A suitable polymer and polymer concentration may be selected by a person having ordinary skill in the art given the size and other properties desired for the continuous fine fiber layer. For example, in some embodiments, the fibers will preferably be compatible with a fluid (for example, hydraulic fluid, fuel, lubricant) they are used to filter. A fiber is considered to be compatible with a fluid if it does not react with the fluid or any other components and additives in it and is insoluble in the fluid (such that the fine fiber structure is not chemically nor physically compromised upon mere contact with the fluid). In an exemplary embodiment, the polymer solution includes Solution 1, as described in the Examples. In an exemplary embodiment, the polymer solution includes Solution 2, as described in the Examples.

In some embodiments when fine fibers of different diameters are commingled, the fibers may be formed at the same time. For example, when two (or more) fibers are formed by electrospinning, the fibers may be formed by simultaneously co-spinning including, for example, by using two (or more) syringes, wherein each syringe includes a different polymer solution. Additionally or alternatively, each syringe may use a different syringe pump feed rate. In some embodiments, when the fine fibers of different diameters are commingled, the fibers may be formed alternating formation of the fibers but using very short (for example, up to 10 seconds, up to 20 seconds, or up to 30 seconds) pulses of each polymer solution.

In some embodiments when fibers of different diameters are layered, the fibers may be formed by alternating formation of the fibers. For example, when two (or more) fibers are formed by electrospinning, the fibers may be formed by alternatively spinning each fiber including, for example, by using two (or more) syringes, wherein each syringe includes a different polymer solution. Additionally or alternatively, each syringe may use a different syringe pump feed rate. In some embodiments, when the fibers of different diameters are layered, the fibers may be formed alternating formation of the fibers using pulses of each polymer solution of at least 30 seconds.

Any suitable method may be used to form a combination of layers of small and large fine fibers may be used. Exemplary methods that may be used to form layered fiber structures include one or more of the methods of Set A5, Set B, Set D5, Set E, Set I5, or Set J, of Table 5. Exemplary methods that may be used to form commingled fiber structures include one or more of the methods of Set A6, Set D, Set D6, Set I, or Set L, of Table 5. In some embodiments, a combination of layers that includes both layered fiber structures and commingled fiber structures may be formed. An exemplary method for forming such a structure is described in the Examples.

Efficiency Layer

The efficiency layer, if included, is a wet-laid, nonwoven filter media.

In some embodiments, the efficiency layer includes a bicomponent fiber and an efficiency fiber, wherein the efficiency fiber has a smaller diameter than the bicomponent fiber. In some embodiments, the efficiency layer may further include a microfibrillated cellulose.

In some embodiments, the efficiency layer acts as a depth-loading layer.

In some embodiments, the efficiency layer is preferably a wet-laid media.

In some embodiments, the efficiency layer has a solidity less than the solidity of the continuous fine fiber layer.

In some embodiments, the efficiency layer has a solidity of at least 3%, at least 4%, at least 5%, at least 6%, at least 7%, at least 8%, at least 9%, or at least 10%. In some embodiments, the efficiency layer has a solidity of up to 8%, up to 9%, up to 10%, up to 11%, up to 12%, up to 13%, up to 14% or up to 15%. In an exemplary embodiments, the efficiency layer has a solidity in a range of 7% to 12%. In some embodiments, the solidity of the efficiency layer is preferably calculated as described in the methods for Examples 10-14.

In some embodiments, the efficiency layer has a thickness of at least 0.05 mm, at least 0.1 mm, at least 0.2 mm, or at least 0.3 mm. In some embodiments, the efficiency layer has a thickness of up to 0.5 mm, up to 1 mm, up to 5 mm, up to 10 mm, up to 25 mm, or up to 50 mm. In some embodiments, the efficiency layer has a thickness in a range of 0.2 mm to 50 mm. In some embodiments, the efficiency layer has a thickness in a range of 0.2 mm to 1 mm. In some embodiments, the efficiency layer has a thickness in a range of 0.2 mm to 0.5 mm.

As noted above, in some embodiments, the continuous fine fiber layer has a mean flow pore size similar to than the mean flow pore size of the efficiency layer. Without wishing to be bound by theory, it is believed that if the mean flow pore size of the continuous fine fiber layer is much smaller than the mean flow pore size of the efficiency layer, a larger proportion of particles will be captured by the continuous fine fiber layer, decreasing filter life. On the other hand, if the mean flow pore size of the continuous fine fiber layer is much larger than the mean flow pore size of the efficiency layer, the efficiency layer must have a high solidity, and the filter will again have decreased life due to lower capacity.

It will be recognized that the mean flow pore size may be selected based on desired efficiency of the filter media and the size of particles being filtered.

In exemplary embodiments, the efficiency layer has a mean flow pore size of at least 1 µm, at least 5 µm, at least 10 µm, at least 15 µm, or at least 20 µm. In exemplary embodiments, the efficiency layer has a mean flow pore size of up to 5 µm, up to 10 µm, up to 15 µm, up to 20 µm, up to 25 µm, up to 30 µm, or up to 35 µm. In a particular exemplary embodiment, the efficiency layer fibers has a mean flow pore size range of 10 µm to 25 µm. In some embodiments, the mean flow pore size is preferably an average mean flow pore size determined using capillary flow porometry, as described in the methods for Examples 10-14.

In some embodiments, the efficiency layer has a distribution of pore sizes of broader then the distribution of pore sizes of the adjacent continuous fine fiber layer. In some embodiments, the pore size distribution may be quantified using a ratio of P95 to P50. In some embodiments, for example, the efficiency layer may have a P95/P50 ratio of up to 2, up to 2.5, up to 3, up to 4, up to 5, up to 10, or up to 20.

In some embodiments, the mean flow pore size of the efficiency layer is preferably similar to the mean flow pore size of the continuous fine fiber layer. For example, if the continuous fine fiber layer has a mean flow pore size range of 10 µm to 25 µm, the efficiency layer also has a mean flow pore size range of 10 µm to 25 µm. In another exemplary embodiment, if the continuous fine fiber layer has a mean flow pore size range of 15 µm to 20 µm, the efficiency layer also has a mean flow pore size range of 15 µm to 20 µm.

In some embodiments, the mean flow pore size (P50) of the fine fiber layer may be within 1%, 2%, 3%, 5%, 10%, 20%, 30%, 50%, 100%, or 200% of the mean flow pore size (P50) of the adjacent efficiency layer.

As noted above, in some embodiments, the continuous fine fiber layer has a narrower pore size distribution than the pore size distribution of the adjacent efficiency layer.

For example, in some embodiments, the efficiency layer adjacent to the fine fiber layer may have a P95/P50 ratio that is up to 1.5 times, up to 2 times, up to 3 times, up to 4 times, up to times, up to 6 times, up to 7 times, up to 8 times, up to 9 times, or up to 10 times larger than the P95/P50 ratio of the fine fiber layer.

In some embodiments, a resinous binder component is not necessary to obtain adequate strength for the efficiency layer. In some embodiments, a resinous binder component is not included in the efficiency layer.

In some embodiments, the efficiency layer includes Synteq XP™ synthetic liquid media having a 10 micron efficiency rating (Donaldson Company, Inc.) or Synteq XP™ synthetic liquid media having a 5 micron efficiency rating (Donaldson Company, Inc.)

Bicomponent Fiber

The efficiency layer includes a bicomponent fiber. Any suitable bicomponent fiber may be used, and the bicomponent fiber include any bicomponent fiber (or combination thereof) described in the Bicomponent Fiber section of Part A of this disclosure.

Efficiency Fine Fiber

The efficiency fiber may be made of any suitable material. For example, the efficiency fiber may include glass, metal, silica, polymeric fibers, or other related fibers, or mixtures thereof. The efficiency fiber is typically a monocomponent fiber with a diameter in a range of 0.1 μm to 50 μm or, more preferably, in a range of 0.1 μm to 10 μm.

In some embodiments, the efficiency fiber includes a glass fiber.

In some embodiments, the efficiency fiber includes a short cut fine fiber of a material other than glass. In some embodiments, the efficiency fiber preferably does not include a glass fiber.

The short cut fine fiber may include, for example, a hydrophilic, a hydrophobic, an oleophilic, or an oleophobic fiber.

The short cut fine fiber may include one or more of a variety of materials including naturally occurring cotton, linen, wool, various cellulosic and proteinaceous natural fibers, or a synthetic fiber including, for example, rayon, acrylic, aramide, nylon, polyolefin, polyester fibers.

Microfibrillated Fiber

The first and second filtration media each include a microfibrillated fiber. Any suitable microfibrillated fiber may be used, and the microfibrillated fiber may be any of those described in the Microfibrillated Fiber section of Part A of this disclosure.

Support Layer

The optional support layer (also referred to herein as a "substrate" or a "scrim") of the filter media may include any material suitable for providing support for the continuous fine fiber layer during manufacturing of the continuous fine fiber layer or during use of the continuous fine fiber layer or both. When a support layer is not included in the filter media, the continuous fine fiber layer may be formed directly on an efficiency layer.

In some embodiments, the support layer includes any of the support layers or features of the support layers described in the Support Layer section of Part B of this disclosure.

Additionally or alternatively, the support layer may include any of the features describes below.

The support layer may include or be made of any suitable porous material.

Typically, fibrous materials will be used for the support layer. The fibers of the support layer may be made of natural fiber and/or synthetic fibers. Suitable fibers may include cellulosic fiber, glass fibers, metal fibers, or synthetic polymeric fibers, or a combination or mixture thereof.

In certain embodiments, the support layer includes fibers having an average diameter of at least 5 microns, or at least 10 microns. In some embodiments, the support layer includes fibers having an average diameter of up to 250 microns.

In some embodiments, the support layer is at least 0.005 inch (125 microns) thick, and often at least 0.01 inch (250 microns) thick. In some embodiments, the support layer is up to 0.03 inch (750 microns) thick.

In some embodiments, the support layer has a basis weight of at least 8 $g/m^2$, at least 10 $g/m^2$, at least 15 $g/m^2$, or at least 20 $g/m^2$. In some embodiments, the support layer has a basis weight of up to 70 $g/m^2$, up to 100 $g/m^2$, or up to 150 $g/m^2$. In an exemplary embodiment, the support layer has a basis weight in a range of 8 $g/m^2$ to 150 $g/m^2$. In another exemplary embodiment, the support layer has a basis weight in a range of 15 $g/m^2$ to 100 $g/m^2$.

In some embodiments, the support layer has a solidity of at least 5%, at least 10%, at least 20%, at least 25%, at least 30%, or at least 40%. In some embodiments, the support layer has a solidity of up to 10%, up to 20%, up to 25%, up to 30%, up to 40%, or up to 50%. In an exemplary embodiment, the support layer has a solidity in a range of 10% to 40%. In another exemplary embodiment, the support layer has a solidity in a range of 20% to 30%.

In some embodiments, the support layer has a mean flow pore size of at least 5 μm, at least 10 μm, at least 15 μm, at least 20 μm, at least 25 μm, at least 30 μm, at least 35 μm, at least μm, or at least 45 μm. In some embodiments, the support layer has a mean flow pore size of up to 10 μm, up to 15 μm, up to 20 μm, up to 25 μm, up to 30 μm, up to 35 μm, up to 40 μm, up to 50 μm, up to 60 μm, up to 70 μm, up to 80 μm, up to 90 μm, or up to 100 μm. In an exemplary embodiment, the support layer has a mean flow pore size in a range of 10 μm to 25 μm. In another exemplary embodiment, the support layer has a mean flow pore size in a range of μm to 60 μm. In some embodiments, the mean flow pore size is preferably an average mean flow pore size determined using capillary flow porometry, as described in the Examples.

In some embodiments, the support layer has a maximum pore size of up to 10 μm, up to μm, up to 20 μm, up to 25 μm, up to 30 μm, up to 35 μm, up to 40 μm, up to 50 μm, up to 60 μm, up to 70 μm, up to 80 μm, up to 90 μm, up to 100 μm, or up to 150 μm. In an exemplary embodiment, the support layer has a maximum pore size of up to 90 μm. In another exemplary embodiment, the support layer has a maximum pore size of up to 70 μm.

In some embodiments, the maximum pore size of the support layer (for example, a nylon scrim) may be determined according to one of the following methods.

In some embodiments, the maximum pore size is an average maximum pore size determined using capillary flow porometry, as described in the Examples.

Alternatively, in some embodiments, a 10 inch×10 inch scrim is divided into nine equal parts and three samples are then taken from each part. The maximum pore size is taken as the average of the three largest measurements amongst the twenty-seven different tests.

In an additional alternative method, determination of the maximum pore size is performed by imaging fibers using SEM and measuring areas between fibers in the resulting micrographs. Image processing software such as ImageJ and/or (FIJI Is Just ImageJ (FIJI), an updated version of ImageJ, may then be used for pore size determination.

In some embodiments, the support layer has a minimum pore size of at least 5 μm, at least 10 μm, at least 15 μm, at least 20 μm, at least 25 μm, at least 30 μm, at least 35 μm, at least μm, or at least 50 μm. In an exemplary embodiment, the support layer has a minimum pore size of at least 20 μm.

In some embodiments, the minimum pore size is preferably an average minimum pore size determined using capillary flow porometry, as described in the Examples.

In some embodiments, the support layer preferably includes a consistent media structure—that is, the features of the media (including, for example, the pore size, solidity, basis weight, or thickness, or a combination of those features, or each of these features of the media) are consistent across the length and width of the media. For example, in an exemplary embodiment, the mean flow pore size does not vary by more than 30%, more preferably 25%, and even more preferably 15% across the length and width of the media Without wishing to be bound by theory, it is believed that the interplay between the fiber diameter of the fine fiber of the continuous fine fiber layer, the thickness of the continuous fine fiber layer or layers, and the maximum pore size of the support layer is critical to achieving a structurally sound and efficient media. For example, merely using a higher basis weight (for example, greater than 60 g/m$^2$) support layer does not result in a structurally sound media because, if the maximum pore sizes of the support layer are above a certain size (for example, 90 μm), if the fine fiber diameters are below a certain size, and/or if the fine fiber thickness is small, the continuous fine fiber layer will be structurally compromised during filtration at a sufficiently high pressure drop. For example, when smaller fine fibers (for example, having an average diameter of up to 500 nm) were used for a continuous fine fiber layer on a support layer having a maximum pore size of 88 μm, increasing the basis weight of the continuous fine fiber layer was found to require an unsustainably high pressure to move fluid through the media; in contrast, decreasing the basis weight of the continuous fine fiber layer caused the layer to become structurally compromised during filtration. Although increasing the fiber size of at least one of the fibers in the continuous fine fiber layer (for example, to an average diameter of at least 600 nm, more preferably, at least 900 nm) deposited on a support layer having a maximum pore size of 88 μm decreased the efficiency of the media, increasing the fiber size also decreased pressure drop and resulted in a structurally sound media that does not become structurally compromised during use.

The support layer may be formed of any suitable material. Examples of suitable material for the support layer include spunbond, wetlaid, carded, or melt-blown nonwoven materials, or combinations thereof including, for example, a spunbond-meltblown-spunbond. Fibers may be in the form of wovens or nonwovens. Examples of synthetic nonwovens include polyester nonwovens, nylon nonwovens, polyolefin (for example, polypropylene) nonwovens, polycarbonate nonwovens, or blended or multicomponent nonwovens thereof. Sheet-like support layers (for example, cellulosic, synthetic, and/or glass or combination webs) are typical examples of filter support layers. Other examples of suitable support layers include polyester or bicomponent polyester fibers or polypropylene/polyethylene terephthalate, or poly-ethylene/polyethylene terephthalate bicomponent fibers in a spunbond.

In some embodiments, the support layer may preferably include polymer fibers. The polymer or polymers of the polymer fiber may be selected for its adhesion to the polymer of the continuous fine fiber layer. In some embodiments, the polymer fibers may include nylon fiber or polyester fibers. For example, if the continuous fine fiber layer includes a nylon fine fiber, the support layer may preferably include nylon.

In some embodiments, the support layer may preferably include spunbond fibers.

In some embodiments, the support layer is a thin media (for example, less than 0.5 mm), that exhibits high permeability; high tensile strength; and small, uniform pore sizes.

In an exemplary embodiment, the support layer includes CEREX 23200 (Cerex Advanced Fabrics, Inc., Cantoment, FL). CEREX 23200 includes nylon 6,6, has a thickness of 8.4 mils (0.21 mm), a basis weight of 67.8 g/m$^2$, a solidity of 28%, and a permeability per solidity of 615.1.

Using capillary flow porometry, as described in the Examples, CEREX 23200 was found to have an average maximum pore size of 66.4 μm±21.9 μm, a mean flow pore size of 51.4 μm±12.1 μm, and an average minimum pore size of 29.1 μm±9.7 μm.

Features of the Nonwoven Filter Media and Composites and Methods of Using

The filter media or composites described herein may be used in any method contemplated by a skilled artisan.

In some embodiments, the filter media or composite described herein may be incorporated into a filter element.

In some embodiments, one or more of the filter media or composites described herein—including in Parts A through F, above, is suitable for incorporation in a medical face mask or face mask system, as further described below.

In some embodiment, the filter media exhibits the strength and durability to be folded, stitched, and/or hot welded during processing and still achieve desired filtration performance. In some embodiments, the nonwoven filter media or composite meets a National Institute for Occupational Safety and Health (NIOSH) standard such as NIOSH P95, NIOSH P99, NIOSH P100, NIOSH N95, NIOSH N99, and/or NIOSH 95 classifications, as codified in 42 C.F.R. § 84.

In some embodiments, the nonwoven filter media or composite exhibits sub-micron particular efficiency as defined by ASTM F2100-19 (the efficiency of the filter media in capturing aerosolized particles smaller than one micron, expressed as the percentage of a known number of particles that does not pass through the medical face mask material at a given flow rate) for a level 1 barrier, a level 2 barrier, and/or a level 3 barrier.

In an exemplary embodiment, the nonwoven filter media or composite exhibits an efficiency of at least 80%, at least 85%, at least 90%, at least 95%, at least 97%, at least 98%, or at least 99% at 10 feet per minute (FPM) flow for a 0.3 micron particle. In an exemplary embodiment, the nonwoven filtration media preferably exhibits an efficiency of at least 95%. In another exemplary embodiment, the nonwoven filter media or composite preferably exhibits an efficiency of at least 99%.

In an exemplary embodiment, the filter media or composite exhibits an efficiency of at least 80%, at least 85%, at least 90%, at least 95%, at least 97%, at least 98%, or at least 99% at feet per minute (FPM) flow for a 0.3 micron particle. In an exemplary embodiment, the filter media or composite preferably exhibits an efficiency of at least 95%. In another exemplary embodiment, the filter media or composite preferably exhibits an efficiency of at least 98%.

In some embodiments, the nonwoven filter media or composite exhibits a high air permeability or air flow. It is possible to increase efficiency to such a degree that the permeability or air flow decreases to the point that it is to maintain the wearer's ability to breathe freely.

In some embodiments, the nonwoven filter media or composite exhibits an air permeability (also referred to as Frazier air permeability or airflow) measured according to ASTM D737-18, entitled "Test Method for Air Permeability of Textile Fabrics," of at least 1 $ft^3/ft^2$/min at 0.5 inches of water, of at least 2 $ft^3/ft^2$/min at 0.5 inches of water, of at least $ft^3/ft^2$/min at 0.5 inches of water, at least 10 $ft^3/ft^2$/min at 0.5 inches of water, at least $ft^3/ft^2$/min at 0.5 inches of water, or at least 20 $ft^3/ft^2$/min at 0.5 inches of water. In some embodiments, the nonwoven filter media exhibits an air permeability measured according to ASTM D737-18 of up to 30 $ft^3/ft^2$/min at 0.5 inches of water, up to 50 $ft^3/ft^2$/min at 0.5 inches of water, or up to 100 $ft^3/ft^2$/min at 0.5 inches of water. In an exemplary embodiment, the nonwoven filter media or composite exhibits an air permeability in a range of 1 $ft^3/ft^2$/min at 0.5 inches of water to 100 $ft^3/ft^2$/min ft at 0.5 inches of water. In another exemplary embodiment, the nonwoven filter media or composite exhibits an air permeability in a range of 2 $ft^3/ft^2$/min at 0.5 inches of water to 30 $ft^3/ft^2$/min at 0.5 inches of water.

In some embodiments, the fibrous media exhibits an air permeability (also referred to as Frazier air permeability or airflow) measured according to ASTM D737-18, entitled "Test Method for Air Permeability of Textile Fabrics," of at least 1 $ft^3/ft^2$/min at 0.5 inches of water, of at least 2 $ft^3/ft^2$/min at 0.5 inches of water, of at least 5 $ft^3/ft^2$/min at 0.5 inches of water, at least $ft^3/ft^2$/min at 0.5 inches of water, at least 15 $ft^3/ft^2$/min at 0.5 inches of water, or at least $ft^3/ft^2$/min at 0.5 inches of water. In some embodiments, the fibrous media exhibits an air permeability measured according to ASTM D737-18 of up to 30 $ft^3/ft^2$/min at 0.5 inches of water, up to 50 $ft^3/ft^2$/min at 0.5 inches of water, or up to 100 $ft^3/ft^2$/min at 0.5 inches of water. In an exemplary embodiment, the fibrous media exhibits an air permeability in a range of 1 $ft^3/ft^2$/min at 0.5 inches of water to 100 $ft^3/ft^2$/min ft at 0.5 inches of water. In another exemplary embodiment, the fibrous media exhibits an air permeability in a range of 2 $ft^3/ft^2$/min at 0.5 inches of water to 30 $ft^3/ft^2$/min at 0.5 inches of water.

In some embodiments, the nonwoven filter media exhibits a dry basis weight of at least 10 $g/m^2$, at least 20 $g/m^2$, at least 25 $g/m^2$, at least 30 $g/m^2$, at least 35 $g/m^2$, at least 40 $g/m^2$, at least 50 $g/m^2$, at least 60 $g/m^2$, or at least 70 $g/m^2$. In some embodiment, the nonwoven filter media exhibits a dry basis weight of up to 100 $g/m^2$, up to 120 $g/m^2$, up to 140 $g/m^2$, up to 150 $g/m^2$, up to 160 $g/m^2$, up to 180 $g/m^2$, up to 200 $g/m^2$, up to 300 $g/m^2$, or up to 400 $g/m^2$. In certain embodiments, the nonwoven filter media of the present disclosure has a dry basis weight in a range of 25 $g/m^2$ to 300 $g/m^2$. In certain embodiments, the nonwoven filter media of the present disclosure has a dry basis weight in a range of 35 $g/m^2$ to 150 $g/m^2$. In an exemplary embodiment, the nonwoven filter media exhibits a dry basis weight in a range of 40 $g/m^2$ to 200 $g/m^2$. In another exemplary embodiment, the nonwoven filter media exhibits a dry basis weight in a range of 60 $g/m^2$ to 120 $g/m^2$.

In some embodiments, the fibrous media exhibits a dry basis weight of at least 10 $g/m^2$, at least 20 $g/m^2$, at least 25 $g/m^2$, at least 30 $g/m^2$, at least 35 $g/m^2$, at least 40 $g/m^2$, at least 50 $g/m^2$, at least 60 $g/m^2$, or at least 70 $g/m^2$. In some embodiment, the fibrous media exhibits a dry basis weight of up to 100 $g/m^2$, up to 120 $g/m^2$, up to 140 $g/m^2$, up to 150 $g/m^2$, up to 160 $g/m^2$, up to 180 $g/m^2$, up to 200 $g/m^2$, up to 300 $g/m^2$, or up to 400 $g/m^2$. In certain embodiments, the fibrous media of the present disclosure has a dry basis weight in a range of 25 $g/m^2$ to 300 $g/m^2$. In certain embodiments, the fibrous media of the present disclosure has a dry basis weight in a range of 35 $g/m^2$ to 150 $g/m^2$. In an exemplary embodiment, the fibrous media exhibits a dry basis weight in a range of 40 $g/m^2$ to 200 $g/m^2$. In another exemplary embodiment, the fibrous media exhibits a dry basis weight in a range of 60 $g/m^2$ to 120 $g/m^2$.

In some embodiments, the nonwoven filter media exhibits a thickness of at least 100 microns, at least 150 microns, at least 0.2 mm, at least 0.25 mm, at least 0.3 mm, at least 0.35 mm, or at least 0.4 mm. In some embodiments, the nonwoven filter media exhibits a thickness of up to 1 mm, up to 1.1 mm, up to 1.2, mm, up to 1.3 mm, up to 1.4 mm, or up to 1.5 mm, up to 4 inches (10.2 cm), or up to 5 mm. In an exemplary embodiment, the nonwoven filter media exhibits a thickness in a range of 0.25 mm to 1.5 mm. In another exemplary embodiment, the nonwoven filter media exhibits a thickness in a range of 0.4 mm to 1.0 mm.

In some embodiments, the fibrous media exhibits a thickness of at least 100 microns, at least 150 microns, at least 0.2 mm, at least 0.25 mm, at least 0.3 mm, at least 0.35 mm, or at least 0.4 mm. In some embodiments, the fibrous media exhibits a thickness of up to 1 mm, up to 1.1 mm, up to 1.2, mm, up to 1.3 mm, up to 1.4 mm, or up to 1.5 mm, up to 4 inches (10.2 cm), or up to 5 mm. In an exemplary embodiment, the fibrous media exhibits a thickness in a range of 0.25 mm to 1.5 mm. In another exemplary embodiment, fibrous media exhibits a thickness in a range of 0.4 mm to 1.0 mm.

In some embodiments, the stiffness of the nonwoven filter media or composite may be quantified using Gurley stiffness, which may be at least 2000 mg in some instances. In some other instances the Gurley stiffness may be under 2000 mg, however. The Gurley stiffness may be calculated using a Gurley stiffness tester meeting industry standards TAPPI #T543 OM-16 (2016) and ASTM D6125-97 (2007).

Face Mask Systems

In some embodiments, a filter media or a composite described herein may be incorporated into a filter element. In some embodiments, combinations of the filter media and composites described herein may be incorporated into a filter element.

In some embodiments, the filter element may preferably be incorporated in a face mask system. In some embodiments, one or more of the filter media or composites described herein-including in Parts A through F, above, may be incorporated in a face mask system.

Figure 3:
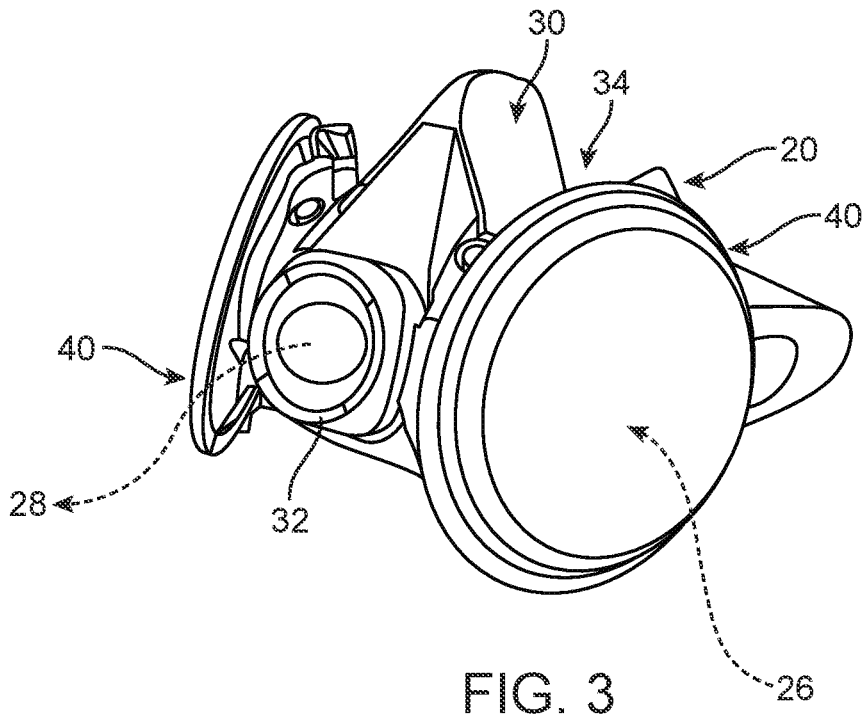
FIG. 3 is a perspective view of one illustrative embodiment of a face mask system in the form of a re-usable respirator.
Figure 4:
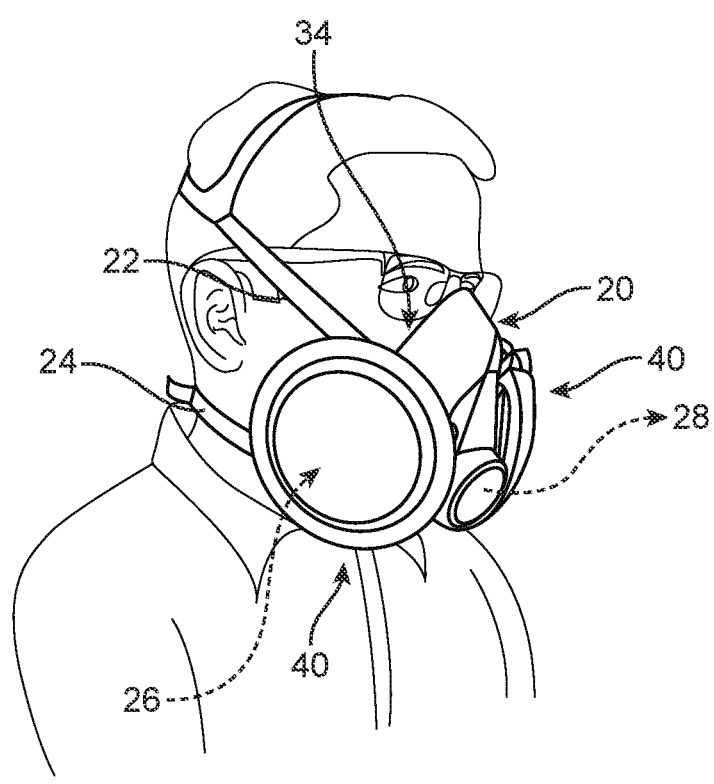
FIG. 4 depicts the respirator of FIG. 3 in place on a wearer.

FIGS. 3-4 depict one illustrative embodiment of a face mask system in the form of a re-usable respirator having a face mask 30 with a pair of filter elements attached thereto. The depicted face mask system 20 includes a face mask 30 defining a face receptacle 34 and a filter element 40 coupled to the face mask 30. The filter element 40 is generally consistent with filter elements described herein. The face mask system 20 defines an intake airflow pathway 26 extending from the ambient environment to the face receptacle 34. The filter element 40 is disposed across the intake airflow pathway 26.

The face receptacle 34 is configured to receive a portion of the face of a wearer. In particular, the face receptacle 34 is configured to receive the nose and mouth of a wearer when the face mask system 20 is in place over the nose and mouth of a wearer as depicted in, for example, FIG. 4. The face mask 30 may be constructed of a variety of different materials such as flexible elastomeric materials, foams, polymers, etc. In various embodiments, the face mask 30 is constructed of a material that is substantially impermeable to airflow therethrough. The construction of face masks is well known and will not be further described herein.

With reference to FIG. 4, the depicted embodiment of face mask system 20 includes a retaining feature that is configured to retain the face receptacle 34 of the face mask system 20 on the face of the wearer. The retaining feature includes a head harness 22 that is configured to receive the head of the wearer. The retaining feature includes a strap 24 that is configured to extend around the head or neck of the wearer.

The depicted embodiment of face mask system 20 includes an exhalation valve 32 defining an exhaust airflow pathway 28 from the face receptacle 34 to the ambient environment. The exhalation valve 32 is generally configured to allow the passage of respiratory gases emitted by a wearer out of the face receptacle 34 defined by the face mask 30. The exhalation valve 32 is configured as a one-way valve, in a variety of embodiments. As such, although the exhalation valve 32 allows respiratory gases to exit the face receptacle 34, the exhalation valve 32 also prevents the entry of ambient air into the face receptacle 34.

Air enters the face receptacle 34 defined by the face mask 30 through apertures formed in the face mask 30. A filter element 40 is attached to the face mask 30 over apertures formed in the face mask 30. The intake airflow pathway 26 extends through the apertures. The filter elements 40 are positioned upstream of the face receptacle 34 such that air passing into the face receptacle 34 from the ambient environment first passes through the filter elements 40. In some embodiments, each filter element 40 is incorporated into a replaceable filter cartridge. Although the depicted embodiment includes two filter elements 40, it should be understood that as few as one filter element 40 or three or more filter elements 40 may be used in one or more alternative embodiments of reusable respirators as described herein.

Further, although the filter elements 40 are depicted here as located on an exterior surface of the face mask 30, it should be understood that in one or more alternative embodiments, the filter elements 40 may be contained within housings or other protective structures. Such housings or protective structures may be configured to prevent physical damage to the filter elements 40 during use.

Figure 5:
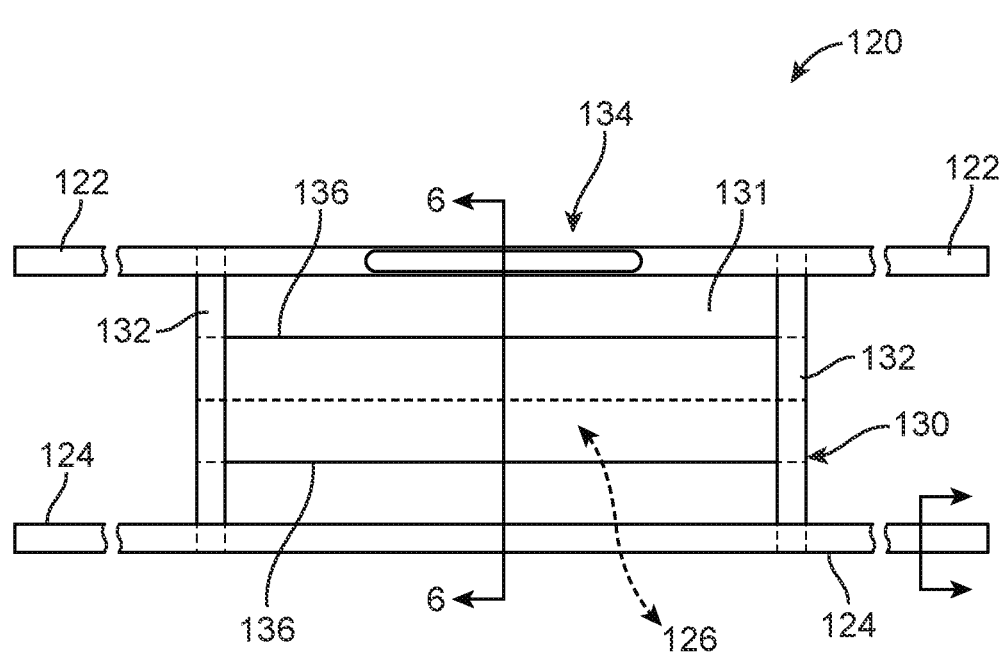
FIG. 5 depicts one illustrative embodiment of a face mask system in the form of a surgical mask incorporating one or more of the filter elements as described herein.
Figure 6:
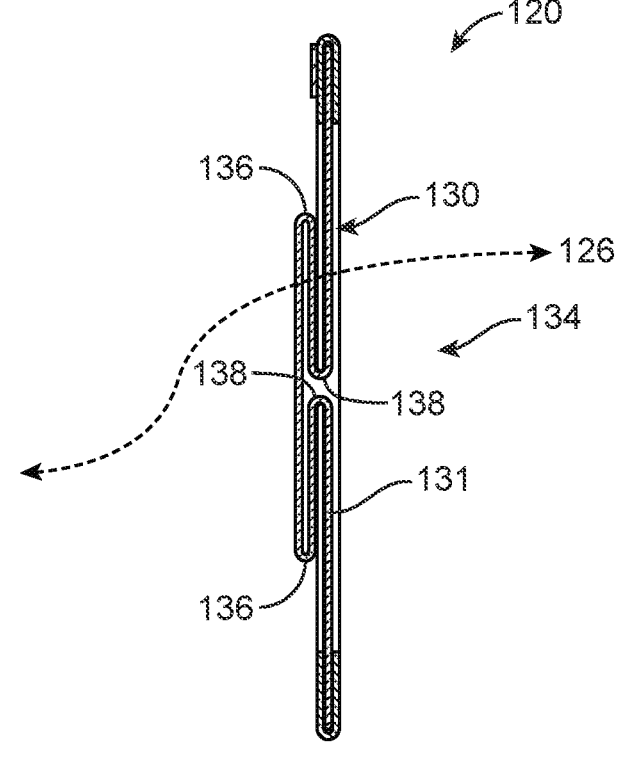
FIG. 6 is a cross-sectional view of the surgical mask of FIG. 5 taken along line 6-6 in FIG. 5.

FIGS. 5-6 depict another illustrative embodiment of a face mask system in the form of a surgical mask incorporating one or more of the filter elements 131 as described herein. The face mask system 120 includes a face mask 130 incorporating one or more of the filter elements 131 described herein. The face mask 130 defines a face receptacle 134 that is configured to receive a portion of the face of a wearer. In examples, the face receptacle 134 is configured to extend over the nose and mouth of a wearer. The face mask system 120 defines an airflow pathway 126 extending from the ambient environment to the face receptacle 134, which is an intake airflow pathway. The one or more filter elements 131 are disposed across the airflow pathway 126. In this example, the airflow pathway 126 is both the intake airflow pathway and an exhaust airflow pathway (extending from the face receptacle 134 to the ambient environment).

The face mask system 120 has a retaining feature that is configured to retain the position of the face receptacle 134 on the face of the wearer. The retaining feature includes upper straps 122 and lower straps 124. In the current example, each of the upper straps 122 and lower straps 124 that are configured to be tied together or otherwise coupled behind the head of a wearer. In some alternate embodiments, one or both of the upper straps 122 and lower straps 124 may be a single elastic strap, for example, that forms a loop with the face mask 130 that is configured to extend around the head of the wearer. In some alternate embodiments, each upper strap 122 corresponding lower strap 124 may be connected together to form a single elastic strap, for example, that forms a loop with the face mask 130 that is configured to extend around an ear of the wearer. Other configurations are certainly possible.

One or more of filter elements 131 described herein may form at least a portion of the face mask 130. The filter element 131 may be positioned upstream of the face receptacle 134 such that air passing into the face receptacle 134 from the ambient environment first passes through the filter element 131. The filter element 131 of the face mask system 120 may define folds, such as external folds 136 and internal folds 138 (see FIG. 6). The folds 136, 138 in the filter element 131 may be configured to increase the surface area of filter media available for filtration. The folds 136, 138 in the filter element 131 may allow the face mask 130 and, therefore, the face receptacle 134, to expand to accommodate the face of a wearer. In the current example, the face mask 130 includes edge bands 132 on opposite sides of the face mask 130. Although the depicted embodiment of surgical mask includes a face mask 130 defining folds, it will be understood that one or more alternative embodiments of face masks in the form of surgical masks incorporating one or more filter elements as described herein may or may not include folds. Moreover, the number of folds and placement of any such folds may also vary. Edge bands may be used to maintain folds formed in the face mask 130 of the face mask system 120.

In surgical masks such as the face mask system 120 depicted in FIGS. 5-6, the filter elements described herein may be incorporated into the face mask 130 of the face mask system 120. In one or more embodiments, the filter elements described herein may constitute substantially all of the face mask 130 of the face mask system 120.

Figure 7:
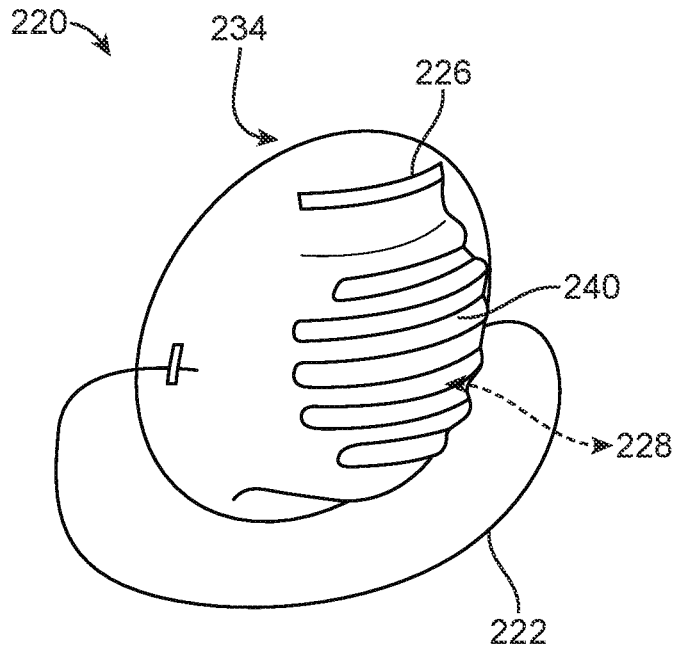
FIG. 7 is a perspective view of one illustrative embodiment of a face mask system in the form of a filtering facepiece respirator comprising a molded, cup-shaped face mask incorporating one or more filter elements as described herein.
Figure 8:
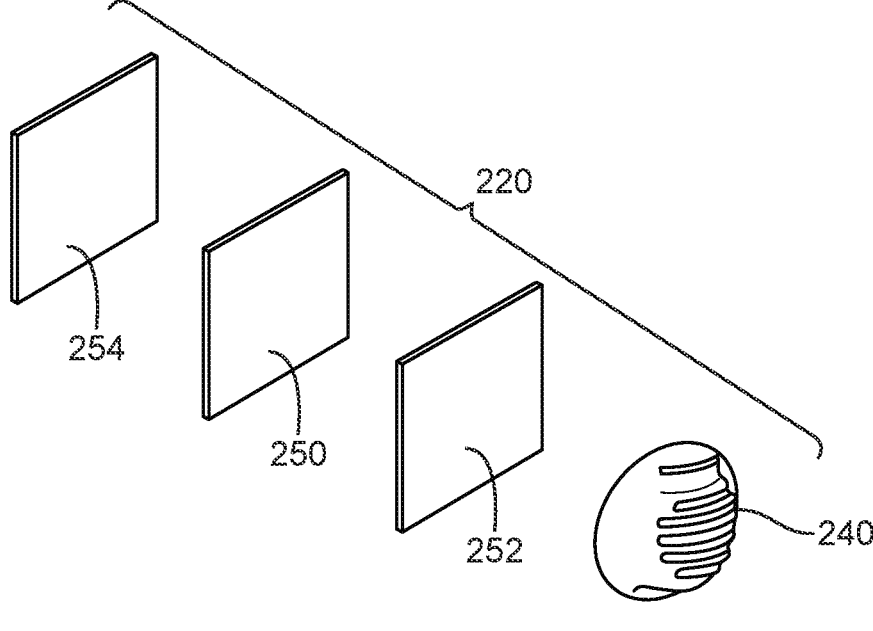
FIG. 8 is an exploded diagram of the face mask of FIG. 7.

FIGS. 7-8 depict another illustrative embodiment of a face mask system 220 in the form of a filtering facepiece respirator comprising a molded, cup-shaped face mask 240 incorporating one or more filter elements as described herein. A filter element is coupled to or defines the shape of at least a portion of the face mask 240. The face mask 240 defines a face receptacle 234 that is configured to receive a portion of the face of a wearer, such as the nose and mouth of a wearer. The face mask system 220 defines an airflow pathway 228 extending from the ambient environment to the face receptacle 234, which may be referred to as an intake airflow pathway. The filter element is disposed across the airflow pathway 228. The filter element is positioned upstream of the face receptacle such that air passing into the face receptacle 234 from the ambient environment first passes through the filter element. In this example, the airflow pathway 228 also defines an exhaust airflow pathway extending from the face receptacle 234 to the ambient environment.

The depicted face mask system 220 includes one or more retaining features 222 configured to retain the face mask in place over the nose and mouth of a wearer. In particular, the retaining feature 222 may be an elastic band that is configured to wrap around the head of the wearer. In one or more embodiments, the face receptacle 234 of the face mask system 220 may include a deformable nose clip 226 configured to assist in sealing the face mask over the nose of a wearer.

The face mask system 220 includes a face mask 240 that has a molded, cup-shape similar to known filtering facepiece respirators. The face mask 240 defines the face receptacle 234 having a downstream air space containing the nose and mouth of a wearer when the face mask system 220 is in place over the nose and mouth of a wearer. The downstream air space is configured to be downstream of the filter element.

With reference to FIG. 8, the face mask 240 may be constructed of one or more different layers/components 250, 252, and 254, at least one of which may be a filter element as described herein. In one or more embodiments, one or more of the different layers/components may be provided to assist the face mask 240 in retaining its cup shape where, for example, the filter element layers/components may not have sufficient stiffness to retain that shape. Any such layers/components preferably do not significantly increase flow resistance through the face mask 240. The different layers/components may be attached to each other through any suitable technique or combination of techniques including, but not limited to, thermal bonding, chemical bonding, adhesives, sewing, welding, etc.

Figure 12:
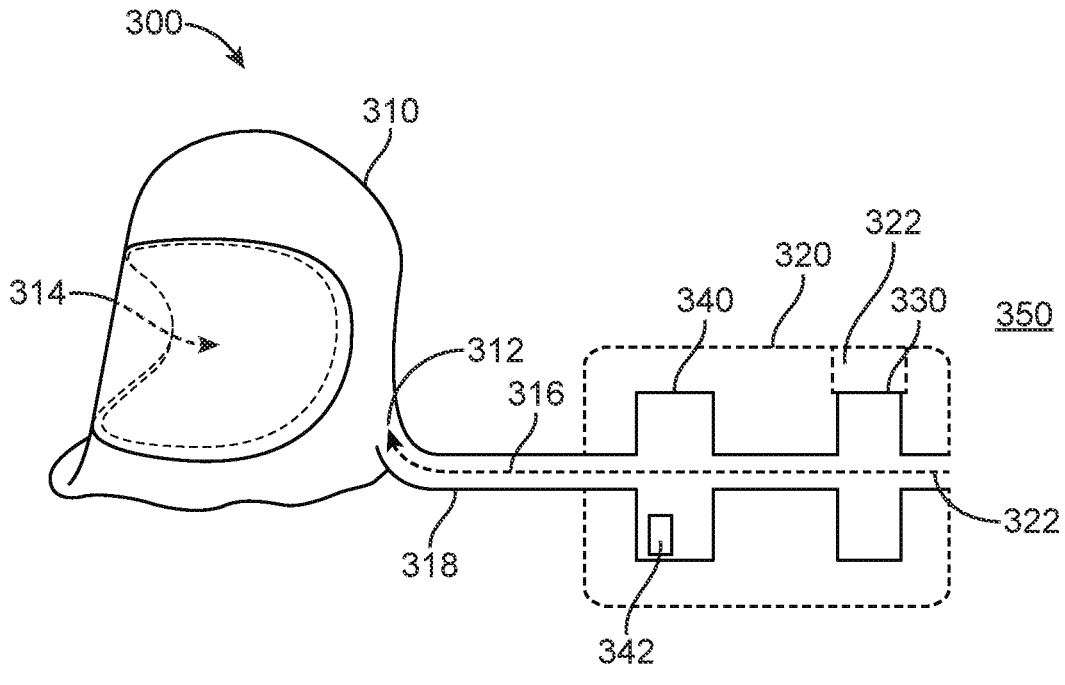
FIG. 12 shows a schematic representation of another example of a face mask system described herein.

FIG. 12 depicts another illustrative embodiment of a face mask system in a powered air purifying respirator 300. The powered air purifying respirator 300 has a face mask 310 in fluid communication with the ambient environment 350 through a filter element 330. The powered air purifying respirator 300 defines an intake airflow pathway 316 from the ambient environment 350 to a face receptacle 314 defined by the face mask 310. In particular, the powered air purifying respirator 300 defines an air inlet 322 at the ambient environment and an air outlet 312 that is an aperture defined by the face mask 310. The filter element 330 is disposed across the intake airflow pathway 316. As such, the intake airflow pathway 316 extends from the air inlet 322 to the mask body 310 through the filter element 330.

The face mask 310 defines a face receptacle that is configured to receive a portion of the face of a wearer. The face mask 310 is generally configured to isolate at least a portion of a wearer's face from the ambient environment 350. As such, the face mask 310 is generally constructed of a substantially impermeable material. The face receptacle 314 defines a relatively clean air space containing the nose and mouth of a wearer when the face mask 300 is in place over the nose and mouth of a wearer.

The face mask 310 generally has a retaining feature that is configured to retain the position of the face mask 310 relative to the wearer. In particular, in the current example, the face mask 310 is a helmet that is configured to receive the entire head of a wearer. The retaining feature may be a harness within the helmet that is configure to secure to a wearer's head, or the retaining feature may be an upper portion of the helmet that is configured to rest on, and extend over the wearer's head. In some other embodiments the face mask 310 may be configured to be limited to receiving a portion of the face of a wearer, such as the user's nose and mouth. In yet other embodiments, the face mask 310 is a component of a garment that is configured to receive the entire body of a user. In some embodiments the face mask 310 is configured to be at least partially optically transparent. The face mask 310 may be constructed of a variety of different materials and combinations of materials. In various embodiments, the face mask 310 is constructed of a substantially impermeable material. Various configurations are contemplated, which are generally known in the art.

Similar to the example discussed above with reference to FIGS. 3-4, the face mask may include an exhalation valve that is a one-way valve defining an exhaust airflow pathway from the face receptacle to the ambient environment. The exhalation valve may be configured to allow the passage of respiratory gases emitted by a wearer out of the face receptacle 314. Such an exhalation valve would generally be configured to prevent the entry of ambient air into the face receptacle 314.

Air enters the aperture leading to the face receptacle 314 defined by the face mask 310 from an outlet 312 of an airflow conduit 318 that defines at least a portion of the intake airflow pathway 316. An air generator 340 is configured to generate airflow along the intake airflow pathway 316 and through the filter element 330. The air generator 304 may be a blower, such as a motorized blower, in various embodiments. The air generator 304 may be an air pump, in some embodiments. A power source 342 may be in operative communication with the air generator 304. The power source 342 may be an electrical power source such as a battery pack, for example.

The filter element 330 is generally in fluid communication with the face receptacle 314. More particularly, the filter element 330 is generally upstream of the face receptacle 314 along the intake airflow pathway 316. The filter element 330 is remote from the face mask 310 in this example system, meaning that the filter element 330 is separated from the face mask 310 by a portion of the intake airflow pathway 316. In some embodiments the filter element 330 and the air generator 340 are housed in a housing 320. The housing 320 may define a filter access point 322 through which the filter element 330 may be replaced by a user. While, in the current embodiment, the air generator 340 is depicted as downstream of the filter element 330, in some embodiments the air generator 340 may be upstream of the filter element 330. While a single filter element 330 is currently depicted, in some embodiments multiple filter elements may be incorporated in the face mask system 300.

Filter Element

In some embodiments, the filter media disclosed herein may be included in a filter element. In some embodiments, the filter element may include a wire support. The wire support may be located downstream of the support layer.

Combinations of the filter media and composites disclosed herein may also be included in a filter element. For example, in an exemplary embodiment, a filter media including microfibrillated fibers (Part A of this disclosure) may be combined with a filter media including continuous fine fibers (Part F of this disclosure). In another exemplary embodiment, a glass-free filter media (Part D of this disclosure) may be combined with a filter media including continuous fine fibers (Part F of this disclosure). In yet another exemplary embodiment, a glass-free composite (Part E of this disclosure) may be combined with a filter media including continuous fine fibers (Part F of this disclosure). In a further exemplary embodiment, a filter media including an electrostatically charged filter media (Part B of this disclosure) may be combined with a glass-free filter media (Part D of this disclosure).

In some embodiments, the filter media, including, for example, a filter media encompassed in a filter element, is pleated.

Exemplary filter elements include flat-panel filters, cartridge filters, or other filtration components. Examples of such filter elements are described in U.S. Pat. Nos. 6,746, 517; 6,673,136; 6,800,117; 6,875,256; 6,716,274; and 7,316, 723.

Additional exemplary filter elements include filter elements that may be incorporated in a face mask such as a surgical mask, a filtering facepiece respirator, or a re-usable respirator, or a powered air purifying respirator. In some embodiments, the filter element includes a filter media which has been folded, stitched, and/or hot welded.

Panel Filter

Figure 13:
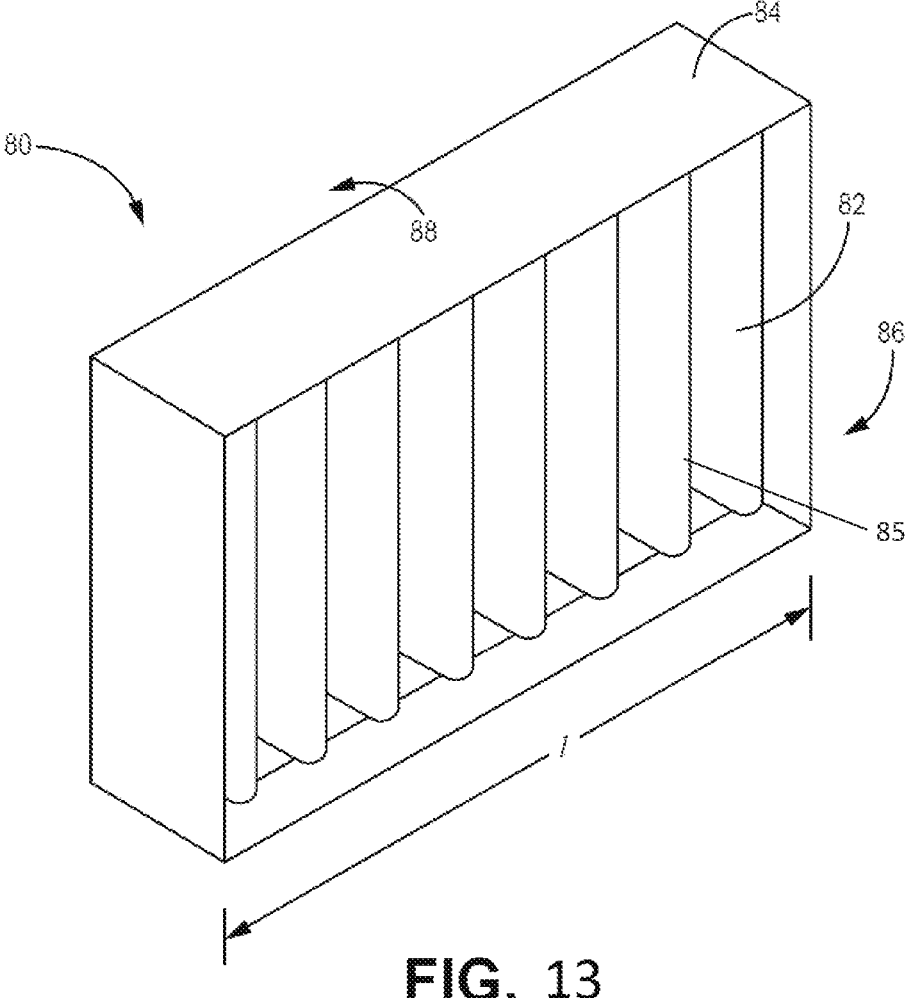
FIG. 13 depicts a schematic example panel filter element consistent with the technology disclosed herein.
Figure 14:
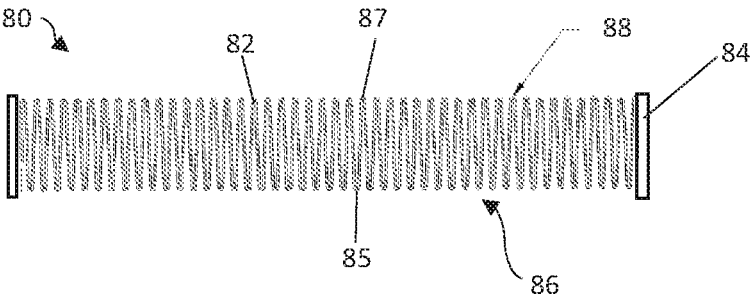
FIG. 14 depicts an example cross-sectional view consistent with the panel filter element of FIG. 13.

In various embodiments, the filter media described herein may be incorporated into filter elements to be used in filtration systems. For example, the filter media may be used to form a panel filter element. FIG. 13 depicts a perspective view of one example panel filter element 80 and FIG. 14 depicts an example cross-sectional view a panel filter element 80. The panel filter element 80 may be constructed of filter media 82 consistent with the technology disclosed herein. The filter media 82 has an upstream side 86 and a downstream side 88 of the panel filter element 80. A frame component 84 is generally secured to the perimeter of the filter media 82. The frame component 84 is generally sealably coupled to the filter media 82 about its perimeter. In a variety of embodiments, the perimeter of the filter media is secured in the frame component 84 with epoxy or other adhesive.

In the current example, the filter media 82 is pleated. In particular, the filter media 82 defines a first set of pleat folds 85 forming a first face of the filter element 80. The filter media 82 defines a second set of pleat folds 87 forming a second face of the filter element 80. The filtration media 82 extends between the first set of pleat folds 85 and the second set of pleat folds 87 in a back-and-forth arrangement. Fluid flows into the panel filter element 80 through one face and then out of the opposite face.

While a panel filter is currently described, it will be appreciated that filter media made in accordance with the presently-disclosed technology may be assembled into numerous shapes and configurations, including cylindrical filters, and conical filters. In cylindrical or conical filters, the filter media may be pleated and generally formed into a tube or cone (or a partial section of a tube or cone), with a first face of the pleated media (defined by a first set of pleat folds) creating an interior face, and the second face of the pleated media (defined by a second set of pleat folds) forming an outside face. In the case of cylindrical and conical filters for air filtration, air typically flows into the filter element from the outside face to the interior face or from the interior face to the outside face.

Air Intake Streams and Cabin Air Filtration

In some embodiments, the filter media described herein may be incorporated into a filter element for removal of some or all of the particulate material from an air stream. For example, air intake streams to the cabins of motorized vehicles, air in computer disk drives, HVAC air, portable air purifiers (also referred to as personal air purifiers), clean room ventilation and applications using filter bags, barrier fabrics, woven materials, air to engines for motorized vehicles, or to power generation equipment, and, air streams to various combustion furnaces, often include particulate material therein. In the case of cabin air filters it is desirable to remove the particulate matter for comfort of the passengers and/or for aesthetics. With respect to air streams to engines and combustion furnaces, it is desirable to remove the particulate material because particulate may cause substantial damage to the internal workings to the various mechanisms involved.

In some embodiments, a filter media for incorporation into a filter element for removal of some or all of the particulate material from an air stream may preferably include a fine fiber layer. Without wishing to be bound by theory, it is believed that the addition of the fine fiber layer may result in increased efficiency or improve life of the filter when subjected to pulsing conditions.

Filtration of Other Liquids

Other (non-air) fluid streams may also carry particulate material therein. A non-air fluid stream may include, for example, fuel, hydraulic oil, process water, air, diesel engine fluid (DEF), diesel engine lube oil, blow-by gas, etc., and combinations thereof. For example, a method of using a filter media or composite as described herein may include passing a liquid stream comprising a contaminant through the filter media or composite, and removing the contaminant from the liquid stream.

In some embodiments, the filter media described herein may be incorporated into a filter element for removal of some or all of the particulate material from a fluid stream.

Without wishing to be bound by theory, it is believed that the media described herein, particularly the media including at least one PET fiber having a diameter intermediate between the diameter of the glass fibers and the microfibrillated cellulose fibers and the diameter of the bicomponent fibers, will exhibit increased end-of-life performance due to the increased stability of the structure.

In some filter media including glass fibers and bicomponent fibers but no resin, shifting of the fibers during use has been observed, resulting in changing pore sizes, and, in some instances, resulting in decreased efficiency over the lifetime of the filter. As noted above, it is believed that the use of a fiber having a diameter intermediate between the diameter of the glass fibers and the microfibrillated cellulose fibers and the diameter of the bicomponent fibers may help prevent fiber migration during use of the media, improving end-of-life performance.

Pleating

In some embodiments, a filter media or a filter element as described herein may be pleated.

Surprisingly, it has been found that the media described herein, particularly the media including at least one PET fiber having a diameter intermediate between the diameter of the glass fibers and the microfibrillated cellulose fibers and the diameter of the bicomponent fibers, exhibits adequate tensile strength for pleating without the use of an additional scrim or support layer or the use of a resin.

In various embodiments, the filter media disclosed herein is self-supporting, meaning that, upon undergoing pleating, the filter media exhibits a stiffness allowing it to maintain a pleated configuration under the force of gravity and/or the forces undergone during filtration operations. In various embodiments, the filter media may advantageously be self-supporting absent any scrim layers. For example, as noted above, in some embodiments, the stiffness of the filter media may be quantified using Gurley stiffness, which may be at least 2000 mg. In some embodiments, the filter media may be sufficiently pliable that it may be pleated without breaking or cracking.

Pleating operations are generally known. In various embodiments, the filter media is fed from a roller to a pleater, where the filter media is folded to define a first set of pleat folds defining a first face and a second set of pleat folds defining a second face. The pleater may be a blade pleater, although other equipment may also be used. In some embodiments heating while folding the filter media is not necessary, while in some other embodiments it may be desirable to heat the filter media during pleat formation. Following folding of the filter media, the filter media is fed out of the pleater. The filter media may be cut at a cutting station, where the filter media is cut into segments having a desired length that will generally correspond to the desired size of the resulting filter element at a particular pleat density.

Exemplary Filter Media Aspects–Filter Media Including Microfibrillated Cellulose Aspect A1 is a filter media comprising a fibrous layer comprising: microfibrillated cellulose fibers; glass fibers; and multi-component binder fibers.

Aspect A2 is the filter media of Aspect A1, wherein the glass fibers form a gradient from a high concentration at one major surface of the fibrous layer to little or no glass fibers at the other major surface of the fibrous layer.

Aspect A3 is the filter media of Aspect A2, wherein the filter media comprises two fibrous layers each comprising microfibrillated cellulose fibers, glass fibers, and multi-component binder fibers; and further wherein the two layers are oriented with the major surfaces having a high glass concentration adjacent each other.

Aspect A4 is the filter media of any of Aspects A1 to A3, wherein the microfibrillated cellulose fibers and multi-component fibers are distributed uniformly throughout the fibrous media.

Aspect A5 is the filter media of any of Aspects A1 to A4, wherein the multi-component fibers comprise at least one component that is a thermoplastic polymer for thermally bonding with other fibers in the media.

Aspect A6 is the filter media of any of Aspects A1 to A5, wherein the multi-component fibers comprise bicomponent fibers.

Aspect A7 is the filter media of any of Aspects A1 to A6, the filter media further wherein the fibrous media further comprises a PET fiber, a dyed fiber, a conductive fiber, or a combination thereof.

Aspect A8 is the filter media of Aspect A7, wherein the PET fiber comprises a PET fiber having a diameter in a range of 2 μm to 3 μm; a crimped PET fiber; and/or a dyed PET fiber.

Aspect A9 is the filter media of any of Aspects A1 to A8, wherein the nonwoven filter media further comprises a fine fiber layer.

Aspect A10 is the filter media of Aspect A9, wherein the fine fiber layer comprises an electrospun layer, the fine fibers having been deposited by electrospinning directly on the fibrous media.

Aspect A11 is the filter media of any of Aspects A1 to A10, wherein the microfibrillated cellulose fibers are present in an amount of 1 wt-% to 49 wt-%, based on the total weight of the fibrous media; the glass fibers are present in an amount of 10 wt-% to 80 wt-%, based on the total weight of the fibrous media; and/or the multi-component fibers are present in an amount of 10 wt-% to 80 wt-%, based on the total weight of the fibrous media.

Aspect A12 is the filter media of any of Aspects A1 to A11, wherein the microfibrillated cellulose fibers are present in an amount of 1 wt-% to 49 wt-%, based on the total weight of the fibrous media; wherein the multi-component fibers are present in an amount of 10 wt-% to 80 wt-%, based on the total weight of the fibrous media; and wherein the fibrous media comprises two major surfaces and the glass fibers are present in an amount of 10 wt-% to 80 wt-% based on the total weight of the fibrous media at one major surface and in an amount of 0 wt-% to 10 wt-% based on the total weight of the fibrous media at the other major surface.

Aspect A13 is the filter media of any of Aspects A1 to A12, wherein the filter media exhibits an efficiency of at least 80%, at least 85%, at least 90%, at least 95%, at least 97%, at least 98%, or at least 99% at 10 feet per minute (FPM) flow for a 0.3 micron particle.

Aspect A14 is the filter media of any of Aspects A1 to A13, wherein the filter media exhibits an air permeability of at least 1 $ft^3/ft^2$/min at 0.5 inches of water, of at least 2 $ft^3/ft^2$/min at 0.5 inches of water, of at least 5 $ft^3/ft^2$/min at 0.5 inches of water, at least 10 $ft^3/ft^2$/min at 0.5 inches of water, at least 15 $ft^3/ft^2$/min at 0.5 inches of water, or at least 20 $ft^3/ft^2$/min at 0.5 inches of water; and/or up to 30 $ft^3/ft^2$/min at 0.5 inches of water, up to 50 $ft^3/ft^2$/min at 0.5 inches of water, or up to 100 $ft^3/ft^2$/min at 0.5 inches of water. The air permeability is measured according to ASTM D737-18, entitled "Test Method for Air Permeability of Textile Fabrics."

Aspect A15 is the filter media of any of Aspects A1 to A14, wherein the filter media exhibits a dry basis weight of at least 10 $g/m^2$, at least 20 $g/m^2$, at least 25 $g/m^2$, at least 30 $g/m^2$, at least 35 $g/m^2$, at least 40 $g/m^2$, at least 50 $g/m^2$, at least 60 $g/m^2$, or at least 70 $g/m^2$; and/or up to 100 $g/m^2$, up to 120 $g/m^2$, up to 140 $g/m^2$, up to 150 $g/m^2$, up to 160 $g/m^2$, up to 180 $g/m^2$, up to 200 $g/m^2$, up to 300 $g/m^2$, or up to 400 $g/m^2$.

Aspect A16 is the filter media of any of Aspects A1 to A15, wherein the filter media exhibits a thickness of at least 100 microns, at least 150 microns, at least 0.2 mm, at least 0.25 mm, at least 0.3 mm, at least 0.35 mm, or at least 0.4 mm; and/or up to 1 mm, up to 1.1 mm, up to 1.2, mm, up to 1.3 mm, up to 1.4 mm, or up to 1.5 mm, up to 4 inches (10.2 cm), or up to 5 mm.

Aspect A17 is the filter media of any of Aspects A1 to A16, wherein the filter media exhibits a Gurley stiffness of at least 2000 mg.

Aspect A18 is the filter media according to any of Aspects A1 to A17, wherein the filter media meets NIOSH P95, NIOSH P99, NIOSH P100, NIOSH N95, NIOSH N99, and/or NIOSH N95 classifications, as codified in 42 C.F.R. § 84.

Aspect A19 is the filter media according to any of Aspects A1 to A18, wherein the filter media exhibits submicron particular efficiency as defined by ASTM F2100-19 for a level 1 barrier, a level 2 barrier, and/or a level 3 barrier.

Aspect A20 is a method of filtering a liquid stream, the method comprising, passing a liquid stream comprising a contaminant through a filter media, the filter media comprising the filter media of any of Aspects A1 to A19, and removing the contaminant from the liquid stream. Aspect A21 is the method of Aspect A20, wherein the liquid stream comprises air.

Exemplary Filter Media Aspects–Filter Media Including Electrostatically Charged Filter Media Aspect B1 is a filter media comprising a support layer, a fine fiber layer in contact with the support layer, and an electrostatically charged filter media.

Aspect B2 is the filter media of Aspect B1, wherein the electrostatically charged filter media has a first major surface and a second major surface, and wherein the first major surface is in contact with the fine fiber layer.

Aspect B3 is the filter media of Aspect B1 or B2, wherein the filter media is configured for air to pass through the electrostatically charged filter media, then the fine fiber layer, and then the support layer.

Aspect B4 is the filter media of any of Aspects B1 to B3, the filter media further comprising a second support layer.

Aspect B5 is the filter media of Aspect B4, wherein the second support layer is in contact with the second major surface of the electrostatically charged filter media.

Aspect B6 is the filter media of any of Aspects B1 to B5, wherein the electrostatically charged filter media comprises polypropylene and acrylic fibers.

Aspect B7 is the filter media of any of Aspects B4 to B6, wherein the electrostatically charged filter media overlays all or part of the second support layer.

Aspect B8 is the filter media of any of Aspects B1 to B7, the fine fiber layer comprises a fine fiber comprising a nanofiber.

Aspect B9 is the filter media of any of Aspects B1 to B8, the fine fiber layer comprises a fine fiber comprising a fiber-forming polymer material.

Aspect B10. A filter media comprising a first support layer and a second support layer, a first fine fiber layer in contact with the first support layer, a second fine fiber layer in contact with the second support layer, wherein the first fine fiber layer is in adjacent to the second fine fiber layer.

Aspect B11 is a filter media comprising a support layer, a fine fiber layer in contact with the support layer, and an electrostatically charged filter media having a first major surface and a second major surface, the first major surface being in contact with the fine fiber layer.

Aspect B12 is the filter media of any of Aspects B1 to B11, wherein the filter media meets NIOSH P95, NIOSH P99, NIOSH P100, NIOSH N95, NIOSH N99, and/or NIOSH N95 classifications, as codified in 42 C.F.R. § 84.

Aspect B13 is the filter media of any of Aspects B1 to B12, wherein the filter media exhibits sub-micron particular efficiency as defined by ASTM F2100-19 for a level 1 barrier, a level 2 barrier, and/or a level 3 barrier.

Aspect B14 is a method of filtering a liquid stream, the method comprising passing a liquid stream comprising a contaminant through a filter media, the filter media comprising the filter media of any of Aspects B1 to B13, and removing the contaminant from the liquid stream.

Aspect B15 is the method of Aspect B14, wherein the liquid stream comprises air.

Exemplary Filter Media Aspects~Glass Free Filter Media Aspects

Aspect C1 is a nonwoven filter media comprising: 25 wt-% to 85 wt-% of a bicomponent fiber having a fiber diameter in a range of 5 microns to 25 microns and a fiber length of 0.1 cm to 15 cm; 5 wt-% to 50 wt % of a small efficiency fiber having a fiber diameter of at least 0.1 micron and less than 1 micron; 10 wt-% to 50 wt % of a large efficiency fiber having a fiber diameter in a range of 1 micron to 5 microns; and 5 wt-% to 25 wt % of a microfibrillated fiber, wherein a majority of the microfibrillated fibers have a lateral dimension of up to 4 microns; wherein the nonwoven filter media is substantially free of glass fiber.

Aspect C2 is the nonwoven filter media of Aspect C1 comprising: 25 wt-% to 75 wt-% of the bicomponent fiber; 10 wt-% to 50 wt % of the small efficiency fiber; 10 wt-% to 25 wt % of the large efficiency fiber; or 10 wt-% to 25 wt % of the microfibrillated fiber; or a combination thereof.

Aspect 3 is the nonwoven filter media of Aspect C1 or Aspect C2, wherein the wt % is based on the total weight of the bicomponent fiber, the small efficiency fiber, the large efficiency fiber, and the microfibrillated cellulose fiber.

Aspect C4 is the nonwoven filter media of any of Aspects C1 to C3, wherein the bicomponent fiber comprises a structural polymer portion and a thermoplastic binder polymer portion, wherein the structural polymer portion has a melting point higher than the melting points of the binder polymer portion.

Aspect C5 is the nonwoven filter media of Aspect C4, wherein the structural polymer portion of the bicomponent fiber has a melting point of at least 240° C. and the binder polymer portion of the bicomponent fiber has a melting point of up to 115° C.

Aspect C6 is the nonwoven filter media of Aspect C4, wherein the structural polymer portion of the bicomponent fiber has a melting point of at least 240° C. and the binder polymer portion of the bicomponent fiber has a melting point in a range of 100° C. to 190° C.

Aspect C7 is the nonwoven filter media of Aspect C6, wherein the binder polymer portion of the bicomponent fiber has a melting point in a range of 140° C. to 160° C.

Aspect C8 is the nonwoven filter media of any of Aspects C4 to C7, wherein the structural polymer portion is the core of the bicomponent fiber and the sheath is the thermoplastic binder polymer portion of the bicomponent fiber.

Aspect C9 is the nonwoven filter media of any of Aspects C4 to C8, wherein the structural polymer portion comprises polyethylene terephthalate (PET) and the thermoplastic binder polymer portion comprises coPET.

Aspect C10 is the nonwoven filter media of any of Aspects C1 to C9, wherein the bicomponent fiber comprises a first bicomponent fiber and a second bicomponent fiber.

Aspect C11 is the nonwoven filter media of any of Aspects C1 to C10, wherein small efficiency fiber has a fiber diameter of at least 0.4 micron and less than 1 micron.

Aspect C12 is the nonwoven filter media of any of Aspects C1 to C11, wherein the small efficiency fiber has a fiber diameter in a range of 0.6 micron to 0.8 micron.

Aspect C13 is the nonwoven filter media of any of Aspects C1 to C12, wherein the small efficiency fiber has a fiber diameter of 0.7 micron.

Aspect C14 is the nonwoven filter media of any of Aspects C1 to C13, wherein the small efficiency fiber has a length in a range of 1 mm to 15 mm.

Aspect C15 is the nonwoven filter media of any of Aspects C1 to C14, wherein the small efficiency fiber comprises polyethylene terephthalate (PET).

Aspect C16 is the nonwoven filter media of any of Aspects C1 to C15, wherein the large efficiency fiber has a fiber diameter in a range of 2 microns to 4 microns.

Aspect C17 is the nonwoven filter media of any of Aspects C1 to C16, wherein the large efficiency fiber comprises polyethylene terephthalate (PET).

Aspect C18 is the nonwoven filter media of any of Aspects C1 to C17, wherein a majority of the microfibrillated fibers have a lateral dimension of up to 2 microns.

Aspect C19 is the nonwoven filter media of any of Aspects C1 to C18, wherein a majority of the microfibrillated fibers have a lateral dimension in a range of 0.5 micron to 1.5 microns.

Aspect C20 is the nonwoven filter media of any of Aspects C1 to C19, wherein the microfibrillated fibers comprise microfibrillated cellulose fibers.

Aspect C21 is the nonwoven filter media of any of Aspects C1 to C20, wherein the nonwoven filter media has a solidity in a range of 5% to 15%.

Aspect C22 is the nonwoven filter media of any of Aspects C1 to C21, wherein the nonwoven filter media has a basis weight in a range of 24 g/m² to 100 g/m².

Aspect C23 is the nonwoven filter media of any of Aspects C1 to C22, wherein the nonwoven filter media has a pore size in a range of 0.5 micron to 20 microns.

Aspect C24 is the nonwoven filter media of any of Aspects C1 to C23, wherein the nonwoven filter media has a P95/P50 ratio of at least 1.5 or at least 2.

Aspect C25 is the nonwoven filter media of any of Aspects C1 to C24, wherein the nonwoven filter media has a P95/P50 ratio of up to 3.

Aspect C26 is the nonwoven filter media of any of Aspects C1 to C25, wherein the nonwoven filter media has a thickness in a range of 0.12 mm to 1 mm.

Aspect C27 is the nonwoven filter media of any of Aspects C1 to C26, wherein the nonwoven filter media has a permeability in a range of 1 ft³/ft²/min at 0.5 inches of water to 100 ft³/ft²/min at 0.5 inches of water.

Aspect C28 is the nonwoven filter media of any of Aspects C1 to C27, wherein the nonwoven filter media is substantially free of resin.

Aspect C29 is the nonwoven filter media of any of Aspects C1 to C28, wherein the nonwoven filter media is free of glass fiber.

Aspect C30 is the nonwoven filter media of any of Aspects C1 to C29, wherein the small efficiency fiber comprises polyethylene terephthalate (PET), and wherein the PET of the small efficiency fiber has a melting point of at least 250° C., at least 275° C., or at least 290° C.

Aspect C31 is the nonwoven filter media of any of Aspects C1 to C30, wherein the large efficiency fiber comprises polyethylene terephthalate (PET), and wherein the PET of the large efficiency fiber has a melting point of at least 250° C., at least 275° C., or at least 290° C.

Aspect C32 is a method of filtering a liquid stream, the method comprising passing a liquid stream comprising a contaminant through a nonwoven filter media, the nonwoven filter media comprising the nonwoven filter media of any of Aspects C1 to C31 and removing the contaminant from the liquid stream.

Aspect C33 is the method of Aspect C32, wherein the liquid stream comprises fuel, hydraulic oil, process water, air, diesel engine fluid (DEF), diesel engine lube oil, or blow-by gas, or combinations thereof.

Aspect C34 is the method of Aspect C32, wherein the liquid stream comprises air.

Exemplary Composite Aspects

Aspect D1 is a composite comprising a first nonwoven filter media comprising: 40 wt-% to 90 wt-% of a first bicomponent fiber having a fiber diameter in a range of 5 microns to 50 microns and a fiber length of 0.1 cm to 15 cm; 0 wt-% to 25 wt % of a first large efficiency fiber having a fiber diameter in a range of 1 micron to 5 microns; and 10 wt-% to 60 wt % of a first microfibrillated fiber, wherein a majority of the microfibrillated fibers have a lateral dimension of up to 4 microns; optionally, a second nonwoven filter media comprising: 40 wt-% to 90 wt-% of a second bicomponent fiber having a fiber diameter in a range of 5 to 50 microns and a fiber length of 0.1 cm to 15 cm; 0 wt-% to 25 wt % of a second large efficiency fiber; and 10 wt-% to 60 wt % of a second microfibrillated fiber, wherein a majority of the microfibrillated fibers have a lateral dimension of up to 4 microns; and a third nonwoven filter media comprising a small efficiency fiber having a fiber diameter of at least 0.1 micron and less than 1 micron; wherein the composite is substantially free of glass fiber.

Aspect D2 is the composite of Aspect D1, wherein the first bicomponent fiber comprises a structural polymer portion and a thermoplastic binder polymer portion, wherein the structural polymer portion has a melting point of higher than the binder polymer portion.

Aspect D3 is the composite of Aspect D1 or D2, wherein the second bicomponent fiber comprises a structural polymer portion and a thermoplastic binder polymer portion, wherein the structural polymer portion has a melting point of higher than the binder polymer portion.

Aspect D4 is the composite of Aspect D2 or D3, wherein the structural polymer portion of the bicomponent fiber has a melting point of at least 240° C. and the binder polymer portion of the bicomponent fiber has a melting point of up to 115° C.

Aspect D5 is the composite of Aspect D2 or D3, wherein the structural polymer portion of the bicomponent fiber has a melting point of at least 240° C. and the binder polymer portion of the bicomponent fiber has a melting point in a range of 110° C. to 190° C.

Aspect D6 is the composite of any of Aspects D1 to D5, wherein the first bicomponent fiber or the second bicomponent fiber comprises at least two different bicomponent fibers.

Aspect D7 is the composite of any of Aspects D1 to D6, wherein the first nonwoven filter media comprises 40 wt-% to 60 wt-% of the first bicomponent fiber.

Aspect D8 is the composite of any of Aspects D1 to D7, wherein the second nonwoven filter media comprises 40 wt-% to 60 wt-% of the second bicomponent fiber.

Aspect D9 is the composite of any of Aspects D1 to D8, wherein the first large efficiency fiber has a fiber diameter of 2.7 microns.

Aspect D10 is the composite of any of Aspects D1 to D9, wherein the first large efficiency fiber comprises PET.

Aspect D11 is the composite of any of Aspects D1 to D10, wherein the second large efficiency fiber has a fiber diameter of 2.7 microns.

Aspect D12 is the composite of any of Aspects D1 to D11, wherein the second large efficiency fiber comprises PET.

Aspect D13 is the composite of any of Aspects D1 to D12, wherein a majority of the microfibrillated fibers of the first nonwoven filter media have a lateral dimension of up to 2 microns.

Aspect D14 is the composite of any of Aspects D1 to D13, wherein a majority of the microfibrillated fibers of the second nonwoven filter media have a lateral dimension of up to 2 microns.

Aspect D15 is the composite of any of Aspects D1 to D14, wherein a majority of the microfibrillated fibers of the first nonwoven filter media have a lateral dimension in a range of 0.5 micron to 1.5 microns.

Aspect D16 is the composite of any of Aspects D1 to D15, wherein a majority of the microfibrillated fibers of the second nonwoven filter media have a lateral dimension in a range of 0.5 micron to 1.5 microns.

Aspect D17 is the composite of any one Aspects D1 to D16, wherein the first nonwoven filter media comprises 10 wt-% to 40 wt % of the first microfibrillated fiber or wherein the second nonwoven filter media comprises 10 wt-% to 40 wt % of the second microfibrillated fiber.

Aspect D18 is the composite of any of Aspects D1 to D17, wherein the first microfibrillated fiber comprises a microfibrillated cellulose fiber, or wherein the second microfibrillated fiber comprises a microfibrillated cellulose fiber, or both.

Aspect D19 is the composite of any of Aspects D1 to D18, wherein the first nonwoven filter media has a solidity in a range of 5% to 15%.

Aspect D20. The composite of any of Aspects D1 to D19, wherein the first nonwoven filter media has a basis weight in a range of 24 g/m$^2$ to 100 g/m$^2$.

Aspect D21 is the composite of any of Aspects D1 to D20, wherein the first nonwoven filter media has a pore size of 0.5 microns to 20 microns.

Aspect D22 is the composite of any of Aspects D1 to D21, wherein the first nonwoven filter media has a thickness in a range of 0.12 mm to 1 mm.

Aspect D23 is the composite of any of Aspects D1 to D22, wherein the first nonwoven filter media has a permeability in a range of 1 ft$^3$/ft$^2$/min at 0.5 inches of water to 100 ft$^3$/ft$^2$/min at 0.5 inches of water.

Aspect D24 is the composite of any of Aspects D1 to D23, wherein the second nonwoven filter media has a solidity in a range of 5% to 15%.

Aspect D25 is the composite of any of Aspects D1 to D24, wherein the second nonwoven filter media has a basis weight in a range of 24 g/m$^2$ to 100 g/m$^2$.

Aspect D26 is the composite of any of Aspects D1 to D25, wherein the second nonwoven filter media has a pore size of 0.5 microns to 20 microns.

Aspect D27 is the composite of any of Aspects D1 to D26, wherein the second nonwoven filter media has a thickness in a range of 0.12 mm to 1 mm.

Aspect D28 is the composite of any of Aspects D1 to D27, wherein the second nonwoven filter media has a permeability in a range of 1 ft$^3$/ft$^2$/min at 0.5 inches of water to 100 ft$^3$/ft$^2$/min at 0.5 inches of water.

Aspect D29 is the composite of any of Aspects D1 to D28, wherein the small efficiency fiber has a fiber diameter of at least 0.4 micron and less than 1 micron or in a range of 0.6 micron to 0.8 micron.

Aspect D30 is the composite of any of Aspects D1 to D29, wherein the small efficiency fiber has a fiber diameter of 0.7 microns.

Aspect D31 is the composite of any of Aspects D1 to D30, wherein the small efficiency fiber comprises polyethylene terephthalate (PET).

Aspect D32 is the composite of any one Aspects D1 to D31, wherein the composite is substantially free of resin.

Aspect D33 is the composite of any of Aspects D1 to D32, wherein the composite is free of glass fiber.

Aspect D34 is the composite of any of Aspects D1 to D33, wherein the first nonwoven filter media, the second nonwoven filter media, and the third nonwoven filter media are discrete layers.

Aspect D35 is the composite of any of Aspects D1 to D34, wherein the nonwoven filter media is configured for a liquid to pass through the first nonwoven filter media, then the second nonwoven filter media, and then the third nonwoven filter media.

Aspect D36 is the composite of any of Aspects D1 to D35, the nonwoven filter media further comprising a support layer.

Aspect D37 is the composite of Aspect D36, the support layer comprising a porous, polymeric material.

Aspect D38 is the composite of Aspect D36 or D37, wherein the nonwoven filter media is configured for a liquid to pass through the first nonwoven filter media, then the second nonwoven filter media, then the third nonwoven filter media, and then the support layer.

Aspect D39 is the composite of any of Aspects D1 to D38, wherein the first nonwoven filter media is in contact with the second nonwoven filter media, and the second nonwoven filter media is in contact with the third nonwoven filter media.

Aspect D40 is the composite of any of Aspects D36 to D39, wherein the third nonwoven filter media is in contact with the support layer.

Aspect D41 is the composite of any of Aspects D1 to D40, wherein the first large efficiency fiber comprises PET and the PET has a melting point of at least 250° C., at least 275° C., or at least 290° C.; or wherein the second large efficiency fiber comprises PET and the PET has a melting point of at least 250° C., at least 275° C., or at least 290° C.; or both.

Aspect D42 is the composite to any of Aspects D1 to D41, wherein the composite meets NIOSH P95, NIOSH P99, NIOSH P100, NIOSH N95, NIOSH N99, and/or NIOSH N95 classifications, as codified in 42 C.F.R. § 84.

Aspect D43 is the composite according to any of Aspects D1 to D42, wherein the composite exhibits sub-micron particular efficiency as defined by ASTM F2100-19 for a level 1 barrier, a level 2 barrier, and/or a level 3 barrier.

Exemplary Methods of Making and of Using the Composite Aspects

Aspect E1 is a method of filtering a liquid stream, the method comprising, passing a liquid stream comprising a contaminant through a composite, the composite comprising the composite of any of Aspects D1 to D43 and removing the contaminant from the liquid stream.

Aspect E2 is the method of Aspect E1, wherein the liquid stream comprises fuel, hydraulic oil, process water, air, diesel engine fluid (DEF), diesel engine lube oil, or blow-by gas, or combinations thereof.

Aspect E3 is the method of Aspect E1, wherein the liquid stream comprises air.

Aspect E4 is the method of any of Aspects E1 to E3, wherein the liquid stream passes through the first nonwoven filter media, then the second nonwoven filter media, then the third nonwoven filter media.

Aspect E5. A method of making the composite of any of Aspects D1 to D43, the method comprising independently making the first nonwoven filter media, the second nonwoven filter media, and the third nonwoven filter media.

Aspect E6 is the method of Aspect E5, wherein the first nonwoven filter media, the second nonwoven filter media, and the third nonwoven filter media are formed using a wetlaid process.

Aspect E7 is the method of Aspect E5 or E6, the method further comprising placing the first nonwoven filter media in contact with the second nonwoven filter media, and placing the second nonwoven filter media in contact with the third nonwoven filter media.

Aspect E8 is the method of Aspect E7, the method further comprising bonding the first nonwoven filter media to the second nonwoven filter media or bonding the second nonwoven filter media to the third nonwoven filter media or both.

Aspect E9 is the method of Aspect E8, wherein bonding comprises lamination.

Aspect E10 is the method of any of Aspects E5 to E9, the method further comprising placing the third nonwoven filter media in contact with a support layer.

Exemplary Filter Media Embodiments~Filter Media Including a Continuous Fine Fiber Layer Aspect F1. A filter media that comprises a support layer, a continuous fine fiber layer, and an optional efficiency layer.

Aspect F2 is the filter media of Aspect F1, wherein the continuous fine fiber layer has a thickness of up to 50 µm.

Aspect F3 is the filter media of Aspect F1 or F2, wherein a composite comprising the support layer and the continuous fine fiber layer has a P95/P50 ratio of up to 1.8, up to 1.9, or up to 2; wherein the efficiency layer has a P95/P50 ratio of at least 1.8, at least 1.9, or at least 2; and wherein the value of P95 of the composite falls within a range provided by the values of P5 and P50 of the efficiency layer.

Aspect F4 is the filter media of any of Aspects F1 to F3, wherein the composite has a P95/P50 ratio of greater than 1.

Aspect F5 is the filter media of any of Aspects F1 to F4, wherein the efficiency layer has a P95/P50 ratio of up to 10, up to 15, or up to 20.

Aspect F6 is the filter media of any of Aspects F1 to F5, wherein the continuous fine fiber layer has a thickness of at least 2 µm.

Aspect F7 is the filter media of any of Aspects F1 to F6, wherein the thickness of the continuous fine fiber layer is measured by scanning electron microscopy (SEM).

Aspect F8 is the filter media of any of Aspects F1 to F7, wherein the continuous fine fiber layer is located between the efficiency layer and the support layer.

Aspect F9 is the filter media of any of Aspects F1 to F8, wherein the efficiency layer is located on the upstream side of the filter medium.

Aspect F10 is the filer media of any of Aspects F1 to F9, wherein the filter medium further comprises a second efficiency layer.

Aspect F11 is the filter media of any of Aspect F10, wherein the second efficiency layer is located adjacent to and upstream of the efficiency layer.

Aspect F12 is the filter media of any of Aspects F1 to F11, wherein the efficiency layer comprises a wet-laid resin-free media, a wet-laid resin-bonded glass media, a meltblown media, a wet-laid cellulose media, or an air-laid glass media.

Aspect F13 is the filter media of any of Aspects F1 to F12, wherein the efficiency layer comprises a wet-laid media.

Aspect F14 is the filter media of any of Aspects F1 to F13, wherein the efficiency layer comprises a bicomponent fiber and an efficiency fiber, wherein the efficiency fiber has a smaller diameter than the bicomponent fiber.

Aspect F15 is the filter media of any of Aspects F1 to F14, the efficiency fiber comprises a glass fiber.

Aspect F16 is the filter media of any of Aspects F1 to F15, the efficiency fiber comprises a short cut fine fiber.

Aspect F17 is the filter media of any of Aspects F1 to F16, wherein the efficiency layer comprises a microfibrillated fiber.

Aspect F18 is the filter media of any of Aspects F1 to F17, wherein the continuous fine fiber has a diameter of up to 10 micrometers (µm).

Aspect F19 is the filter media of any of Aspects F1 to F18, wherein the continuous fine fiber comprises a fiber having a diameter of at least 1 micrometers.

Aspect F20 is the filter media of any of Aspects F1 to F19, wherein the continuous fine fiber comprises a fiber having an elliptical shape.

Aspect F21 is the filter media of any of Aspects F1 to F20, wherein the continuous fine fiber comprises a mixture of fibers of different diameters.

Aspect F22 is the filter media of Aspect F21, wherein the fibers of different diameters are comingled within a single strata of the continuous fine fiber layer.

Aspect F23 is the filter media of Aspect F21 or F22, wherein the fibers of different diameters form different strata in the continuous fine fiber layer.

Aspect F24 is the filter media of any of Aspects F21 to F23, wherein the fibers of different diameters comprise large fine fibers and small fine fibers, wherein the large fine fibers have an average diameter at least 3 times the average fiber diameter of the small fine fibers.

Aspect F25 is the filter media of Aspect F24, wherein the continuous fine fiber layer comprises a first layer of fine fibers comprising large fine fibers and a second layer of fine fibers comprising small fine fibers.

Aspect F26 is the filter media of Aspect F24 or F25, wherein the large fine fibers have an average diameter of at least 1 µm.

Aspect F27 is the filter media of any of Aspects F24 to F26, wherein the large fine fibers have a diameter at least 0.2 µm, at least 0.3 µm, or at least 0.4 µm greater than a diameter of the small fine fibers.

Aspect F28 is the filter media of any of Aspects F1 to F27, wherein the continuous fine fiber comprises a polyamide.

Aspect F29 is the filter media of any of Aspects F1 to F28, wherein the support layer comprises a spunbond layer.

Aspect F30 is the filter media of any of Aspects F1 to F29, wherein the fine fiber of the continuous fine fiber layer comprises a nylon.

Aspect F31 is the filter media of any of Aspects F1 to F30, wherein the fine fiber comprises a terpolymer comprising nylon-6, nylon-6,6 and nylon-6,10.

Aspect F32 is the filter media of any of Aspects F1 to F31, wherein the fine fiber comprises a terpolymer having a number average molecular weight of 21,500-24,800 and comprising 45% nylon-6, 20% nylon-6,6 and 25% nylon-6,10.

Aspect F33 is the filter media of any of Aspects F1 to F32, wherein the fine fibers of the continuous fine fiber layer are not crosslinked.

Aspect F34 is the filter media of any of Aspects F1 to F33, wherein the filter media meets NIOSH P95, NIOSH P99, NIOSH P100, NIOSH N95, NIOSH N99, and/or NIOSH N95 classifications, as codified in 42 C.F.R. § 84.

Aspect F35 is the filter media of any of Aspects F1 to F34, wherein the filter media exhibits sub-micron particular efficiency as defined by ASTM F2100-19 for a level 1 barrier, a level 2 barrier, and/or a level 3 barrier.

Aspect F36 is a filter element comprising the filter media of any of Aspects F1 to F35.

Aspect F37 is the filter element of Aspect F36, wherein a wire support is located downstream of the support layer.

Aspect F38 is a method of filtering a liquid stream, the method comprising passing a liquid stream comprising a contaminant through a nonwoven filter media, the nonwoven filter media comprising the filter media of any of Aspects F1 to F35 and removing the contaminant from the liquid stream.

Aspect F39 is the method of Aspect F38, wherein the liquid stream comprises air.

Exemplary Face Mask System Aspects

Aspect G1. A face mask system comprising a face mask defining a face receptacle configured to receive the nose and mouth of a wearer; a retaining feature configured to retain the position of the face mask relative to the wearer; an intake airflow pathway extending from the ambient environment to the face receptacle; and a filter element disposed across the intake airflow pathway, wherein the filter element comprises a filter media of any of Aspects A1 to A19, B1 to B13, C1 to C22, F1 to F37, or a composite of any of Aspects D1 to D43, or a combination thereof.

Aspect G2. A face mask system according to Aspect G1, wherein the filter element comprises one or more folds formed therein.

Aspect G3. A face mask system according to Aspect G1 or G2, wherein the retaining feature comprises a strap.

Aspect G4. A face mask system according to any of Aspects G1 to G3, wherein the retaining feature comprises a head harness.

Aspect G5 is the face mask system according to any of Aspects G1 to G3, wherein the face mask comprises the filter element.

Aspect G6 is the face mask system according to any of Aspects G1 to G3, wherein the filter element is remote from the face mask.

Aspect G7 is a face mask system according to any of Aspects G1 to G4, wherein the face mask is constructed of an air-impermeable material defining an aperture, wherein the filter element is positioned over the aperture and the face mask system further comprises an exhalation valve defining an exhaust airflow pathway from the face receptacle to the ambient environment.

Aspect G8 is a face mask system according to any of Aspects G1 to G4, wherein the face mask system comprises a filtering facepiece respirator, and wherein the filter element forms at least a portion of the face mask of the filtering facepiece respirator.

Aspect G9 is a face mask system according to any of Aspects G1 to G4, wherein the face mask system comprises a surgical mask.

Aspect G10 is a face mask system according to any of Aspects G1 to G3 and G5, wherein the face mask system comprises a powered air purifying respirator comprising an airflow conduit extending to the face mask, wherein the airflow conduit defines a portion of the intake airflow pathway.

The present invention is illustrated by the following examples. It is to be understood that the particular examples, materials, amounts, and procedures are to be interpreted broadly in accordance with the scope and spirit of the invention as set forth herein.

EXAMPLES

All reagents, starting materials, and solvents used in the following examples were purchased from commercial suppliers (such as Sigma Aldrich, St. Louis, MO) and were used without further purification unless otherwise indicated.

Preparation of Samples for Examples 1-4

24 inch-wide fibrous media samples were prepared by forming two furnishes (see Tables 1A, 1B, 2A, and 2B) which were fed into a inclined wire dual headbox. Methods of forming such fibrous media samples are described in U.S. Pat. No. 9,885,154. An exemplary headbox is shown in FIG. 1 of U.S. Pat. No. 9,885,154.

Samples were dried in a floating wire air gas oven (Advanced Systems, Inc. Green Bay, WI).

Test Methods for Examples 1-4

Basis Weight

Basis weight was measured according to ASTM D646-13, entitled "Standard Test Method for Mass Per Unit Area of Paper and Paperboard of Aramid Papers (Basis Weight),"

Air Flow/Permeability Testing

Air permeability (also referred to as Frazier air permeability or airflow) was measured according to ASTM D737-18, entitled "Test Method for Air Permeability of Textile Fabrics."

Efficiency

Air filtration performance was assessed with a High-Efficiency Flat Sheet (HEFS) TSI Automated Filter Tester, Model 8127, test bench (TSI Incorporated, Shoreview, MN) to measure particle capture efficiency using 0.3 μm oil (bis(2-ethylhexyl) sebacate (DEHS) (Sigma-Aldrich) droplets (aerosol) at a flow rate of 14.7 liters per minute (L/min) to challenge 4 inch diameter media samples. TSI's CertiTest Model 8127 Automated Filter Tester is designed for testing filters, respirator cartridges, and filter media to the latest American government and industry-wide specification, and meets the standards of 42 CFR § 84 (Jun. 8, 1995).

Thickness Testing

Thickness was measured according to TAPPI T 411 om-15, entitled "Thickness (caliper) of paper, paperboard, and combined board," except that a foot pressure of 0.5 psi was used.

Fractional Efficiency

Fractional efficiency was calculated according to the following formula:

$$F_{eff} = \frac{C_{up} - C_{down}}{C_{UP}} \times 100\%$$

where Feff=Fractional Efficiency; $C_{up}$=Particle Concentration Upstream of Filter, and Cdown=Particle Concentration Downstream of Filter.

Media Characterization for Examples 5-9

Liquid Filtration Performance Testing

Clean Pressure Drop, Media Velocity, Capacity, and 4 μm Beta ($\beta_{4\ \mu m}$) were calculated as described below using a circular flat sheet.

For Examples 6 and 7

Media was tested as described in ISO 16889:2008 (Hydraulic fluid power—Filters—Multi-pass method for evaluating filtration performance of a filter element) except hydraulic fluid was laden with that ISO 12103-1, A2 Fine Test Dust (Powder Technology, Inc., Arden Hills, MN) was used instead of ISO Medium Test Dust. The media area was 0.0507 m$^2$; the test flow rate was 2 L/minute, and the test was performed to a terminal element differential pressure of 200 kPa.

For Examples 8 and 9

Media was tested as described in ISO 16889:2008 (Hydraulic fluid power—Filters—Multi-pass method for evaluating filtration performance of a filter element). The media area was 0.0507 m$^2$; the test flow rate was 16 L/minute, and the test was performed to a terminal element differential pressure of 320 kPa.

Solidity

Solidity (c) of a nonwoven layer (including, for example, a non-fine fiber layer or a composite including fine fiber and non-fine fiber layers) is calculated using the following equation:

$$c = BW/\rho Z$$

where BW is the basis weight, $\rho$ is the density of the fiber, and Z is the thickness of the media.

Thickness was measured according to TAPPI T411 om-15, entitled "Thickness (caliper) of paper, paperboard, and combined board;" a foot pressure of 1.5 psi was used. Basis Weight was measured using TAPPI T410 om-08.

Materials and Methods for Examples 10-17

Preparation of Polymer Solutions

To prepare Solution 1, a nylon copolymer resin (SVP 651 (Shakespeare Co., Columbia, SC), a terpolymer having a number average molecular weight of 21,500-24,800 comprising 45% nylon-6, 20% nylon-6,6 and 25% nylon-6,10— see also Table 3) was dissolved in alcohol (ethanol, 190 proof) and heated to 60° C. to produce a 9% nylon solids solution. After cooling, a melamine-formaldehyde resin (CYMEL 1133, Cytec Industries of West Paterson, NJ) was added to the solution to achieve a weight ratio of melamine-formaldehyde resin to nylon of 20:100 parts by weight. The melamine-formaldehyde resin acts as a crosslinking agent. Additionally, para-toluene sulfonic acid (7%, based on polymer solids) was added to the solution. The solution was agitated until uniform. Solution 1 was used to prepare 0.25 μm fibers.

Solution 2 was prepared as described for Solution 1 (and also resulted in a weight ratio of melamine-formaldehyde resin to nylon of 20:100 parts by weight) except a 17% nylon solids solution was used. Solution 2 was used to prepare 1 μm fibers.

Viscosity values of 30±5 cP and 300±5 cP for Solution 1 and 2, respectively, were measured at 25° C. with a Brookfield LV DV-I Prime Viscometer in conjunction with a Fisher Scientific Model 8005 temperature-controlled water bath.

To prepare Solution 3, a copolyamide (Griltex D 1523A, EMS-Griltech, Switzerland) was dissolved in a solvent mixture of ethanol, benzyl alcohol, and water (ethanol: benzyl alcohol:water 16:1:1 by weight) and heated to 60° C. to produce a 21% (w/w) solution. Solution 3 had a viscosity of 473±10 cP measured at 25° C. with a Brookfield LV DV-I Prime Viscometer in conjunction with a Fisher Scientific Model 8005 temperature-controlled water bath. Solution 3 was used to prepare 1.4 μm fibers.

Preparation of Samples by Pendant Drop for Examples 10-14

Samples were prepared using a pendant drop apparatus, that is, a syringe filled with polymer solution. A high voltage is applied to a needle attached to the syringe and the polymer solution is pumped at a specified pump rate. As the drop of the polymer solution emerges from the needle, it forms a Taylor cone under the influence of the electrostatic field. At sufficiently high voltages, a jet is emitted from the Taylor cone which undergoes extension and fine fibers are formed and deposited on the media attached to a rotating mandrel which acts as the collector.

Fibers were formed onto a support layer wrapped around a cylinder (having a diameter 4 inches and rotating at 300 rpm) by electrospinning at a voltage of 24 kV and at a distance of 4 inches from the syringe or syringes delivering the polymer solution or solutions at a pump rate of 0.075 mL/min. After electrospinning, the formed fine fibers were thermally treated at 140° C. for 10 minutes.

Method 1:

A mixed fiber layer was deposited on a 0.2 mm thick, spunbond nylon scrim having a basis weight of 70 g/m$^2$ and a solidity of 28% (Media Grade 23200, Cerex Advanced Fibers, Cantonment, FL) by co-spinning two different electrospinning precursor solutions (Solution 1 and Solution 2) from two different syringes, delivered at the same pump rate (0.075 mL/minute) and for the same duration (5 minutes). Two control samples were separately prepared using the same pump rate and duration, by spinning Solution 1 or Solution 2 from a single syringe to produce a layer including only small fine fibers or large fine fibers, respectively.

All samples were subjected to a post-synthesis treatment to improve robustness via cross-linking. After electrospinning, formed fibers were thermally treated at 140° C. for 10 minutes.

Method 2:

A series of mixed fiber layers were deposited on a 0.2 mm thick, spunbond nylon scrim having a basis weight of 70 g/m$^2$ and a solidity of 28% (Media Grade 23200, Cerex Advanced Fibers, Cantonment, FL) by co-spinning Solution 1 and Solution 2 from two different syringes, delivered at the same pump rate (0.075 mL/minute) and for the same duration. Two control samples were separately prepared using the same pump rate and duration, by co-spinning either Solution 1 or Solution 2 from two syringes to produce a layer including only small fine fibers or large fine fibers, respectively. In contrast to Method 1, co-spinning either Solution 1 or Solution 2 from two syringes (instead of one syringe) resulted in more similar basis weights between the control samples and the samples including mixed fiber layers.

All samples were subjected to a post-synthesis treatment to improve robustness via cross-linking. After electrospinning, formed fibers were thermally treated at 140° C. for 10 minutes.

Method 3:

A series of fiber layers having fibers of different diameters were deposited on a 0.2 mm thick, spunbond nylon scrim having a basis weight of 70 g/m$^2$ and a solidity of 28% (Media Grade 23200, Cerex Advanced Fibers, Cantonment, FL) by alternatingly ("pulsed") spinning from one of two syringes containing Solution 1 or Solution 2, delivered at the same pump rate (0.075 mL/min) and alternatingly according to the timing sequence in Table 5.

All samples were subjected to a post-synthesis treatment to improve robustness via cross-linking. After electrospinning, formed fibers were thermally treated at 140° C. for 10 minutes.

Method 4:

A series of mixed fiber structures were deposited on a 0.2 mm thick, spunbond nylon scrim having a basis weight of 70 g/m² and a solidity of 28% (Media Grade 23200, Cerex Advanced Fibers, Cantonment, FL) using a two-step procedure.

In the first step, large fine fibers (equivalent to 0.43 g/m² coverage) were deposited onto the scrim to act as an underlying support layer for subsequent fibers by delivering Solution 2 at a pump rate of (0.075 mL/min) for 2 minutes.

In the second step, a layer of fine fibers of mixed diameters was deposited by alternatingly ("pulsed") spinning from either one of two syringes containing Solution 1 or Solution 2 (for small fine fibers and large fine fibers, respectively) delivered at the same pump rate (0.075 mL/min) and alternatingly according to the timing sequence in Table 5.

All samples, with approximate total basis weight ranging from 0.65 to 0.86 g/m², were subjected to a post-synthesis treatment to improve robustness via cross-linking. After electrospinning, formed fibers were thermally treated at 140° C. for 10 minutes.

Method 5

A series of structures having varied basis weight contributions from the small fine fiber component were deposited on a 0.2 mm thick, spunbond nylon scrim having a basis weight of 70 g/m² and a solidity of 28% (Media Grade 23200, Cerex Advanced Fibers, Cantonment, FL) using a two-step procedure.

In the first step, large fine fibers (equivalent to 0.43 g/m² coverage) were deposited onto the scrim to act as an underlying support layer for subsequent fibers by delivering Solution 2 at a pump rate of (0.075 mL/min) for 2 minutes.

In the second step, a layer of small fine fibers was deposited by delivering Solution 1 at a pump rate of 0.075 mL/min. The basis weight of the small fine fiber layer was 0.09 g/m², 0.10 g/m², 0.22 g/m², 0.31 g/m², 0.45 g/m², or 0.56 g/m², and was achieved by using an electrospinning duration of to 48 seconds, 60 seconds, 120 seconds, 168 seconds, 240 seconds, or 300 seconds, respectively. After electrospinning, formed fibers were thermally treated at 140° C. for 10 minutes.

Method 6

A series of media samples including multiple layers having a variety of sizes of fine fibers were made. Samples included a base layer of large fine fibers, followed by a layer of small fine fibers, and topped by a layer of large fine fibers (Large/Small/Large, or L/S/L). Alternatively, samples included a base layer of large fine fibers, followed by a layer of small fine fibers, then a layer of commingled small fine fibers and large fine fibers, and topped by a layer of large fine fibers (Large/Small/Commingled/Large, or L/S/Commingled/L).

Large fine fibers (equivalent to 0.43 g/m² coverage) were deposited onto the scrim by spinning Solution 2 for 2 minutes. Without wishing to be bound by theory, it is believed the large fine fibers act as an underlying support layer for subsequent fiber layers. Next, a second layer of small fine fibers (equivalent to 0.22 g/m² coverage) was deposited by spinning Solution 1 for 2 minutes. If included, an intermediate (commingled) layer including both small fine fibers and large fine fibers was added by alternatingly ("pulsed") spinning from a syringe containing Solution 1 or Solution 2, for small fine fibers and large fine fibers, respectively, according to the timing sequence in Table 5. Finally, a top layer of large fine fibers (equivalent to 0.43 g/m² coverage) was deposited by spinning Solution 2 for 2 minutes. All solutions were delivered at a pump rate of 0.075 mL/min.

All samples, with approximate total basis weight ranging from 1.31 to 1.52 g/m², were subjected to a post-synthesis treatment to improve robustness via cross-linking. After electrospinning, formed fibers were thermally treated at 140° C. for 10 minutes.

Method 7

A series of media samples including a base layer of large fine fibers and a commingled layer of small fine fibers and large fine fibers were also prepared.

First, a first fine fiber layer including large fine fibers (equivalent to 0.43 g/m² coverage) was deposited on a 0.2 mm thick, spunbond nylon scrim having a basis weight of 70 g/m² and a solidity of 28% (Media Grade 23200, Cerex Advanced Fibers, Cantonment, FL) by spinning Solution 2 for 2 minutes at a pump rate of 0.075 mL/min. Next, a second fine fiber layer including commingled small fine fibers and large fine fibers was deposited by co-spinning two different electrospinning precursor solutions (Solution 1 and Solution 2) from two different syringes, delivered at the same pump rate (0.075 mL/minute) and for the same duration (either 2.5 minutes or 4.5 minutes).

All samples were subjected to a post-synthesis treatment to improve robustness via cross-linking. After electrospinning, formed fibers were thermally treated at 140° C. for 10 minutes.

Method 8A

A single-size fiber structure (nominal fiber diameter 1.4 μm, basis weight 0.67 g/m² coverage) was deposited from a polymer solution (21% w/w Griltex D 1523A (EMS-Griltech AG, Switzerland) in a solvent mixture of ethanol:benzyl alcohol:water 16:1:1 by weight) (Solution 3) delivered at a pump rate of 0.075 mL/min on a 0.2 mm thick, spunbond nylon scrim having a basis weight of 70 g/m² and a solidity of 28% (Media Grade 23200, Cerex Advanced Fibers, Cantonment, FL) via spinning for 2.5 minutes at 24 kV bias at a needle-to-collector distance of 4 inches.

Method 8B

A single-size fiber structure (nominal fiber diameter 1 μm, basis weight 2.59 g/m² coverage) was deposited from a polymer solution (17% w/w SVP 651 (see Table 3) in ethanol) (Solution 2) delivered at a pump rate of 0.075 mL/min on a 0.2 mm thick, spunbond nylon scrim having a basis weight of 70 g/m² and a solidity of 28% (Media Grade 23200, Cerex Advanced Fibers, Cantonment, FL) via spinning for 12 minutes at 24 kV bias at a needle-to-collector distance of 4 inches.

Method 8C

A single-size fiber structure (nominal fiber diameter 1.4 μm, basis weight 4.02 g/m² coverage) was deposited from a polymer solution (21% w/w Griltex D 1523A (EMS-Griltech, Switzerland) in a solvent mixture of ethanol:benzyl alcohol:water 16:1:1 by weight) (Solution 3) delivered at a pump rate of 0.075 mL/min onto a nylon scrim (Cerex, 70 g/m²) via spinning for 15 minutes at 24 kV bias at a needle-to-collector distance of 4 inches.

Method 9:

Large fine fibers (equivalent to 0.54 g/m² coverage) were deposited onto the scrim by spinning Solution 3 for 2 minutes at 24 kV bias at a needle-to-collector distance of 4 inches.

Next, a second layer of small fine fibers (equivalent to 0.22 g/m² coverage) was deposited by spinning Solution 1 for 2 minutes at 24 kV bias at a needle-to-collector distance of 4 inches.

A third layer of large fine fibers (equivalent to 0.54 g/m² coverage was deposited by spinning Solution 3 for 2 minutes at 24 kV bias at a needle-to-collector distance of 4 inches.

Finally, a top layer of large fine fibers (equivalent to 0.54 g/m² coverage) was deposited by spinning Solution 3 for 2 minutes at 24 kV bias at a needle-to-collector distance of 4 inches.

TABLE 5

Pulsed electrospinning sequence

| Sample ID | Pulsed spinning sequence (2 minutes total duration) | Basis weight (g/m²) | Structure and composition* |
|---|---|---|---|
| Set A | 2 min Solution 1 only | 0.65 | 100% small fine fibers |
| Set A5 | 102 sec Solution 1 + 18 sec Solution 2 | 0.68 | Layered, 2% large fine fibers |
| Set A6 | (51 sec Solution 1 + 9 sec Solution 2) × 2 | 0.68 | Commingled, 2% large fine fibers |
| Set B | 90 sec Solution 1 + 30 sec Solution 2 | 0.71 | Layered, 5% large fine fibers |
| Set D | (30 sec Solution 1 + 10 sec Solution 2) × 3 | 0.71 | Commingled, 5% large fine fibers |
| Set D5 | 72 sec Solution 1 + 48 sec Solution 2 | 0.74 | Layered, 7% large fine fibers |
| Set D6 | (18 sec Solution 1 + 12 sec Solution 2) × 4 | 0.74 | Commingled, 7% large fine fibers |
| Set E | 1 min Solution 1 + 1 min Solution 2 | 0.76 | Layered, 10% large fine fibers |
| Set I | (10 sec Solution 1 + 10 sec Solution 2) × 6 | 0.76 | Commingled, 10% large fine fibers |
| Set I5 | 42 sec Solution 1 + 78 sec Solution 2 | 0.79 | Layered, 16% large fine fibers |
| Set I6 | (14 sec Solution 1 + 26 sec Solution 2) × 3 | 0.79 | Commingled, 16% large fine fibers |
| Set J | 30 sec Solution 1 + 90 sec Solution 2 | 0.81 | Layered, 20% large fine fibers |
| Set L | (10 sec Solution 1 + 30 sec Solution 2) × 3 | 0.81 | Commingled, 20% large fine fibers |
| Set M | 2 min Solution 2 only | 0.86 | 100% large fine fibers |

*Proportion of larger fine fibers (on a fiber count basis) was estimated from the diameters of small (Solution 1) and large (Solution 2) fine fibers, % solids in precursor spinning solutions, and syringe pump feed rates and spinning time, as described in the Fiber Proportion Calculation section, below.

Preparation of Media Handsheets

Handsheets were prepared by weighing out of the component fibers to target the basis weight required when formed in a 30 cm by 30 cm sheet. A FORMAX 12"×12" Stainless Steel Sheet Mold (Catalog No. G-100, Adirondack Machine Corporation, Hudson Falls, NY) was used as the handsheet former and was prepared by placing a uniform nonwoven scrim layer with pores smaller than 100 μm at the bottom of the former (no removable forming wires were used). The former was then filled with cold tap water to almost full, but to allow room for an additional 1.5 L of water to be added. 1 mL of Tide HE laundry soap (Procter & Gamble, Cincinnati, OH) was added to the water in the handsheet former. To prepare the fibers, 1 L of cold tap water was added to a Vitamix blender along with 200 mL of 5% acetic acid in water. The weighed-out fibers were added to the blender and mixed on medium-low speed for 180 seconds. The contents of the blender were then added to the handsheet former, and the contents of the handsheet former were mixed to ensure the fibers are evenly distributed. The water was drained out the bottom of the handsheet former, allowing the fibers form a sheet as they are collected on the nonwoven scrim. Water was removed from the sheet using vacuum suction on the wire side, and the handsheet (still on the scrim) was dried on a one-sided hot plate speed dryer (Model 135 Speed Dryer, Emerson Apparatus, Gorham, ME) at 120° C. for 10 minutes. The sheet was removed (from the scrim) and allowed to cool to ambient conditions before using.

Media Characterization

Steady Flow Conditions Test

Beta (β) ratio was evaluated under steady flow conditions using ISO 16889:2008 (Hydraulic fluid power—Filters—Multi-pass method for evaluating filtration performance of a filter element) except when testing flat sheet performance, the test was run in singlepass mode, instead of the multipass mode called for by the test standard. Tests were run at 25° C. instead of the 40° C. called for by the test standard. Flow velocity through the was media 5 mm/sec. ISO 12103-1, Medium Test Dust (Powder Technology, Inc., Arden Hills, MN) was used to provide an upstream particle concentration was 10 mg/L. Continuous particle concentration measurements were collected every 6 seconds.

Cyclic Flow Conditions Test

β ratio was evaluated under cyclic flow conditions using ISO/CD 23369 Edition 1 (Hydraulic fluid power—Multi-pass method of evaluating filtration performance of a filter element under cyclic flow conditions) except when testing flat sheet performance, the test was run in singlepass mode, instead of the multipass mode called for by the test standard. Tests were run at 25° C. instead of the 40° C. called for by the test standard. Flow velocity through the media was cycled between 5 mm/sec and 1.25 mm/sec, in a 10 second cycle (approximately 5 seconds at each velocity). ISO 12103-1, Medium Test Dust (Powder Technology, Inc., Arden Hills, MN) was used to provide an upstream particle concentration was 10 mg/L. Continuous particle concentration measurements were collected every 6 seconds. Fluid conductivity was controlled to a range of 1000-1500 picosiemens/meter (pS/m).

Calibration of Particle Counters

Particle counters were calibrated for use in ISO test procedures according to ISO 11171:2016 (Hydraulic fluid power—Calibration of automatic particle counters for liquids).

Pressure Drop

Pressure drop was measured as described in ISO 3968:2017 using the test conditions shown in Table 6.

TABLE 6

Pressure Drop Test Conditions

| Fluid | MIL5606 Hydraulic Oil |
|---|---|
| Media Area | 0.0507 m² |
| Fluid Viscosity | 15 cSt |
| Fluid Temperature | 40° C. |

Scanning Electron Microscopy (SEM)

Samples were prepared for top-down SEM imaging by sputter-coating the surface with a gold and palladium mixture including an Au:Pd 60:40 mixture. Typically, a 5 kV or a 10 kV accelerating voltage was used and images were collected at ×500, ×1000 and ×2500 magnifications with a secondary electron detector or a backscatter electron detector.

Samples were prepared for cross-sectional SEM imaging by preparing a 3 mm by 20 mm sample that included fine fiber on a support layer, placing the sample fine fiber side down in a weighing tin on a hard surface, filling the tin with liquid nitrogen to submerge the sample. After at least 30 seconds, a razor blade was used to cut the sample (while still submerged in liquid nitrogen) to expose a cross-section. After the cut was made and an additional 10-20 seconds had elapsed, the sample was removed from liquid nitrogen and mounted to SEM imaging. Samples were then sputter-coated with 60:40 Au:Pd. Typically, a 5 kV accelerating voltage was used and images were collected at ×1000 magnifications with a secondary electron detector.

Fiber Diameter

The fine fiber samples produced in Examples 1-7 had average fiber diameters no greater than 10 microns. Typically, the small fine fibers possessed average fiber diameters ranging from 200 nm to 600 nm, as measured by Scanning Electron Microscopy (SEM). Typically, the large fine fibers possessed average fiber diameters of at least 700 nm, as measured by Scanning Electron Microscopy (SEM). Fiber sizing was performed by imaging fibers via SEM and measuring fiber diameter (or other dimensions of interest) in the resulting micrographs. Image processing software such as ImageJ and/or (FIJI Is Just ImageJ (FIJI), an updated version of ImageJ, was used for fiber sizing.

Fine Fiber Layer Thickness

The thickness of the fine fiber samples was measured by Scanning Electron Microscopy (SEM) via cross-sectional analysis of SEMs, prepared as described above. The thickness of the fine fiber layer in at least 5 images from different portions of the sample were determined using FIJI. Specifically, the top and bottom of the fine fiber layer were delineated using a polygon tool, the area outside the selected fine fiber cross-section was cleared, the area of the selected fine fiber cross-section was re-colored white using the threshold level tool to compensate for fibers on the borders of the selected section, and the maximum thickness in the image was measured in recorded. Five of these maximum values were rounded to the nearest tenth of a micron and then averaged to provide the thickness of the fine fiber sample.

Fiber Proportion Calculation Based on Spin Time

Relative amounts of small and large fine fibers (on a total fiber count basis) are determined using the following equation:

$$\% \text{ Large Fibers} = 100 \times \frac{(V_L/D_L^2)}{((V_L/D_L^2) + (V_S/D_S^2))}$$

where $D_L$ and $D_S$ are diameters of the large fine fiber and small fine fibers, respectively; and $V_L$ and $V_S$ are volumes of the polymers comprising the large fine fiber and small fine fibers, respectively. Volumes, V, are calculated for small or large fine fiber according to:

$$V = \left(\% \frac{w}{v}\right) \times (\text{Pump Rate} \times \text{Spin Time}) \times \frac{1}{\rho}$$

where ρ is the density of the polymer comprising the small fine fibers or large fine fibers, and % w/v refer to the solids contents on a mass per volume basis of the polymer solutions.

Fiber Proportion Calculation Based on Microscopy

Sample images were obtained via SEM at appropriate magnification (for example, 500×, 1000×, or 2500×). The presence of one or more fiber populations was determined by counting all fibers within the image, followed by classifying into small fine fibers and large fine fibers based on grouping diameters within 25% variation. Fiber size was measured using image processing software such as ImageJ. The proportion of small fine fibers was calculated by taking the ratio of the small fine fiber count against the total fiber (both small and large) count within the image.

Solidity

Solidity (c) of a nonwoven layer (including, for example, a non-fine fiber layer or a composite including fine fiber and non-fine fiber layers) is calculated using the following equation:

$$c = BW/\rho Z$$

where BW is the basis weight, ρ is the density of the fiber, and Z is the thickness of the media.

Thickness was measured according to TAPPI T411 om-15, entitled "Thickness (caliper) of paper, paperboard, and combined board," and a foot pressure of 1.5 psi was used. Basis Weight was measured using TAPPI T410.

Because of the difficulty of measuring thickness of a fine fiber layer, solidity of a fine fiber layer is calculated using an adapted version of the Kirsch-Fuchs equation (see Kirsch et al., "Studies on Fibrous Aerosol Filters—III Diffusional Deposition of Aerosol in Fibrous Filter," *Ann. Occup. Hyg.* 1968; 11:299-304) using experimentally measured pressure drop values. Pressure drop (ΔP or dP) is determined using a FHAST bench, as described in the Liquid Filtration Performance Testing section, below.

First, the dimensionless fiber drag parameter $F^*_{1.0}$ is calculated from the following modified Kirsch-Fuchs equation:

$$\Delta P = \frac{4\left(\frac{BW}{\rho}\right)\mu U_\infty}{\pi D_f^2} F^*_{1.0}$$

where BW is basis weight, ρ is density of the fiber, μ is viscosity of the liquid (used for the pressure drop test), $U_\infty$ is velocity of the liquid through the media during the pressure drop test, and $D_f$ is effective fiber diameter. ΔP is determined from FHAST bench, as described in the Liquid Filtration Performance Testing section, below.

Second, solidity (c) is calculated from $F^*_{1.0}$ using the following equation:

$$F^*_{1.0} = 4.3548 e^{8.8822c}$$

For mixed fiber media, the effective fiber diameter accounts for the relative amounts of the small and large fibers, and is calculated from the following equation:

$$r_{eff} = \frac{\sum_{i=0}^{n} r_i^2 l_i}{\sum_{i=0}^{n} r_i l_i}$$

where $r_{eff}$ is the effective fiber radius, $r_i$ is the radius of fiber i, and $l_i$ is the fraction or relative amount of fiber i. Effective fiber diameter=$2r_{eff}$.

Basis weight of a fine fiber layer or layers is calculated as follows:

Total basis weight of the fine fiber layers=(mass of the fine fibers)/(area of scrim)

The mass of the fine fibers was calculated as follows:

$$\text{Mass of fine fibers} = (\% \text{ w/v polymer in solution}) \times \\ (\text{pump rate}) \times (\text{spinning time})$$

When the method of making the fine fiber is unknown, the mass of the fine fibers may be calculated as follows, after separating (e.g., by peeling or delaminating) the fine fibers from the scrim or support:

$$\text{Mass of fine fibers} = (\text{total mass of media sample}) - \\ (\text{mass of bare scrim or support})$$

Capillary Flow Porometry (Pore Size Measurement)

Pore size measurement was performed by capillary flow porometry method using a continuous pressure scan on a Porometer 3G (Quanachrome Instruments, Boynton Beach, CA).

Flow Porometry Method A

This method used Porofil Wetting Solution as a wetting fluid (Quantachrome Instruments, Anton Paar, Boynton Beach, FL) and samples were tested in both wet and dry states (first wet, then dry). Samples 25 mm in diameter were subjected to a continuous pressure scan from 0.0256 bar to 1.275 bar to determine pore sizes having a diameter in a range of 1 μm to 100 μm.

Flow Porometry Method B

This method used silicone oil, having a surface tension of 20.1 dynes/cm and a wetting contact angle of 0, and samples were tested in both wet and dry states (first dry, then wet). Samples 6 mm in diameter were subjected to a continuous pressure scan selected to measure the majority of the cumulative pore size distribution in a range of 2% to 98%.

For both methods, the sample was tested from low pressure to high pressure, while wet and dry. The air flow and sample pressure from the saturated part of the test is commonly called the wet curve. 256 data points were collected across the range of the scan of the pressures for both the dry curve and the wet curve. Data points were collected across the scan at a rate of approximately 17 data points per minute. The test was performed at ambient conditions (for example, 20° C. to 25° C.). No empirical tortuosity factor and/or a shape factor was applied to adjust the pore size diameter definition.

The flow porometry test procedure collects a set of pressure (typically plotted on the x-axis) and air flow (typically plotted on the y-axis) data for the dry sample, and a set of pressure and air flow data for the saturated (wet) sample. These two sets of data are commonly called the dry curve and the wet curve. That is:

Dry Curve=$V_{dry}$=air flow through a dry sample as a function of pressure

Wet Curve=$V_{wet}$=air flow through a saturated sample as a function of pressure Based on capillary theory, the pressure across the sample (ΔP) can be converted to pore diameter (d) using the Young-Laplace formula,
Where, $$d = \frac{4\gamma\cos\theta}{\Delta P} \times (\text{Emperical Factor})$$

γ=fluid surface tension
θ=contact angle
d=pore diameter
ΔP=pressure across sample This conversion allows the dry and wet curves to be defined as a function of pore diameter. That is:

Dry Curve=$V'_{dry}$=air flow through a dry sample as a function of diameter

Wet Curve=$V'_{wet}$=air flow through a saturated sample as a function of diameter The cumulative flow pore size distribution (Q) is defined as the ratio of the wet curve over the dry curve as a function of pore diameter. Where, $$Q(d) = \frac{V'_{wet}}{V'_{dry}}$$

Cumulative distributions may be represented as an increasing cumulative distribution from 0 to 100%, or as a decreasing cumulative distribution from 100% to 0%. The pore sizes in this document are defined from the increasing cumulative flow pore size distribution. Where, Incr.Cumulative Flow Pore Distribution=$1-Q(d)$ To better identify points along this curve, this document defines various P(x %) values that are equal to the corresponding pore diameter (d)

$P(x\%)=d$, where $x\%=1-Q(d)$

Examples include, but are not limited to, the following:

P5 is the pore diameter that has an increasing cumulative flow pore distribution of 5%.

P10 is the pore diameter that has an increasing cumulative flow pore distribution of 10%.

P50 is the pore diameter that has an increasing cumulative flow pore distribution of 50%.

P90 is the pore diameter that has an increasing cumulative flow pore distribution of 90%.

P95 is the pore diameter that has an increasing cumulative flow pore distribution of 95%.

Where the maximum pore size was reported, the maximum pore size was determined by detecting the bubble point using the Porometer 3G (Quanachrome Instruments, Boynton Beach, CA), using the Auto Bubble Point (BP Auto Tolerance) method. According to this method, the bubble point is found after fluid begins passing through the sample, and three consecutive measurement increased by at least 1%. The bubble point is the value at the start of this sequence of three points.

Air Filtration Performance

Air filtration performance was assessed with a High-Efficiency Flat Sheet (HEFS) TSI Automated Filter Tester, Model 8127, test bench (TSI Incorporated, Shoreview, MN) to measure particle capture efficiency using 0.3 μm oil (bis(2-ethylhexyl) sebacate, Sigma-Aldrich) droplets (aerosol) at a flow rate of 14.7 liters per minute (L/min) to challenge 4 inch diameter media samples. TSI's CertiTest Model 8127 Automated Filter Tester is designed for testing filters, respirator cartridges, and filter media to the latest American government and industry-wide specification, and meets the standards of 42 CFR § 84 (Jun. 8, 1995).

Liquid Filtration Performance Testing

Liquid filtration performance was assessed with a Flat-sheet, High-Accuracy, Singlepass Two-fluid (FHAST) bench having the following features: flow rate control: 57 mL/min to 580 mL/min at ±2% error; temperature control: 25° C. to 40° C. at ±0.25° C. error; dP measurement: 0 psi to 25 psi at ±0.065% error; particle size: 1.7 μm to 20 μm;

max particle concentration: 1,000,000/mL; dilution capabilities: 5: 1-100:1. The FHAST bench was used in static mode using ISO Medium Test Dust per ISO 11171:2016 at a concentration of 10 milligrams per liter (mg/L) in hydraulic fluid and at a flow rate of 0.347 L/min to challenge 2 inch diameter media samples. Values for media dP and efficiencies for a particular contaminant particle size (measured using commercially available particle counters, specifically PAMAS 4132 Particle Counting System for Liquids, calibrated with ISO Medium Test Dust per ISO 11171:2016, Hydraulic fluid power—Calibration of automatic particle counters for liquids) were collected at regular time intervals (approximately every 7 sec) throughout the duration of testing, which was terminated upon reaching a pre-set maximum media dP of 20 psi (measured with two Test Media dP sensors: (A) 0 psi to 5 psi, ±0.025% accuracy differential pressure transducer; high accuracy, low range dP sensor and (B) 0 psi to 25 psi, ±0.065% accuracy differential pressure transducer; low accuracy, high range dP sensor).

Beta ratio was evaluated under steady flow conditions (347 mL/min through a media sample 2 inches in diameter) using ISO 16889:2008 (Hydraulic fluid power—Filters—Multi-pass method for evaluating filtration performance of a filter element) except when testing flat sheet performance, the test was run in single-pass mode, instead of the multipass mode called for by the test standard. Hydraulic fluid (Mobil Aero HF, MIL-PRF-5606) was laden with ISO 12103-1 A3 Medium Test Dust (Powder Technology, Inc., Arden Hills, MN) at a concentration of 10 mg/L. Instantaneous beta values were recorded every 7 seconds throughout the test duration. A test ends when a terminal dP of 20 psi is reached.

Figure of Merit

Figure of Merit is a measure of the performance of a filter media and of the filter media's ability to provide a certain level of clarification of a stream with a minimum energy used. Larger Figure of Merit values are generally better than smaller values.

Figure of Merit (FOM) values were calculated from fractional penetration (P, the ratio of upstream and downstream counts), pressure drop (dP, inches $H_2O$) and face velocity (u, fpm):

$$FOM=(-\log_{10}P)/(dP/u)$$

Fractional penetration (P), pressure drop (dP) and face velocity (u) were measured using the HEFS TSI Automated Filter Tester, Model 8127, test bench, as described above.

Scanning Electron Microscopy (SEM)

Samples were prepared for SEM imaging by sputter-coating with gold. Typically, a 5 kV or a 10 kV accelerating voltage was used and images were collected at ×500, ×1000 and ×2500 magnifications with a secondary electron detector or a backscatter electron detector.

Example 1

The media was prepared using a dual headbox, as described above, by forming the furnishes of Table 1A and Table 1B and forming a media having 55-60% by mass of the fibers of Table 1A (used to form the felt side of the media) and 40-45% by mass of the fibers of Table 1B (used to form the wire side of the media).

Figure 9:
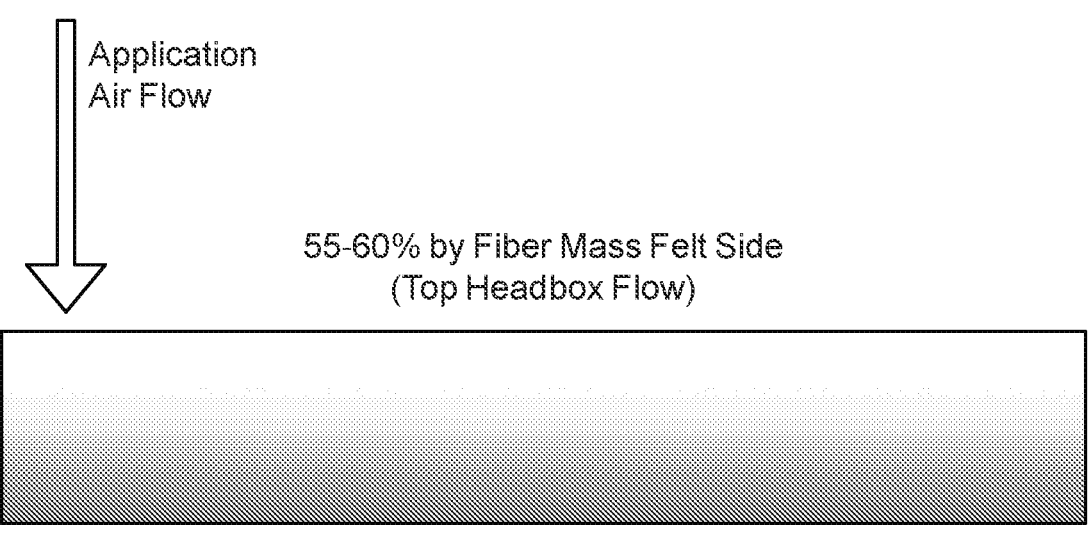
FIG. 9 shows a schematic of an exemplary media, further described in Example 1.

Resulting properties of the media are shown in FIG. 1C. A schematic of the media is shown in FIG. 9.

TABLE 1A

| Fiber Mass Felt Side | | |
| --- | --- | --- |
| Fiber Name | Material | Weight Ratio |
| Teijin TJ04CN 2.2 dtex × 5 mm | CoPET/PET Sheath(110C)/ Core BiComp | 16.67% |
| Teijin TJ0BN 2.2 dtex × 5 mm | CoPET/PET Sheath(150C)/ Core BiComp | 16.67% |
| Teijin TP04N 0.06 dtex × 3 mm | PET | 5.56% |
| Teijin TA34 2.2 dtex × 10 mm | PET | 5.56% |
| Lauscha B-04-F | Micro Fiber Glass | 50.00% |
| EFT L-040-6 | Fibrillated Lyocell | 5.56% |

TABLE 1B

| Fiber Mass Wire Side | | |
| --- | --- | --- |
| Fiber Name | Material | Weight Ratio |
| Teijin TJ04CN 2.2 dtex × 5 mm | CoPET/PET Sheath(110C)/ Core BiComp | 16.67% |
| Teijin TJ0BN 2.2 dtex × 5 mm | CoPET/PET Sheath(150C)/ Core BiComp | 16.67% |
| Teijin TP04N 0.06 dtex × 3 mm | PET | 11.11% |
| Teijin TA34 2.2 dtex × 10 mm | PET | 16.67% |
| EFT L-200-6 | Fibrillated Lyocell | 27.78% |
| EFT L-040-6 | Fibrillated Lyocell | 5.56% |
| Minifibers 5.0 d × 6 mm | PET (Blue) | 5.56% |

TABLE 1C

| Properties of the Media | |
| --- | --- |
| Dry Basis Weight | 75-83 g/m$^2$ |
| Air Permeability | 4.8-5.0 ft/min @125 Pa |
| Thickness | 0.47-0.54 mm @ 1.5 psi |
| TSI8127 0.3 μm Efficiency @ 10.5 ft/min | 99.98% |

Example 2

The media was prepared using a dual headbox, as described above, by forming the furnishes of Table 2A and Table 2B and forming a media having 40-50% by mass of the fibers of Table 2A (used to form the felt side of the media) and 50-60% by mass of the fibers of Table 2B (used to form the wire side of the media).

Figure 10:
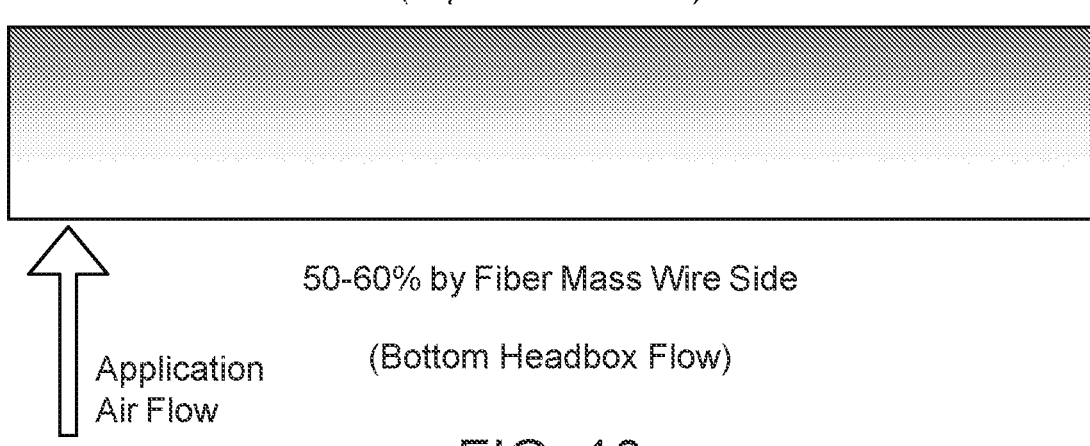
FIG. 10 shows a schematic of an exemplary media, further described in Example 2.

Resulting properties of the media are shown in FIG. 2C. A schematic of the media is shown in FIG. 10.

TABLE 2A

| Fiber Mass Felt Side | | |
| --- | --- | --- |
| Fiber Name | Material | Weight Ratio |
| Teijin TJ04CN 2.2 dtex × 5 mm | CoPET/PET Sheath(110C)/ Core BiComp | 21.43% |
| Teijin TJ0BN 2.2 dtex × 5 mm | CoPET/PET Sheath(150C)/ Core BiComp | 35.71% |
| Minifibers 5.0 d × 6 mm | PET (blue) | 14.29% |
| EFT L-040-6 | Fibrillated Lyocell | 21.43% |
| ACF 6 μm × 15 mm | Activated Carbon Fiber | 7.14% |

TABLE 2B

| Fiber Mass Wire Side | | |
|---|---|---|
| Fiber Name | Material | Weight Ratio |
| Teijin TJ04CN 2.2 dtex × 5 mm | CoPET/PET Sheath(110C)/ Core BiComp | 21.43% |
| Teijin TJ0BN 2.2 dtex × 5 mm | CoPET/PET Sheath(150C)/ Core BiComp | 35.71% |
| Lauscha B-06-F | Micro Fiber Glass | 21.43% |
| Lauscha B-10-F | Micro Fiber Glass | 21.43% |

TABLE 2C

| Properties of the Media | |
|---|---|
| Dry Basis Weight | 47-50 g/m² |
| Air Permeability | 20-23 ft³/ft²/min @ 125 Pa |
| Thickness | 0.40-0.42 mm @ 1.5 psi |
| TSI8127 0.3 μm Efficiency @ 10.5 ft/min | 95.3% |

Example 3

Figure 11:
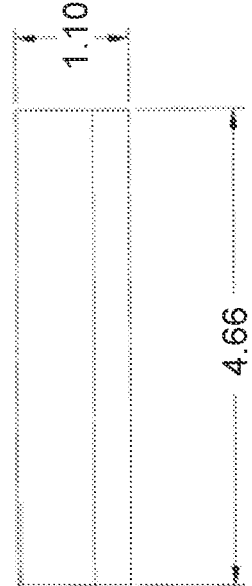
FIG. 11 shows a schematic of exemplary pleating of a media, further described in Example 3.
Figure 11:
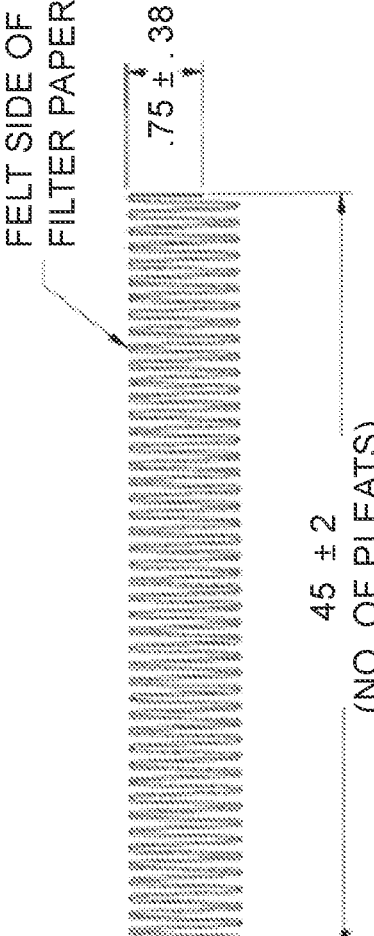

The media of Example 1 was pleated to 8 pleats per inch using a blade pleater. A schematic of the resulting media is shown in FIG. 11.

TABLE 3

| Test Aerosol | Nacl, Neutralized | DOP, Neutralized |
|---|---|---|
| ΔP ("H₂O) | 0.214 | 0.214 |
| Size Range (μm) | Fractional Efficiency(%) | |
| 0.3-0.4 | 99.982 | 99.961 |
| 0.4-0.45 | 99.984 | 99.972 |
| 0.45-0.75 | 99.985 | 99.973 |
| 0.75-1.00 | 99.988 | 99.975 |
| 1.0-2.0 | 99.992 | 99.985 |
| 2.0-3.0 | 100.000 | 99.988 |
| 3.0-4.0 | 100.000 | 99.989 |

Example 4

Figure 15:
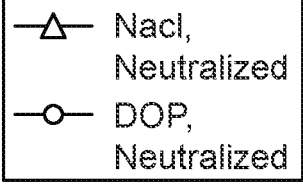
FIG. 15 shows fractional efficiency versus particle diameter for the filter element described in Example 4.
Figure 15:
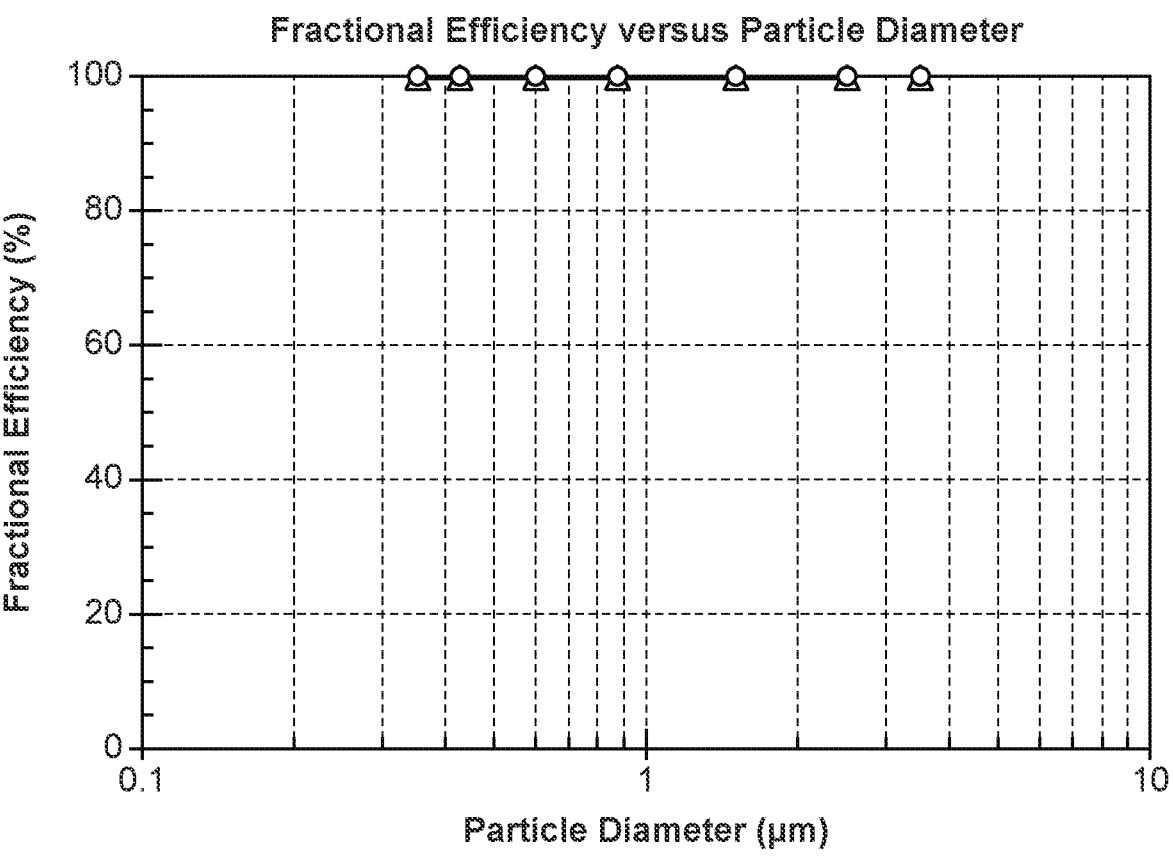

The media of Example 1 was pleated, as described in Example 3, and incorporated in a filter element. The resulting filter element was tested. Results are shown in Table 3 and FIG. 15.

Excellent pressure drops were observed even at a higher than typical flow rate (typical flow rates are application 3 cfm; filter element was tested at 8 cfm). A pressure drop of 0.21 was observed.

Example 5

Figure 16:
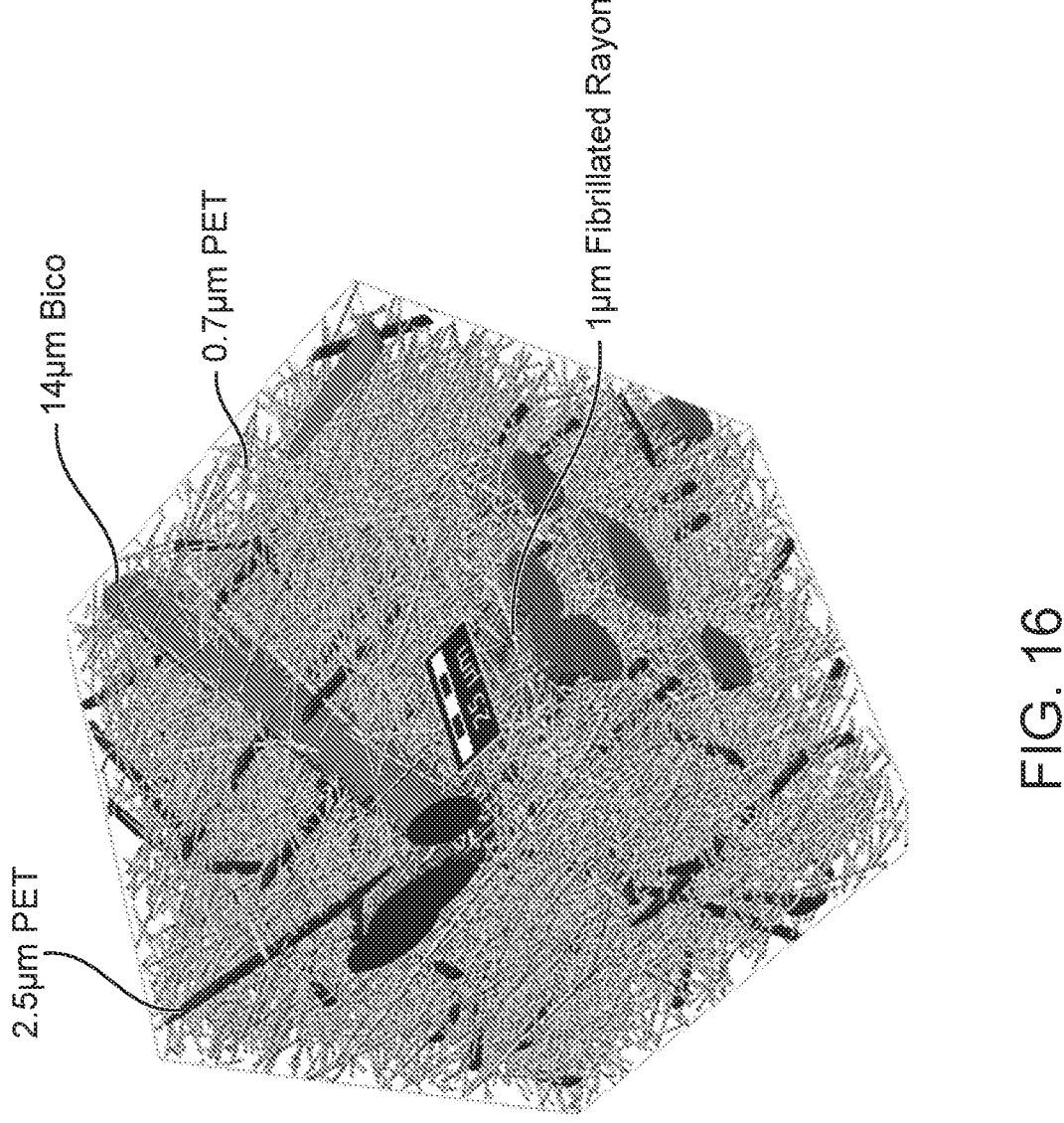
FIG. 16 shows a pictorial representation of a simulation of a glass free filtration media including 14 μm-diameter bicomponent fibers, 0.7 μm-diameter PET fibers, 2.5 μm-diameter PET fibers, and 1 μm-diameter fibrillated rayon fibers, as further described in Example 5. The simulation of the rayon fibers does not depict the full extent of their bundle properties.

A glass free filter media including 40 wt-% 14 μm-diameter bicomponent fibers, 20 wt-10% 0.7 μm-diameter PET fibers, 20 wt-% 2.5 μm-diameter PET fibers, and 20 wt-% 1 μm-diameter fibrillated rayon fibers was simulated using Geodict (Math2Market). A pictorial representation of the resulting media is shown in FIG. 16.

Example 6

Figure 17:
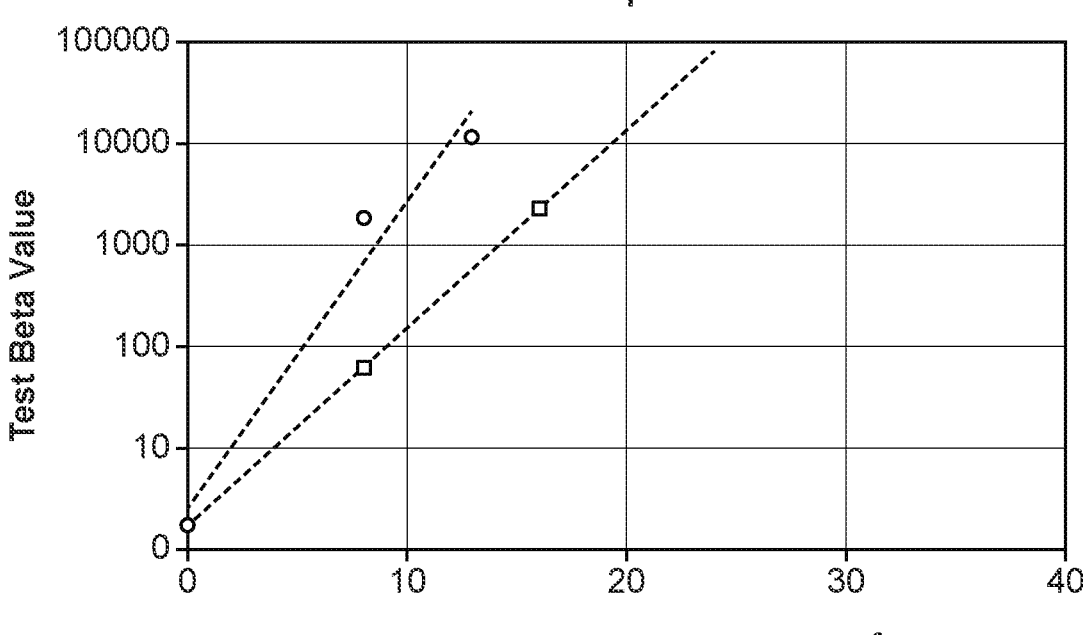
FIG. 17 shows test $\beta$ values measured to determine $\beta_{4\ \mu m}$=10,000 for handsheets prepared as described in Example 6 and including 24 g/m² of 14 μm-diameter bicomponent fibers with varying amounts of 700 nm-diameter PET fibers (circles) or 14 μm-diameter bicomponent fibers with varying amounts of 700 nm-diameter PET fibers, 1 μm-diameter fibrillated rayon fibers (Lyocell), and 2.5 μm-diameter PET fibers (squares). Trendlines for each data set were calculated using a curve fit in Excel.

Handsheets were prepared in a wet laid process by mixing 24 g/m² of 14 μm-diameter bicomponent fibers (Advansa 271P) with varying amounts of 700 nm-diameter PET fibers (TJ04BN, Teijin Fibers Limited, Osaka, Japan) (FIG. 17, circles) or by mixing 24 g/m² of 14 μm-diameter bicomponent fibers with varying amounts of 700 nm-diameter PET fibers, 1 μm-diameter fibrillated rayon fibers (Lyocell), and 2.5 μm-diameter PET fibers (Teijin Fibers Limited, Osaka, Japan) (FIG. 17, squares), and β was measured to determine $\beta_{4\ \mu m}$=10,000. Results are shown in FIG. 17. Varying amounts of 700 nm-diameter PET fibers alone were used to provide varying basis weights. The amount of each fiber added is shown in Table 4.

TABLE 4

| | Basis Weight of 14 μm-diameter bicomponent fibers | Basis Weight of 700 nm-diameter PET fibers | Basis Weight of 1 μm-diameter fibrillated rayon fibers | Basis Weight of 2.5 μm-diameter PET fibers |
|---|---|---|---|---|
| Sample 1 | 24 g/m² | 0 | 0 | 24 g/m² |
| Sample 2 | 24 g/m² | 8 g/m² | 0 | 24 g/m² |
| Sample 3 | 24 g/m² | 16 g/m² | 0 | 24 g/m² |
| Sample 4 | 24 g/m² | 8 g/m² | 8 g/m² | 24 g/m² |
| Sample 5 | 24 g/m² | 13 g/m² | 13 g/m² | 24 g/m² |

Extrapolating from the data collected, it is expected that to achieve a $\beta_{4\ \mu m}$=10,000 from a media including 24 g/m² 14 μm-diameter bicomponent fibers would require about 20 g/m² of the 700 nm-diameter PET fibers. When adding 1 μm-diameter fibrillated rayon fibers and 2.5 μm-diameter PET fibers to the 700 nm-diameter PET fibers and the 14 μm-diameter bicomponent fibers, however, it would only take about 12 g/m² of the 700 nm-diameter PET fiber to achieve a $\beta_{4\ \mu m}$=10,000.

These results were unexpected because typically to make a high efficiency media for liquid filtration, smaller fibers are added. As shown in this Example, however, the same efficiency achieved by adding 700 nm-diameter PET fibers to 14 μm-diameter bicomponent fibers was achieved by removing some of these smaller fibers and replacing them with larger (1 μm (1000 nm)-diameter fibrillated rayon fibers and 2.5 μm (2500 nm)-diameter PET fibers.

Without wishing to be bound by theory, it is believed that using 1 μm-diameter fibrillated rayon fibers in combination with 2.5 μm-diameter PET fibers is particularly beneficial. The 1 μm-diameter fibrillated rayon fibers are believed to provide more tensile strength than if the 2.5 μm-diameter PET fibers were used without the fibrillated rayon fibers. The 2.5 μm-diameter PET fibers are believed to provide more uniform pore structures than if the fibrillated rayon fibers were used without the 2.5 μm-diameter PET fibers.

Example 7

Figure 18:
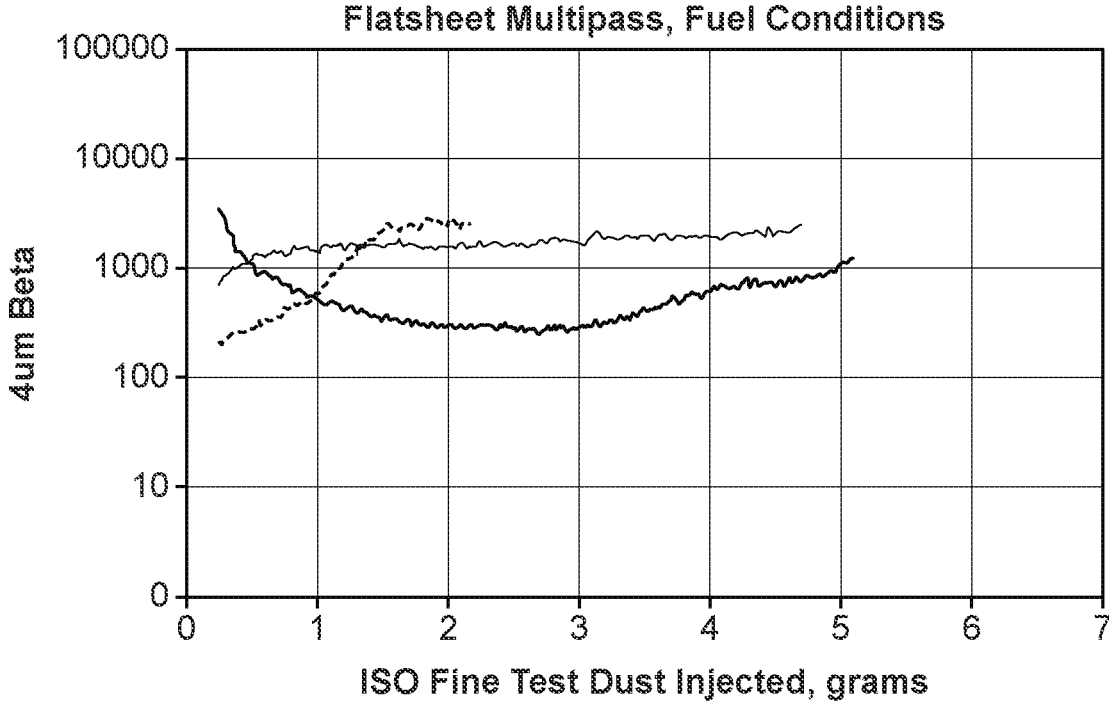
FIG. 18 shows $\beta_{4\ \mu m}$ measured for media prepared as described in Example 7.

$\beta_{4\ \mu m}$ was measured using ISO Fine test dust at a concentration of 40 mg/L for Captimax 190 SC (Ahlstrom) (FIG. 18, "Base Layer"), and for a combination of polyester meltblown (FF40/240 PBT, Ahlstrom) and Captimax 190 SC (Ahlstrom) (FIG. 18, "Polyester Meltblown on Base Layer").

Handsheets were prepared in a wet laid process by mixing 50 wt-% 14 μm-diameter bicomponent fibers with 1 μm-diameter fibrillated rayon fibers (Lyocell) and 2.6 μm-diameter PET fibers (TJ04BN, Teijin) (FIG. 18, "DCI Glass Free on Base Layer"); $\beta_{4\ \mu m}$ was measured using ISO Fine test dust at a concentration of 40 mg/L. Results are shown in FIG. 18.

When the $\beta_{4\ \mu m}$ was measured for the Captimax media, variable efficiency was observed. Without wishing to be bound by theory, this likely due to a lack of uniform pore sizes. The presence of larger pores results in a decrease in the efficiency observed when larger particles are added until those large particles fill the larger pores at which time efficiency increases again.

Example 8

This Example describes the increased efficiency and life obtained with the use of a composite including a fine fiber layer.

Figure 20A:
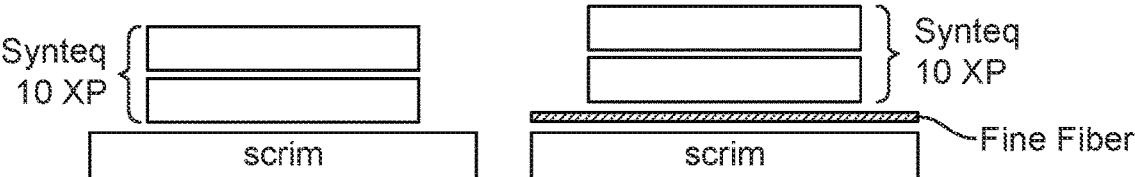
FIG. 20A shows a schematic of an exemplary flatsheet, which, in some embodiments, may be prepared as described in Example 4.
Figure 20B:
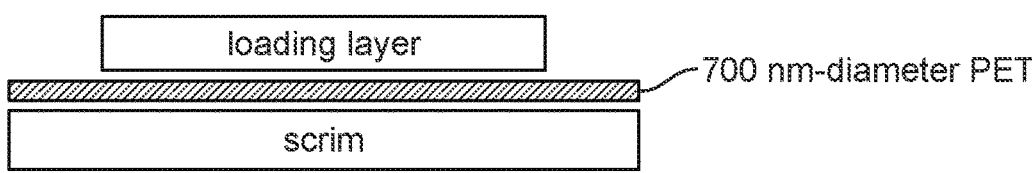
FIG. 20B shows a schematic of an exemplary flatsheet.

Flatsheets were prepared including a scrim (1 oz/yd$^2$ polyester, sold under the trade name Reemay) and Synteq® 10XP (Donaldson Company, Inc., Minneapolis, MN) overlaid on the scrim (FIG. 20A, left panel), or using the same scrim with a 1 μm-diameter fine fiber electrospun to form a layer thereon and Synteq® 10XP overlaid on the fine fiber layer (FIG. 20A, right panel).

Figure 19A:
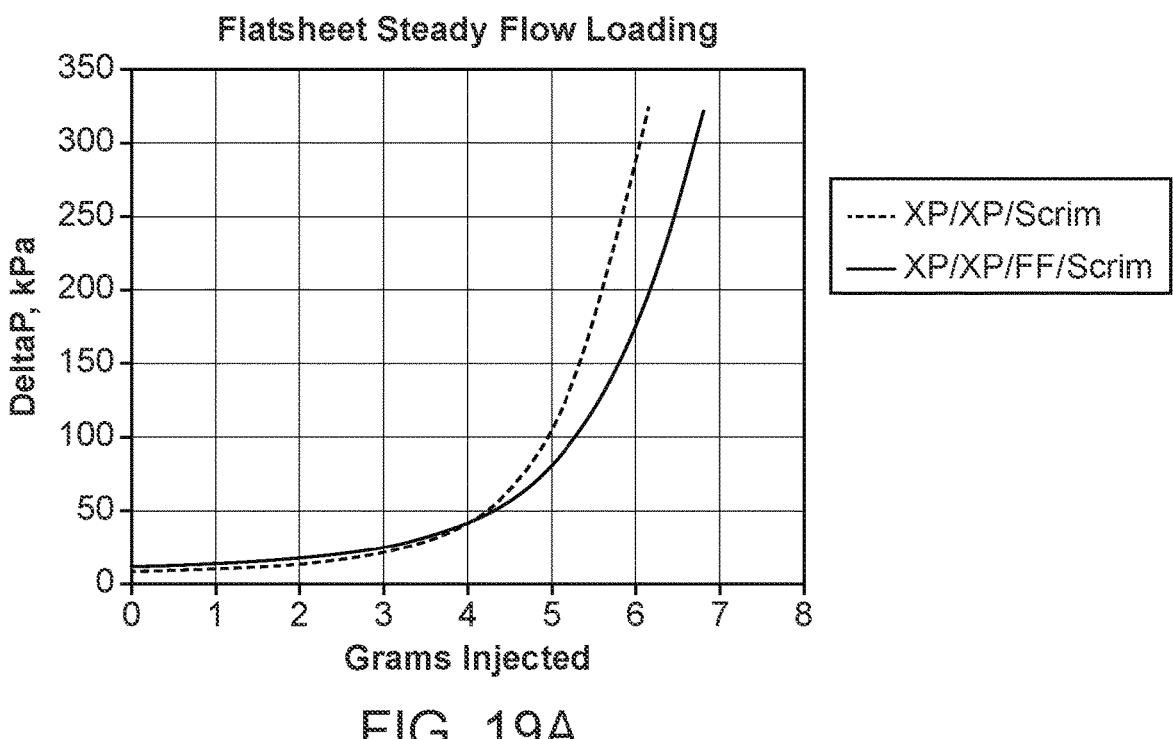
FIG. 19A shows the loading capacity of a flatsheet prepared as described in Example 8.
Figure 19B:
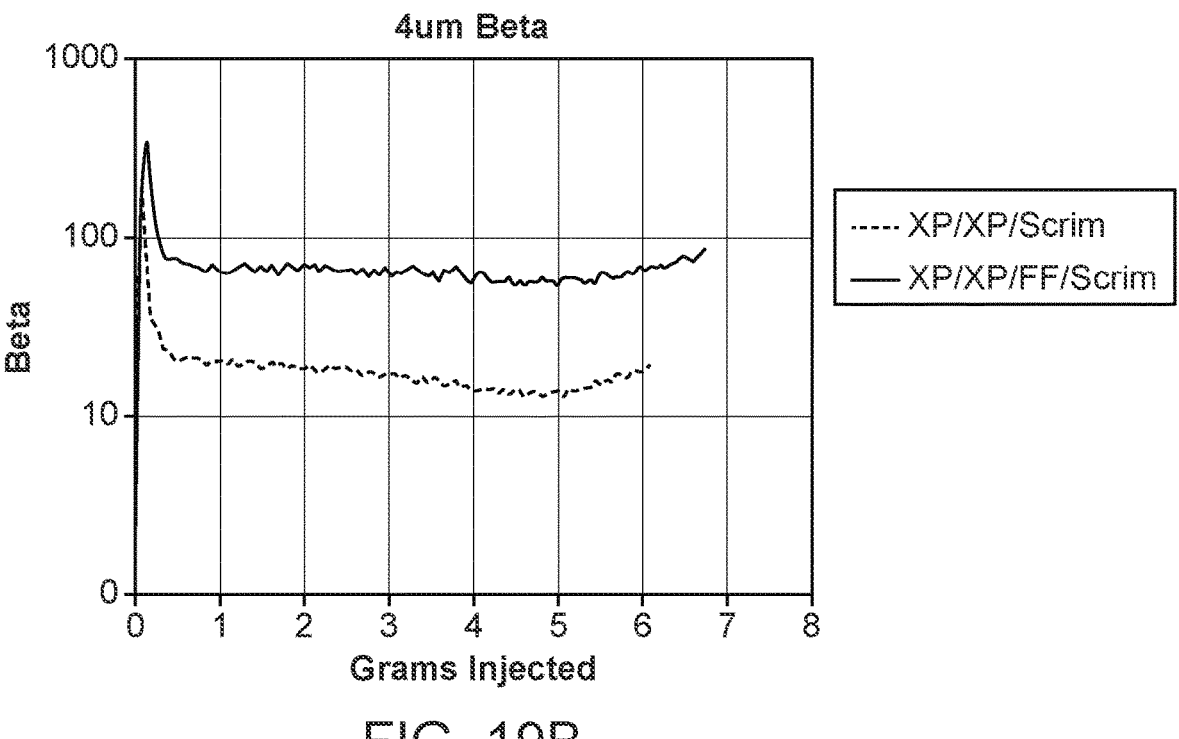
FIG. 19B shows the efficiency of a flatsheet prepared as described in Example 8.

As shown in FIG. 19A, the addition of the fine fiber layer increased the loading capacity (that is, the life) of the flatsheet compared to the flatsheet without the fine fiber layer. As shown in FIG. 10B, the addition of the fine fiber layer increased the efficiency of the flatsheet compared to the flatsheet without the fine fiber layer.

These results were unexpected because it has been previously reported that creating an interface between media layers is undesirable and a gradient structure should be pursued instead. (See, for example, US Publication No. 2014/0360145.)

Without wishing to be bound by theory, it is believed that the creation of an interface between media layers may allow for higher efficiency because the non-uniformities of each layer do not align throughout the depth of the media.

Example 9

The same increases in loading capacity and efficiency reported in Example 4 are expected in a flatsheet including a scrim, a layer of 700 nm-diameter PET fibers, and a handsheet prepared as described in Example 6 or Example 7 including 40%-60% 14 μm-diameter bicomponent fibers, 0-25% 2.5 μm-diameter PET fibers, and 10-40% 1 μm-diameter fibrillated rayon fibers (FIG. 20B).

Without wishing to be bound by theory, it is believed that the layer of 700 nm-diameter PET fibers would act as an efficiency layer, and the handsheet would act as a loading layer. The variable efficiency that would otherwise be observed if the handsheet was used alone is expected to be eliminated by the combination with the 700 nm-diameter PET fibers (acting as an efficiency layer).

Example 10

XP/Fine Fiber/Scrim media was constructed by combining Synteq XP™ synthetic liquid media having a 10 micron efficiency rating as the efficiency layer (Donaldson Company, Inc., Minneapolis, MN), a support layer (CEREX 23200, Cerex Advanced Fabrics, Inc., Cantoment, FL), and a continuous fine fiber layer deposited on the support layer using electrospinning. The continuous fine fiber layer was formed from SVP 651 (see Table 7). The efficiency layer was the most upstream layer; the continuous fine fiber layer was placed downstream of the efficiency layer; and the support layer (scrim) was placed downstream of the continuous fine fiber layer.

The layers were placed on top of each other and placed in a filter housing.

Figure 23:
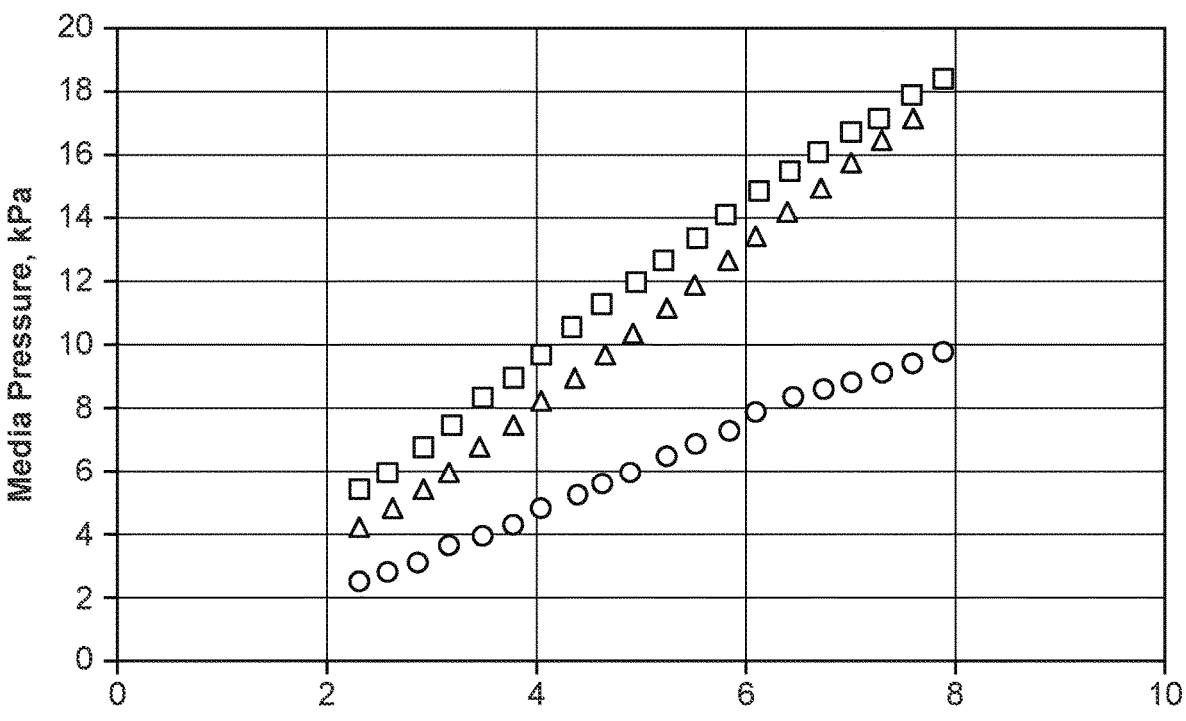
FIG. 23 shows the pressure drop for Donaldson Synteq XP™ synthetic liquid media having a 10 micron efficiency rating, Donaldson Synteq XP™ synthetic liquid media having a 5 micron efficiency rating, and filter medium (XP/Fine Fiber/Scrim) as described in Example 10 (an efficiency layer (Donaldson Synteq XP™ synthetic liquid media having a 10 micron efficiency rating), a continuous fine fiber layer, and a support layer (scrim)).

Although comparable efficiency was observed for the Synteq XP™ synthetic liquid media having a 5 micron efficiency rating and the XP/Fine Fiber/Scrim media, the XP/Fine Fiber/Scrim media, the XP/Fine Fiber/Scrim media exhibited improved pressure drop, as shown in FIG. 23.

TABLE 7

| Reported physical properties of SVP 651 resin are: | | | |
|---|---|---|---|
| Property | ASTM Method | Units | Typical Value |
| Specific Gravity | D-792 | — | 1.08 |
| Water Absorption (24 hr immersion) | D-570 | % | 2.5 |
| Hardness | D-240 | Shore D | 65 |
| Melting Point | DSC | ° C.(° F.) | 154 (309) |
| Tensile Strength @ Yield | D-638 | MPa (kpsi) | 50 (7.3) |
| Elongation at Break | D-638 | % | 350 |
| Flexural Modulus | D-790 | MPa (kpsi) | 180 (26) |
| Volume Resistivity | D-257 | ohm-cm | $10^{12}$ |

Example 11

Media was prepared according to Pendant Drop Sample Preparation Method 3, Table 5 Set A (small fine fibers deposited directly on scrim) and Pendant Drop Sample Preparation Method 4, Table 5, Set A (small fine fibers deposited on a large fine fiber layer deposited on scrim).

An exemplary image of the large fine fiber layer deposited on scrim is shown in FIG. 22B.

Figure 22C:
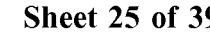
FIG. 22C shows exemplary SEM images (1000× magnification) of samples prepared as described in Example 12 (small fine fibers laid directly on scrim).
Figure 22D:
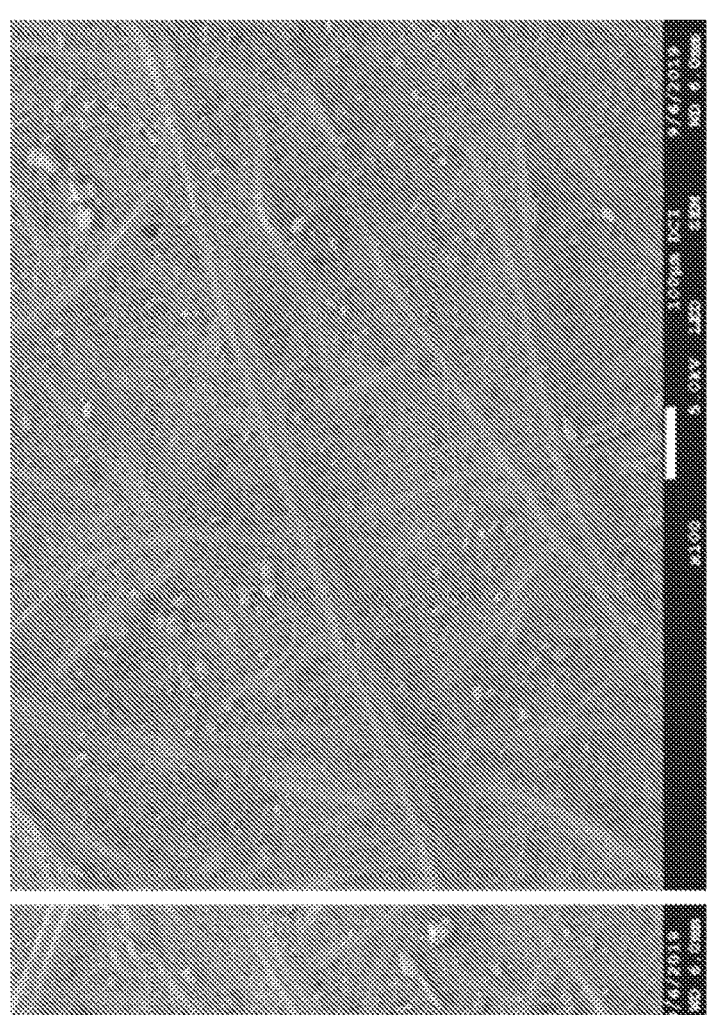
FIG. 22D shows exemplary SEM images (1000× magnification) of samples prepared as described in Example 12 (small fine fibers overlaid on large fine fibers).
Figure 22D:
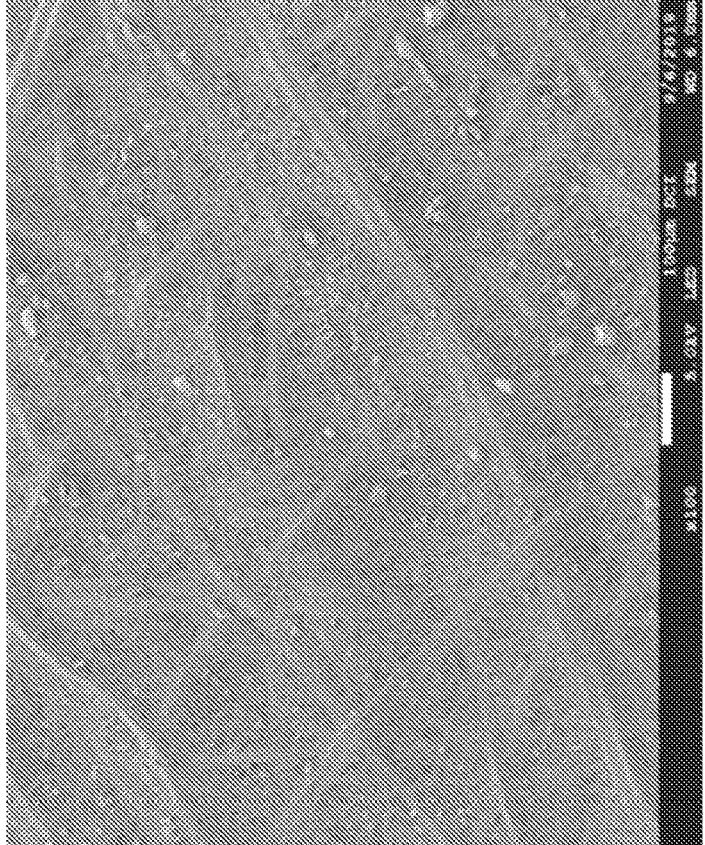

An exemplary image of small fine fibers deposited directly on scrim is shown in FIG. 22C and an exemplary image of small fine fibers deposited on a large fine fiber layer deposited on scrim is shown in FIG. 22D (small fine fibers deposited on a large fine fiber layer deposited on scrim).

Example 12

Media was prepared according to Pendant Drop Sample Preparation Method 1. The resulting nonwoven had a theoretical basis weight of 1.64 g/m$^2$.

Control nonwoven media, prepared by co-spinning each single electrospinning precursor solution from two different syringes, had theoretical basis weights of 0.56 g/m$^2$ or 1.08 g/m$^2$, for Solution 1 and Solution 2, respectively.

Figure 22E:
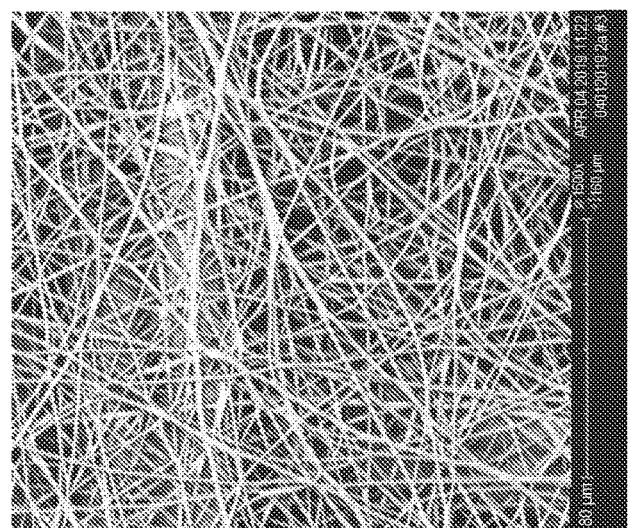
FIG. 22E shows exemplary SEM images (1000× magnification) of samples prepared as described in Example 13 using Solution 1 to achieve small fine fibers (left panel), Solution 1 and Solution 2 to achieve commingled fine fibers of mixed (small and large) diameters (center panel), and Solution 2 to chieve large fine fibers (right panel).
Figure 22E:
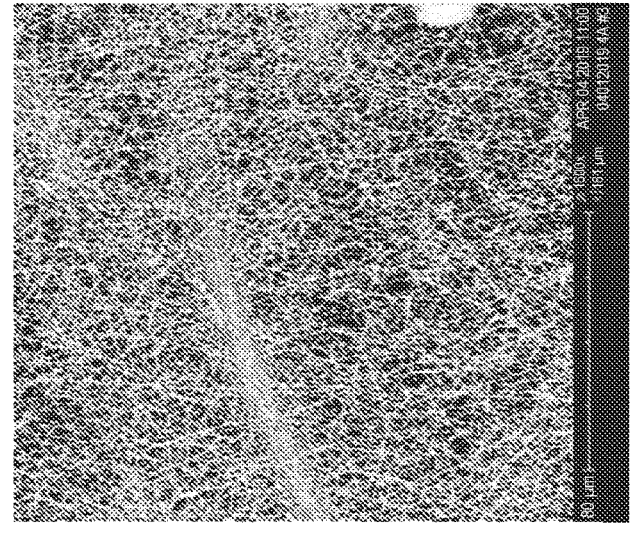
Figure 22E:
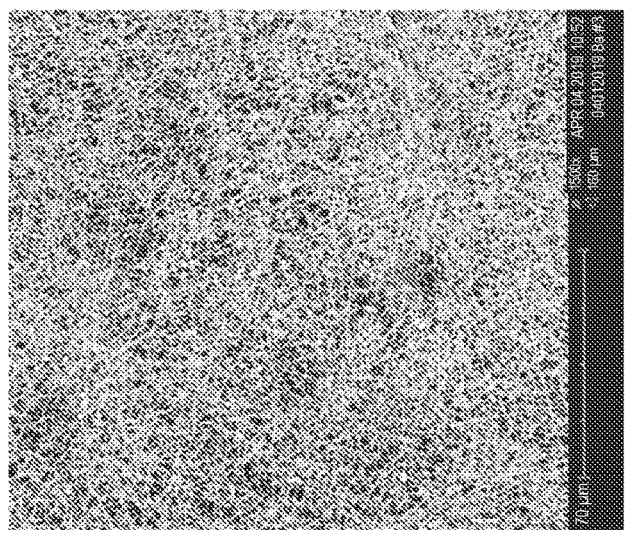
Figures 22F, 22G:
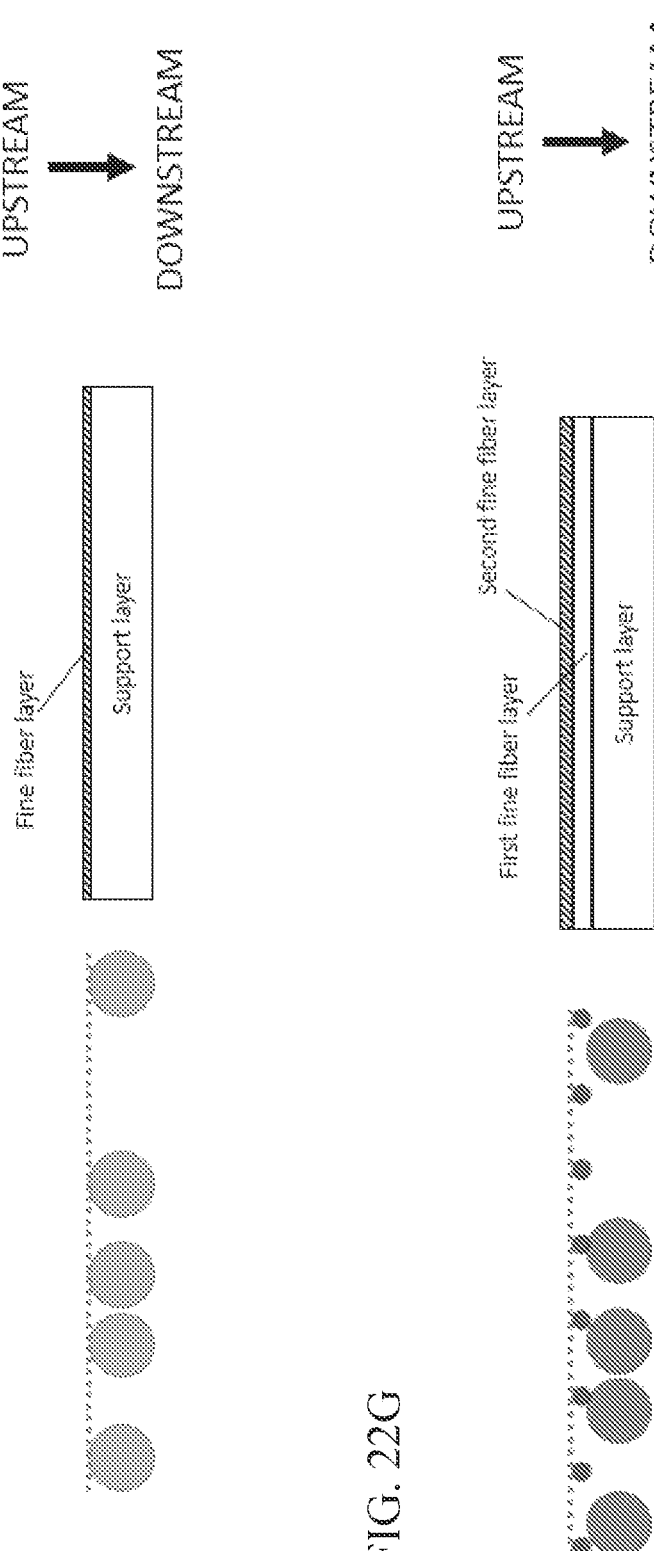
FIG. 22F shows a schematic for a sample prepared as described in Example 12 (small fine fibers laid directly on scrim).
FIG. 22G shows a schematic for a sample prepared as described in Example 12 (small fine fibers overlaid on large fine fibers, large fine fibers laid direction on scrim).
Figure 22H:
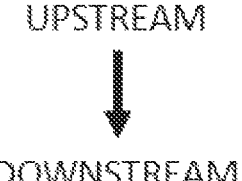
FIG. 22H-FIG. 22M show schematics of exemplary media constructions. In each construction, the support layer is not shown but typically would be located on the downstream side of the media. In each construction, the efficiency layer is not shown but may be added; if included, it would typically be located on the upstream side of the media.
Figure 22I:
Figure 22J:
Figure 22K:
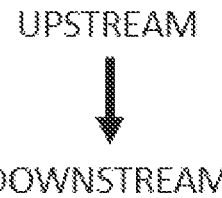
Figure 22L:
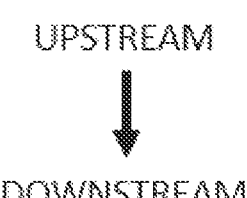
Figure 22M:

SEM images of the resulting media are shown in FIG. 22E.

Example 13

This Example describes a filter media including a support layer (Cerex 23200) and a continuous fine fiber layer formed from a nylon copolymer resin (SVP 651 obtained from Shakespeare Co., Columbia, SC, a terpolymer having a number average molecular weight of 21,500-24,800 comprising 45% nylon-6, 20% nylon-6,6 and 25% nylon-6,10) dissolved in alcohol (ethanol, 190 proof). The nylon copolymer resin was heated to 60° C. to produce a 9% (w/w) nylon solids solution (Example 13A) or a 11% (w/w) nylon solids solution (Example 13B). The solution was agitated until uniform then electrospun.

Figure 24A:
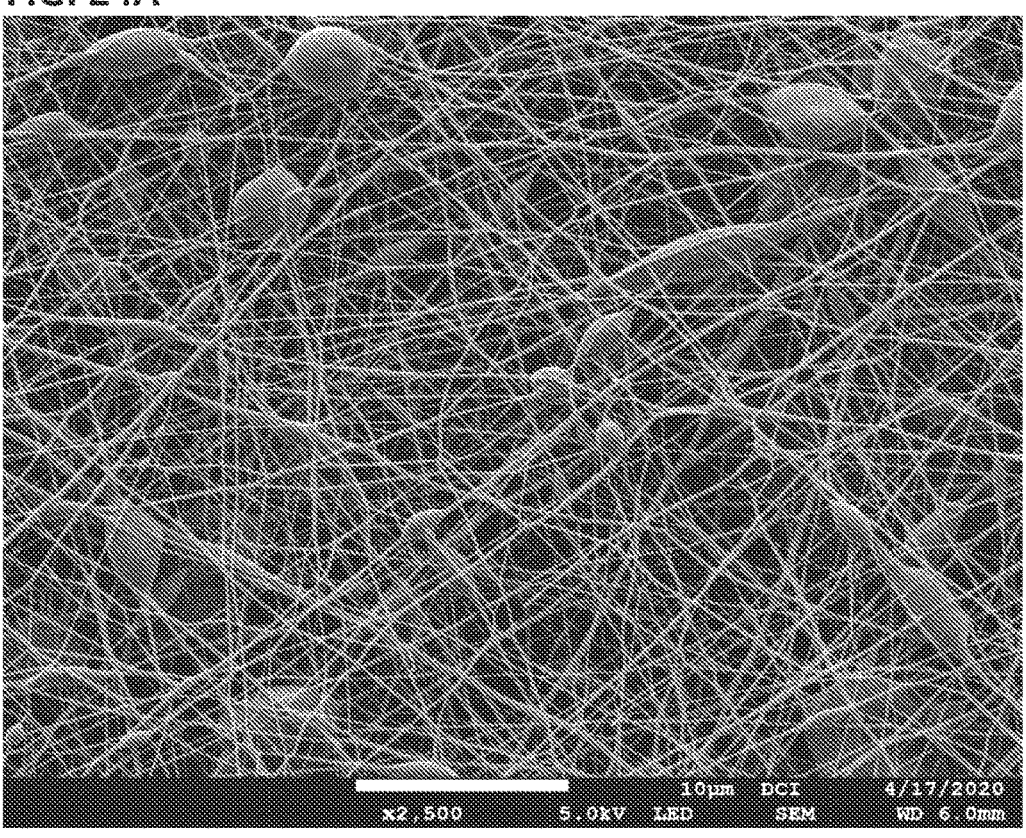
FIG. 24A shows an exemplary SEM image at ×2500 magnification of a media described in Example 13A including 200-300 nm diameter fibers in a continuous fine fiber layer on a support layer.

In Example 13A, the continuous fine fiber layer includes fine fibers having an average diameter of 200 nm to 300 nm. An exemplary SEM image is shown in FIG. 24A. The filter media exhibited>95% efficiency at 0.3 μm and a pressure drop (dP) of <29 mm H$_2$O.

Figure 24B:
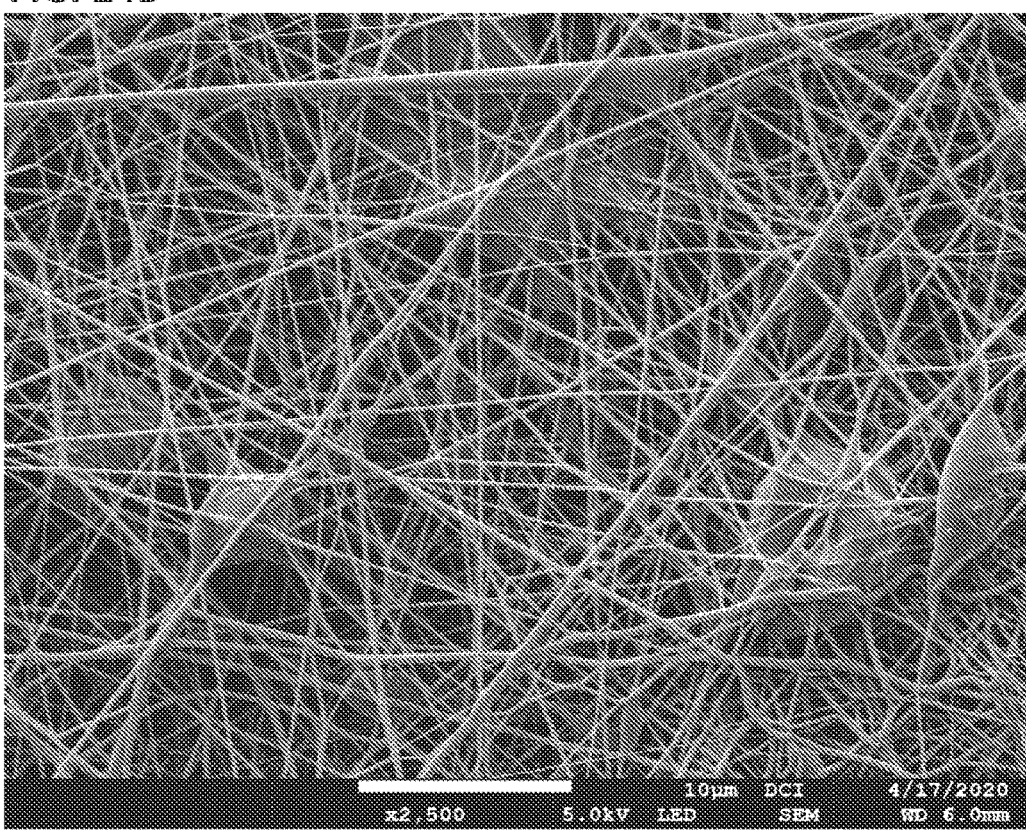
FIG. 24B shows an exemplary SEM image at ×2500 magnification of a media described in Example 13B including 350-450 nm diameter fibers in a continuous fine fiber layer on a support layer.

In Example 4B, the continuous fine fiber layer includes fine fibers having an average diameter of 350 nm to 450 nm. An exemplary SEM image is shown in FIG. 24B. The filter media exhibited>95% efficiency at 0.3 μm and a dP<29 mm H$_2$O.

Table 8 provides a comparison of properties of the media of Examples 13A and 13B.

TABLE 8

|  | Max Pore Size (μm) | Mean Flow Pore Size (μm) | Min Pore Size (μm) |
|---|---|---|---|
| Cerex 23200 (bare scrim) | 65.1 ± 15.6 | 48.5 ± 10.0 | 23.6 ± 11.7 |
| With 200-300 nm Fiber Diameter (Example 13A) | 8.3 ± 5.8 | 2.2 ± 0.2 | 2.1 ± 0.2 |
| With 350-450 nm Fiber Diameter (Example 13B) | 2.9 ± 0.1 | 2.3 ± 0.1 | 2.15 ± 0.05 |

Example 14

Figure 25:
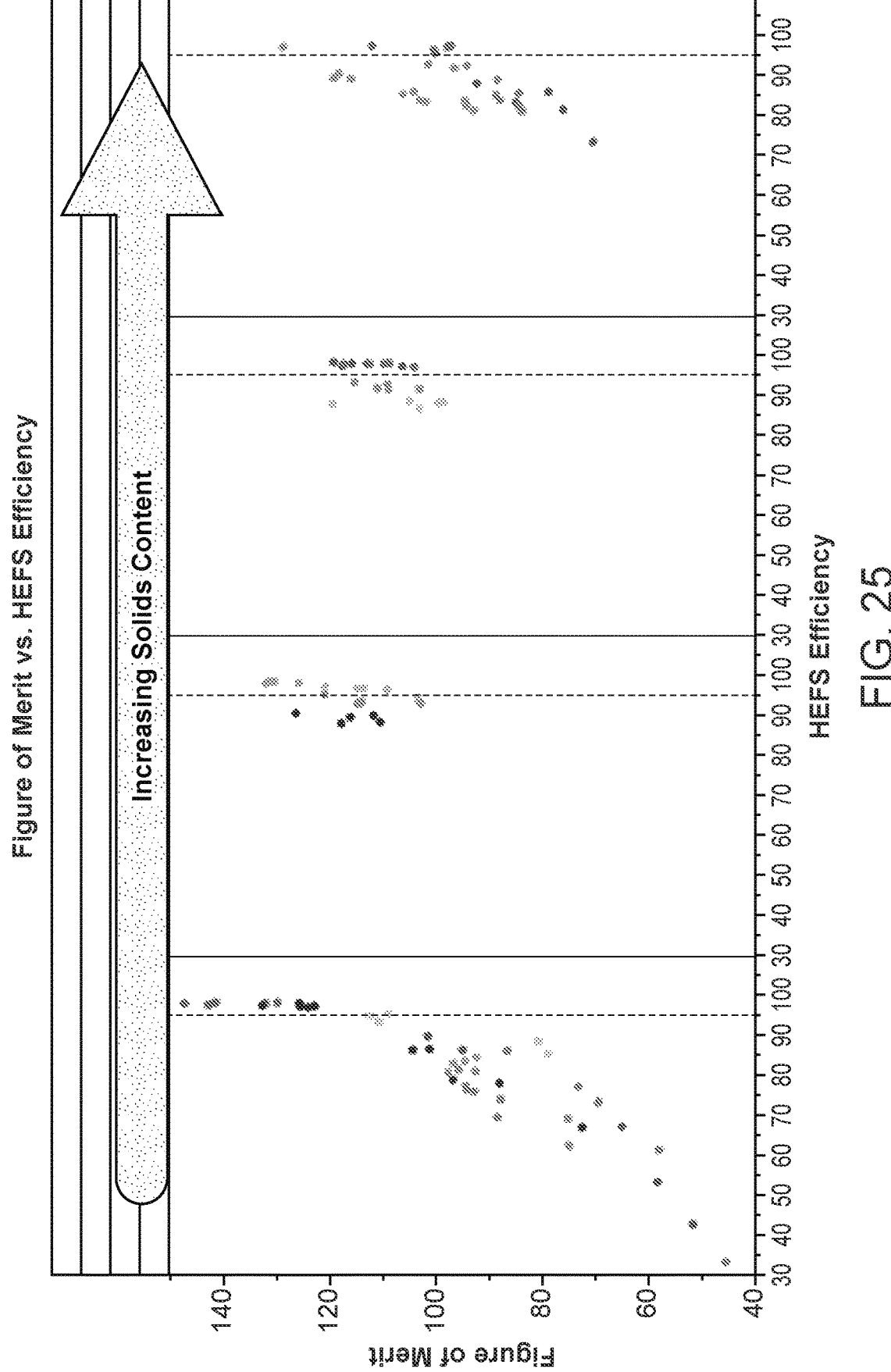
FIG. 25 shows a comparison of performance (indicated using Figure of Merit (FOM)) of media including a support layer and a continuous fine fiber layer, as described in Example 14, as the solids content in the electrospinning precursor solution is varied. The variance in solids content is expected to alter the diameter of the continuous fine fiber.

Large and small fibers may be deposited to create multiple (for example, >3) layers with various permutations of single fiber diameters and/or comingled fiber diameters. A performance metric (Figure of Merit, which accounts for both efficiencies and pressure drop) for 0.3 μm contaminant particles and pressure drop across the media in air filtration is shown in FIG. 25.

Example 15

Sample integrity of composite samples during FHAST bench testing up to 20 psi (at 0.56 feet/minute face velocity, as further described in the Liquid Filtration Performance Testing methods) was evaluated and initial pressure drop of each composite was plotted against composite maximum pore size. As used in this Example, the "composite" refers to any layers of fine fiber (including, for example, the first, second, etc., layers of fine fibers) and the support layer. The composite includes at least one layer of fine fiber.

Composite average maximum pore size (P100) and composite average mean flow pore size (P50) for each sample was measured by flow porometry according to Flow Porometry Method A.

Each sample included mixed diameter fine fibers and a substrate. Some samples included a layer of fine fibers that included "large" fine fibers and "small" fine fibers, prepared as described in Methods 1, 2 or 3. Some samples included a first layer of continuous fine fibers and a second layer of continuous fine fibers where the first layer of continuous fine fibers included fine fibers having an average diameter at least three times the average fiber diameter of the smallest fibers of the second continuous fine fiber layer, prepared as described in Methods 4, 5, 6 or 7.

Figure 26A:
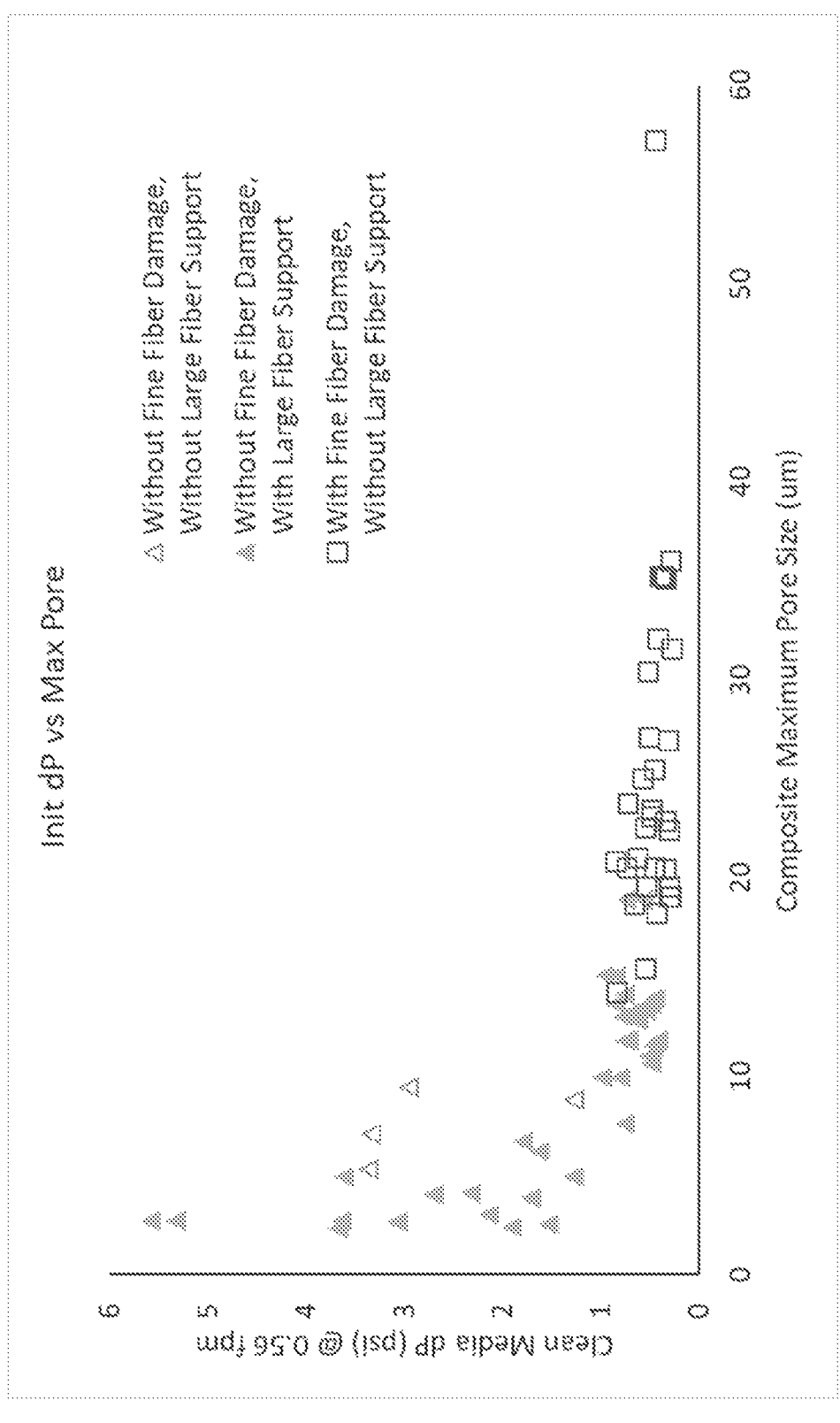
FIG. 26A-FIG. 26B shows initial pressure drop plotted against composite maximum pore size (FIG. 26A) or composite mean flow pore size (FIG. 26B) for composites including one or more continuous fine fiber layers and a support layer, as further described in Example 15. Triangles represent samples that maintained fine fiber structural integrity throughout testing; squares represent samples that suffered from fine fiber blow-out during testing.
Figure 26B:
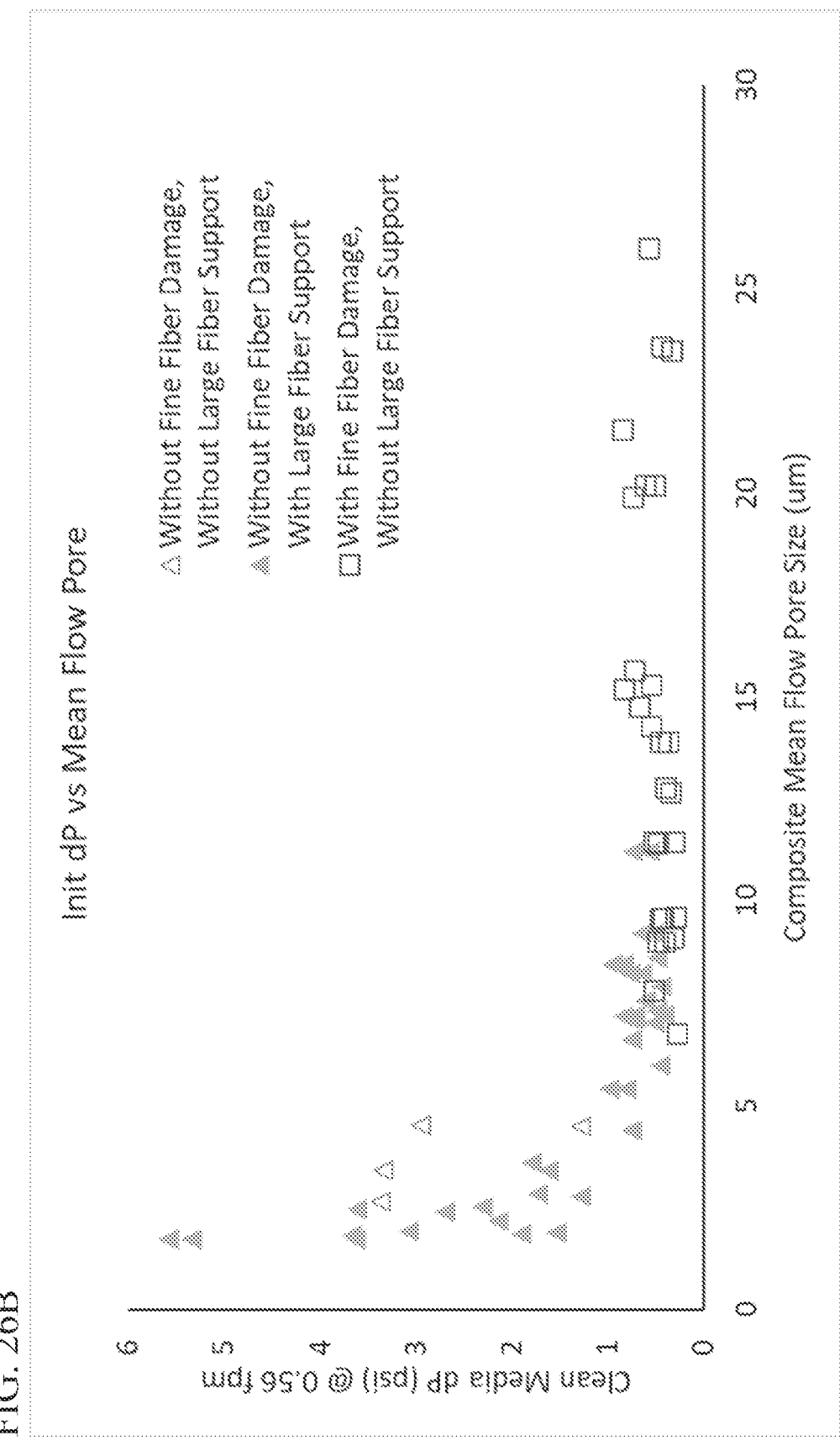

Results are shown in FIG. 26. Triangles represent samples that maintained fine fiber structural integrity throughout FHAST bench testing; squares represent samples that suffered from fine fiber blow-out during FHAST bench testing (indicated by beta collapse). Samples that included two fine fiber layers, the first layer including fine fibers having an average diameter at least three times the average fiber diameter of the smallest fibers of the second fine fiber layer are indicated by filled shapes. Samples that included one fine fiber layer including mixed diameter fibers are indicated by un-filled shapes.

Most of the media samples having only one layer of fine fibers (that is, that were prepared using Methods 1, 2 or 3), exhibited fine fiber damage (represented by open squares).

A few media samples having only one layer of fine fibers survived up to 20 psi during FHAST bench testing layer (represented by open triangles). Without wishing to be bound by theory, it is believed these fine fiber layers survived testing because the coverage (basis weight) was very high—but such high basis weight comes at the cost of higher initial pressure drop.

In contrast, all of the media samples that were prepared using Methods 4, 5, 6 or 7, and included two fine fiber layer maintained fine fiber structural integrity (represented by filled triangles).

The results illustrate that composite average maximum pore size (FIG. 26A) and composite average mean flow pore size (FIG. 6B) both correlate with the ability of the composite to withstand FHAST bench testing—a laboratory test that highly correlates with the ability of the composite to withstand at least 20 psi pressure drop during liquid filtration, indicating better filter performance than a filter media that cannot withstand the same conditions.

While some media samples having a composite average maximum pore size (P100) as large as 20 μm withstood FHAST bench testing, a transition zone where some media samples begin to fail testing was observed for media samples having a composite average maximum pore sizes between 14 μm and 20 μm.

Similarly, while some media have a composite average mean flow pore size (P50) as large as 11 μm withstood FHAST bench testing, a transition zone where some media samples begin to fail testing was observed for media samples having a composite average maximum pore sizes between 6 μm and 11 μm.

For example, a sample without a large fine fiber support having a composite average maximum pore size of 11 μm is unable to survive FHAST bench testing, while a sample with a large fine fiber support having a composite average maximum pore size of 11 μm is able to survive FHAST bench testing. Being able to use a fine fiber sample with a larger pore size allows the fine tuning of efficiency without a detrimental pressure drop of the resulting composite.

Example 16

A composite including a fine fiber layer and a support layer was prepared according to Pendant Drop Sample Preparation Method 8A-8C to form Fine Fiber Sample A, Fine Fiber Sample B, and Fine Fiber Sample C (each of which also included a support layer, as described above).

An efficiency layer was prepared as described in the Preparation of Media Handsheets section that included 40 wt-% glass fibers (Lauscha B-10-F, nominal fiber diameter 1 μm, Lauscha Fiber International (Lauscha, Germany)) and 60 wt-% bicomponent fibers (Teijin TJ04CN, Teijin Limited (Tokyo, Japan)) to form Efficiency Layer A.

Figure 27:
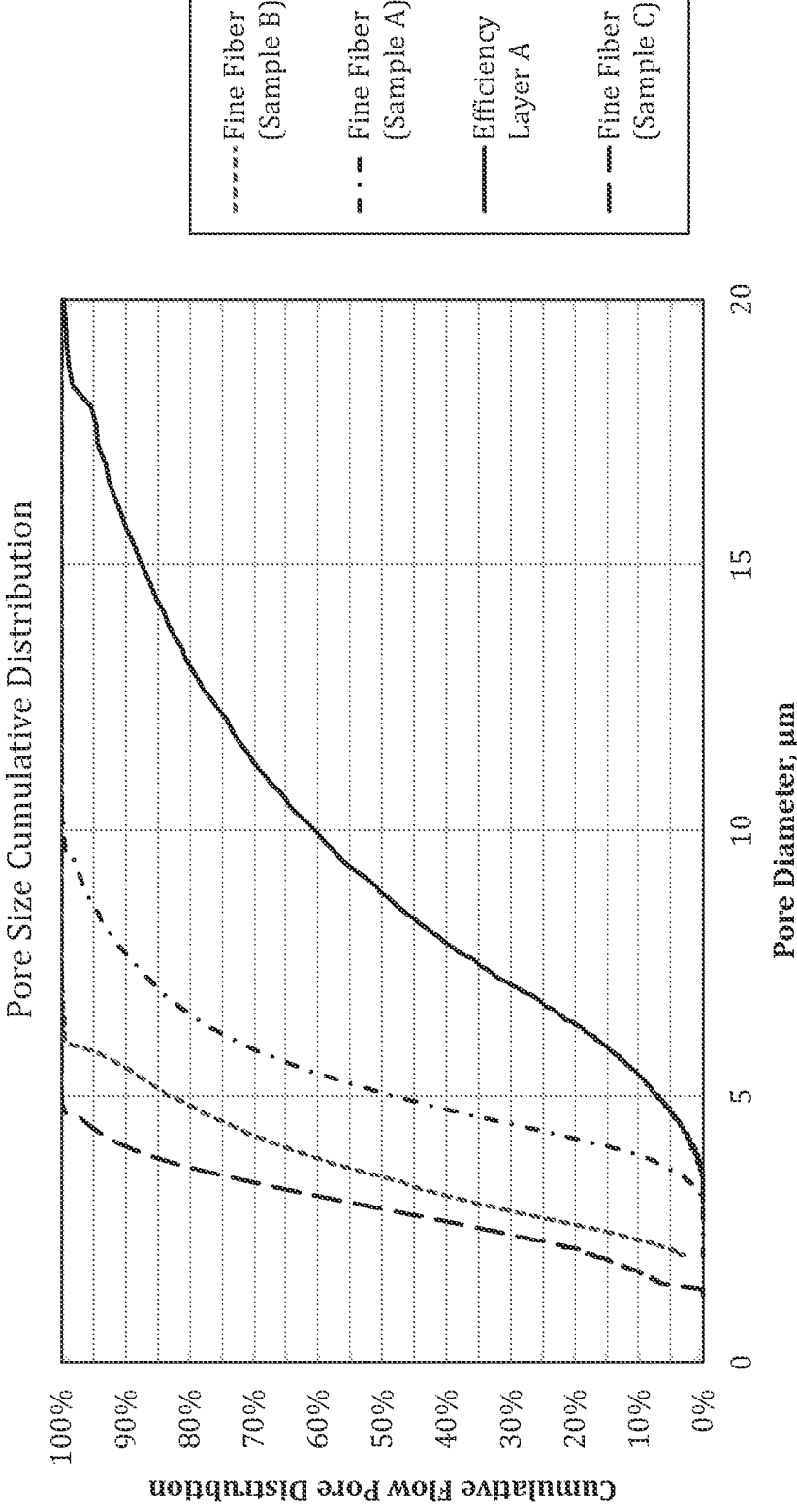
FIG. 27 shows the cumulative flow pore size distribution for samples described in Example 16.

Capillary flow porometry measurements were performed on Fine Fiber Sample A, Fine Fiber Sample B, Fine Fiber Sample C, and Efficiency Layer A, according to Flow Porometry Method B. Results are shown in Table 9 and FIG. 27.

TABLE 9

|  | P95 | P90 | P50 | P10 | P5 | P95/P50 | P95/P5 |
|---|---|---|---|---|---|---|---|
| Efficiency Layer A | 17.81 μm | 15.73 μm | 8.82 μm | 5.40 μm | 4.70 μm | 2.02 μm | 3.30 μm |
| Fine Fiber Sample A | 8.59 μm | 7.69 μm | 5.07 μm | 3.89 μm | 3.62 μm | 1.70 μm | 2.21 μm |
| Fine Fiber Sample B | 5.85 μm | 5.54 μm | 3.48 μm | 2.29 μm | 2.12 μm | 1.68 μm | 2.55 μm |
| Fine Fiber Sample C | 4.39 μm | 4.06 μm | 2.88 μm | 1.70 μm | 1.45 μm | 1.52 μm | 2.58 μm |

Media was prepared as described in the Preparation of Media Handsheets section that included 40 wt-% glass fibers (Lauscha B-26-R, nominal fiber diameter 2.4 μm, Lauscha Fiber International (Lauscha, Germany)) and 60 wt-% bicomponent fibers (Teijin TJ04CN, Teijin Limited (Tokyo, Japan)) to form Loading Layer A.

The performance of a filter media that included both Loading Layer A and Efficiency Layer A was assessed under both steady flow and cyclic flow conditions. Results are shown in Table 10A. As can be seen from the results in Table 10A, although a loading layer and efficiency layer without a fine fiber layer had good performance under steady flow conditions, as indicated by a low pressure drop ($\Delta P$) and a high efficiency, under cyclic flow conditions, the efficiency dropped dramatically. While under steady flow conditions, the media could filter 10 μm-diameter particles with high efficiency, under cyclic flow conditions, that efficiency for the same diameter particles was more than 50 times lower. Similarly, while under steady flow conditions, the media could filter 99% of particles having a 9.3 μm-dimeter, under cyclic flow conditions, the same 99% filtration could not be achieved unless the particles had a 27 μm diameter.

As shown in Table 10B, the addition of certain fine fibers layers (Fine Fiber Sample A, Fine Fiber Sample B) could "rescue" this loss in efficiency while maintaining an acceptable pressure drop. In contrast, the addition of Fine Fiber Sample C results in an undesirably high pressure drop (greater than 3× the pressure drop exhibited by Loading Layer A and Efficiency Layer A alone). Fine Fiber Sample C has smaller pores than Efficiency Layer A so that the P95 of Fine Fiber Sample C (4.39 μm) does not fall within the P5-P50 range (4.70 μm-8.82 μm) of Efficiency Layer A. In contrast, both Fine Fiber Sample A and Fine Fiber Sample B have a P95 that falls within the P5-P50 range (4.70 μm-8.82 μm) of Efficiency Layer A.

Having a very small pore size in the fine fiber layer (as in, for example, Fine Fiber Sample C) results in an increased pressure drop because the fine fiber blocks the flow of air through the filter media. Moreover, without wishing to be bound by theory, it is believed that having a pore size of the fine fiber layer that is so much smaller than that of the efficiency layer is also less efficient because the fine fiber layer is capturing particles of a size that cannot be caught in the efficient layer. In contrast, when the pore sizes of the fine fiber layer and the efficiency layer overlap, the fine fiber layer is catching particles of a size that may also be caught by the efficiency layer.

TABLE 10A

| Test Conditions | Layers of Filter Media | Clean $\Delta P$ | Over-all $\beta_{10\mu m}$ | $\beta100$ |
|---|---|---|---|---|
| Steady Flow | Loading Layer A/ Efficiency Layer A | 7.6 kPa | 152 | 9.3 μm |

TABLE 10A-continued

| Test Conditions | Layers of Filter Media | Clean $\Delta P$ | Over-all $\beta_{10\mu m}$ | $\beta100$ |
|---|---|---|---|---|
| Cyclic Flow | Loading Layer A/ Efficiency Layer A | 7.2 kPa | 2.39 | 27 μm |

TABLE 10B

| Test Conditions | Layers of Filter Media | Clean $\Delta P$ | Over-all $\beta_{10\mu m}$ | $\beta100$ |
|---|---|---|---|---|
| Cyclic Flow | Loading Layer A/Efficiency Layer A/Fine Fiber Sample A | 10.3 kPa | 8.53 | 17 μm |
| Cyclic Flow | Loading Layer A/Efficiency Layer A/Fine Fiber Sample B | 15.8 kPa | 129 | 9.5 μm |
| Cyclic Flow | Loading Layer A/Efficiency Layer A/Fine Fiber Sample C | 23.2 kPa | 2470 | 4.1 μm |

Example 17

Figure 28A:
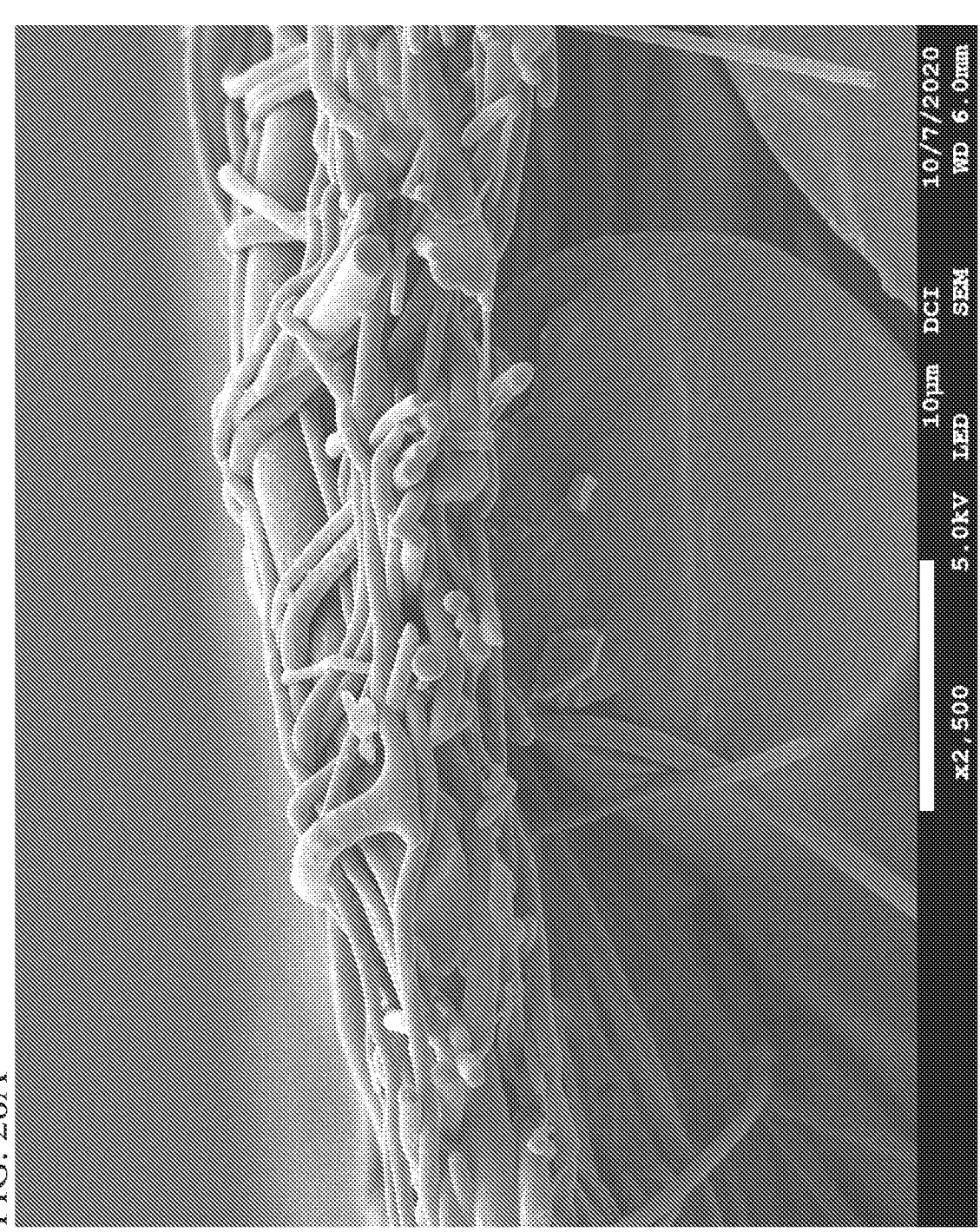
FIG. 28A shows an exemplary cross-sectional image of a continuous fine fiber layer on a support layer.

A sample prepared according to Method 9 was analyzing according to the "Fine Fiber Layer Thickness" method. An exemplary image is shown in FIG. 28A, wherein the full depth of the fine fiber layer is visible in cross-section, and fibers of the support layer are partially visible at the bottom of the image.

Figure 28B:
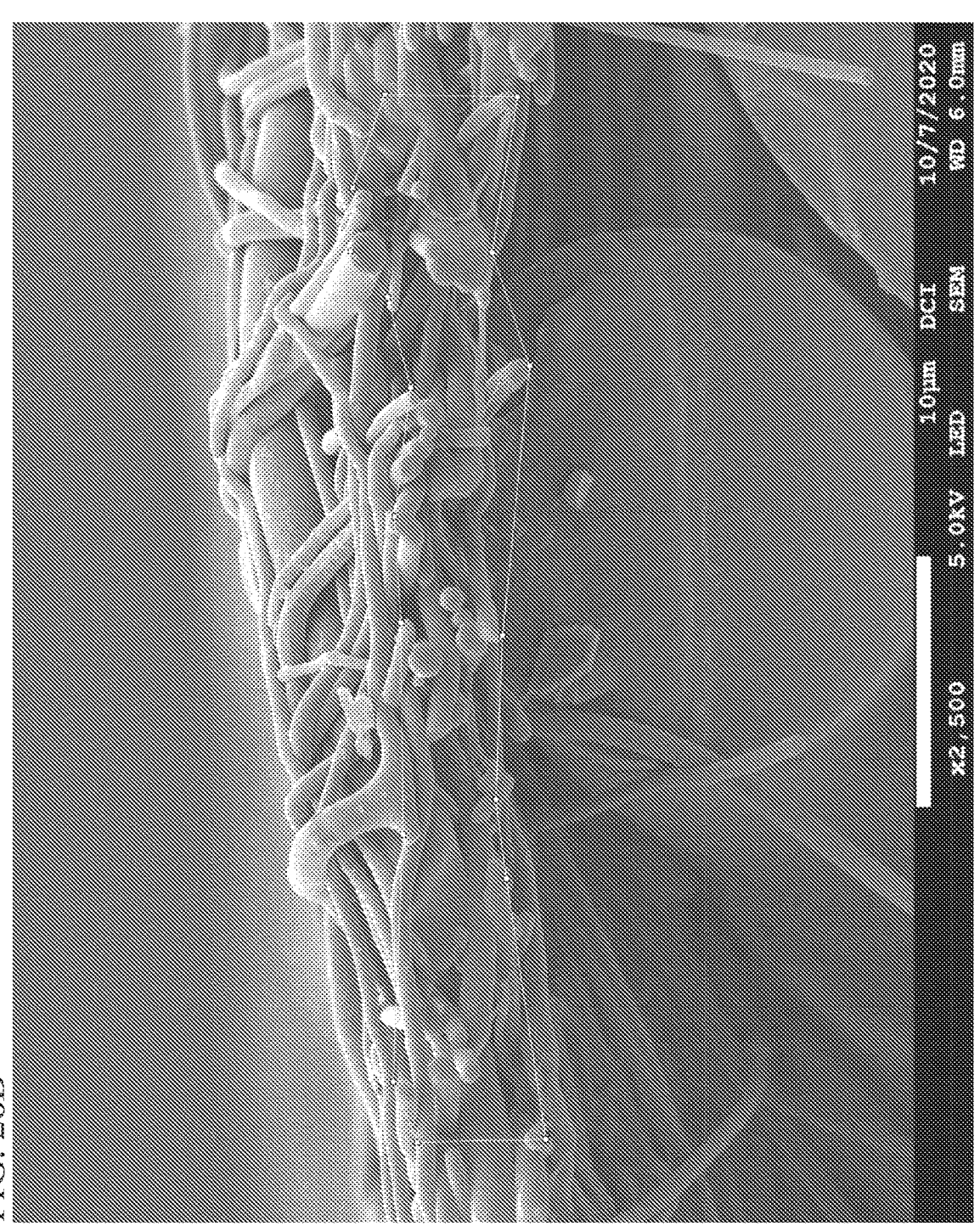
FIG. 28B-FIG. 28D show exemplary images of a method to measure the continuous fine fiber layer thickness, as further described in the Examples.
Figure 28C:
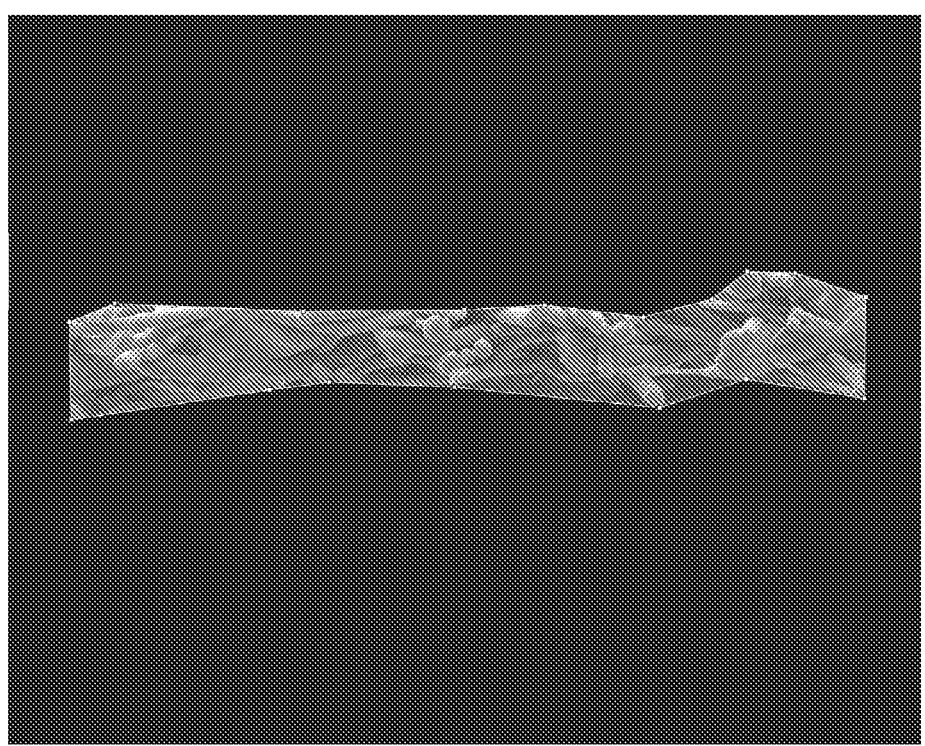
Figure 28D:
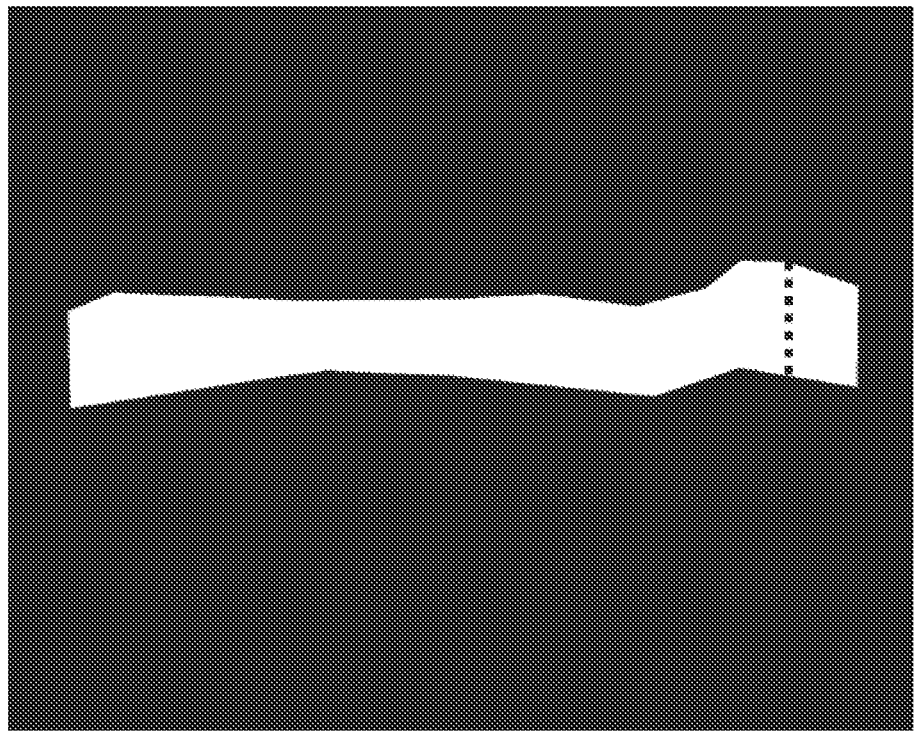

FIG. 28B shows delineation of the fine fiber cross-section using a polygon tool. FIG. 28C shows the image after the area outside the selected fine fiber cross-section has been cleared. FIG. 28D shows the area of the selected fine fiber cross-section after it was re-colored white using the threshold level tool (to compensate for fibers on the borders of the selected section), and the dashed line indicates the maximum thickness in the image that was measured and recorded (5.97 μm). Five of these maximum values were rounded to the nearest tenth of a micron and then these rounded values then averaged. Results are shown in Table 11.

TABLE 11

|  | Max Thickness (μm) | Rounded |
|---|---|---|
| Sample 1 | 5.97 | 6 |
| Sample 2 | 8.17 | 8.2 |
| Sample 3 | 7.203 | 7.2 |
| Sample 4 | 6.941 | 6.9 |
| Sample 5 | 4.702 | 4.7 |
| Average Fine Fiber Layer Thickness |  | 6.6 |

The complete disclosure of all patents, patent applications, and publications, and electronically available material cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A nonwoven filter media comprising a first nonwoven filter media comprising:

25 wt-% to 85 wt-% of a first bicomponent fiber having a fiber diameter in a range of 5 microns to 50 microns and a fiber length of 0.1 cm to 15 cm;

10 wt-% to 50 wt % of a first large efficiency fiber having a fiber diameter in a range of 1 micron to 5 microns; and 5 wt-% to 60 wt % of a first microfibrillated fiber, wherein a majority of the microfibrillated fibers have a lateral dimension of up to 4 microns;

wherein the nonwoven filter media is substantially free of glass fiber.

2. The nonwoven filter media of claim 1 comprising:

the first nonwoven filter media comprising:

40 wt-% to 80 wt-% of the first bicomponent fiber;

10 wt-% to 25 wt % of the first large efficiency fiber; and 10 wt-% to 60 wt % of the first microfibrillated fiber;

optionally, a second nonwoven filter media comprising:

40 wt-% to 90 wt-% of a second bicomponent fiber having a fiber diameter in a range of 5 microns to 50 microns and a fiber length of 0.1 cm to 15 cm;

0 wt-% to 25 wt % of a second large efficiency fiber having a fiber diameter in a range of 1 micron to 5 microns; and 10 wt-% to 60 wt % of a second microfibrillated fiber, wherein a majority of the microfibrillated fibers have a lateral dimension of up to 4 microns; and a third nonwoven filter media comprising a small efficiency fiber having a fiber diameter of at least 0.1 micron and less than 1 micron;

wherein the composite is substantially free of glass fiber.

3. A face mask system comprising:

a face mask defining a face receptacle configured to receive the nose and mouth of a wearer;

a retaining feature configured to retain the position of the face mask relative to the wearer;

an intake airflow pathway extending from the ambient environment to the face receptacle; and a filter element disposed across the intake airflow pathway, wherein the filter element comprises the filter media of claim 1.

4. The nonwoven filter media of claim 1, wherein the first nonwoven filter media comprises from 5 wt-% to 50 wt % of a small efficiency fiber having a fiber diameter of at least 0.1 micron and less than 1 micron.

5. The nonwoven filter media of claim 1, wherein the first nonwoven filter media comprises from 25 wt-% to 85 wt-% of the first bicomponent fiber, and wherein the first bicomponent fiber has a fiber diameter in a range of 5 microns to 25 microns.

6. The nonwoven filter media of claim 4, wherein the small efficiency fiber comprises polyethylene terephthalate (PET).

7. The nonwoven filter media of claim 1, wherein the first large efficiency fiber comprises polyethylene terephthalate (PET).

8. The nonwoven filter media of claim 1, wherein the first bicomponent fiber comprises a structural portion having a melting point of at least 240° C. and a binder portion having melting point 190° C. or lower.

9. The nonwoven filter media of claim 1, wherein the first bicomponent fiber comprises a structural portion comprising PET and a binder portion comprising polyethylene (PE), copolymer PET (coPET), nylon, polypropylene (PP), polytetrafluoroethylene (PTFE), polyethersulfone (PES), polyphenylene sulfide (PPS), meta-aramid, para-aramid, poly lactic acid (PLA), ethylene vinyl alcohol (EVOH), polyvinyl chloride (PVC), polyvinylidene fluoride (PVDF), or a combination of two or more thereof.

10. The nonwoven filter media of claim 1, wherein the first microfibrillated fiber comprises microfibrillated cellulose, microfibrillated para-aramid, microfibrillated liquid crystal polymer, microfibrillated poly-p-phenylene benzobisoxazole (PBO), or a combination of two or more thereof.

11. The nonwoven filter media of claim 1, wherein a majority of the microfibrillated fibers have a lateral dimension of at least 0.5 microns and up to 2 microns.

12. The nonwoven filter media of claim 1, wherein the first microfibrillated fiber and the first bicomponent fiber are distributed uniformly throughout the thickness of the first nonwoven filter media.

13. The nonwoven filter media of claim 1, further comprising a scrim and a fine fiber layer.

14. The nonwoven filter media of claim 13, wherein the fine fiber layer is disposed between the scrim and the first nonwoven filter media.

15. The nonwoven filter media of claim 13, wherein the fine fiber layer comprises an electrospun layer.

16. The nonwoven filter media of claim 1, wherein the first nonwoven filter media is wet-laid or air-laid media.

17. The nonwoven filter media of claim 1, wherein the media is electrostatically charged.

18. The nonwoven filter media of claim 1, wherein the media has a solidity in a range of 5% to 15%.

19. The nonwoven filter media of claim 1, wherein the first nonwoven filter media has a mean flow pore size of 1 μm to 20 μm and a P95/P50 ratio of at least 1.5.

* * * * *